(12) United States Patent
Youtt

(10) Patent No.: US 7,681,392 B2
(45) Date of Patent: Mar. 23, 2010

(54) HYDRAULIC DRIVE SYSTEM WITH AGGRESSIVE CLUTCHING

(75) Inventor: Dan Youtt, Saint Paul, MN (US)

(73) Assignee: Eaton Corporation, Cleveland, OH (US)

( * ) Notice: Subject to any disclaimer, the term of this patent is extended or adjusted under 35 U.S.C. 154(b) by 300 days.

(21) Appl. No.: 11/746,990

(22) Filed: May 10, 2007

(65) Prior Publication Data

US 2008/0277230 A1 Nov. 13, 2008

(51) Int. Cl.
 *F16D 31/02* (2006.01)
(52) U.S. Cl. .......................................................... 60/441
(58) Field of Classification Search ................... 60/441; 192/82 T
 See application file for complete search history.

(56) References Cited

U.S. PATENT DOCUMENTS

| 3,892,283 | A | | 7/1975 | Johnson |
|---|---|---|---|---|
| 4,064,694 | A | | 12/1977 | Baudoin |
| 5,088,041 | A | | 2/1992 | Tanaka et al. |
| 5,170,868 | A | * | 12/1992 | Yamashita et al. ......... 192/82 T |
| 6,119,802 | A | | 9/2000 | Puett |
| 2006/0000207 | A1 | | 1/2006 | Rush |
| 2006/0032220 | A1 | | 2/2006 | Swartzer et al. |
| 2008/0229739 | A1 | | 9/2008 | Dreher et al. |

FOREIGN PATENT DOCUMENTS

| DE | 3327978 | 2/1985 |
|---|---|---|
| EP | 0718138 | 6/1996 |

\* cited by examiner

*Primary Examiner*—F. Daniel Lopez
(74) *Attorney, Agent, or Firm*—Rader, Fishman & Grauer PLLC

(57) ABSTRACT

A hydraulic drive system for storing and releasing hydraulic fluid includes a high pressure storage device, a low pressure storage device, and a pump-motor operating at a range of pump-motor speeds for converting between hydraulic energy and mechanical energy. The pump-motor is disposed between the high pressure device and the low pressure device. In normal operation, the hydraulic drive system enters a motoring mode where hydraulic energy is released from the high pressure storage device and converted to mechanical energy using the pump-motor. It also enters a pumping mode where mechanical energy is converted into hydraulic energy. A neutral state exists where hydraulic energy is neither stored nor released from the high pressure storage device. An approach for facilitating the application of a clutch when it is not a simple on/off mechanism provides an enhanced interface for the conversion between hydraulic energy and mechanical energy, thereby improving efficiency within the hydraulic drive system.

21 Claims, 35 Drawing Sheets

HYDRAULIC DRIVE SYSTEM WITH AGGRESSIVE CLUTCHING

RELATED CASES

The following cases, entitled Hydraulic Drive System With Neutral Drift Compensation, Hydraulic Drive System With Precharge Logic, Hydraulic Drive System With Temperature Compensation For Pressure Limits, Hydraulic Drive System With Aggressive Clutching, and Hydraulic Drive System With Exiting from Pumping and Motoring, of which the present case is one, have all been filed on the same date. The contents of the four applications that have a different title then the present application are hereby incorporated herein in their entirety.

BACKGROUND

Hydraulic drive systems are known to help facilitate the conversion between mechanical energy (e.g., in the forming of rotating shafts) and hydraulic energy, typically in the form of pressure. One hydraulic drive system that is known for use with respect to vehicles is sometimes called a hydraulic launch assist. When a vehicle brakes, mechanical energy from the vehicle driveline is captured by the hydraulic drive system and stored in a high pressure storage device. When the vehicle accelerates, pressurized fluid in the high pressure storage device is released, converting the hydraulic energy into mechanical energy.

Unfortunately, there are various inefficiencies in using a hydraulic drive system. The efficiencies include issues related to a pump-motor that is inaccurately calibrated, changing temperatures affecting pressures within the hydraulic drive system, time required to place the hydraulic drive system into a normal operational state, the time for applying a clutch to facilitate the conversion between hydraulic energy and mechanical energy, and issues associated with changing states within the hydraulic drive system.

DETAILED DESCRIPTION

Figure 1:
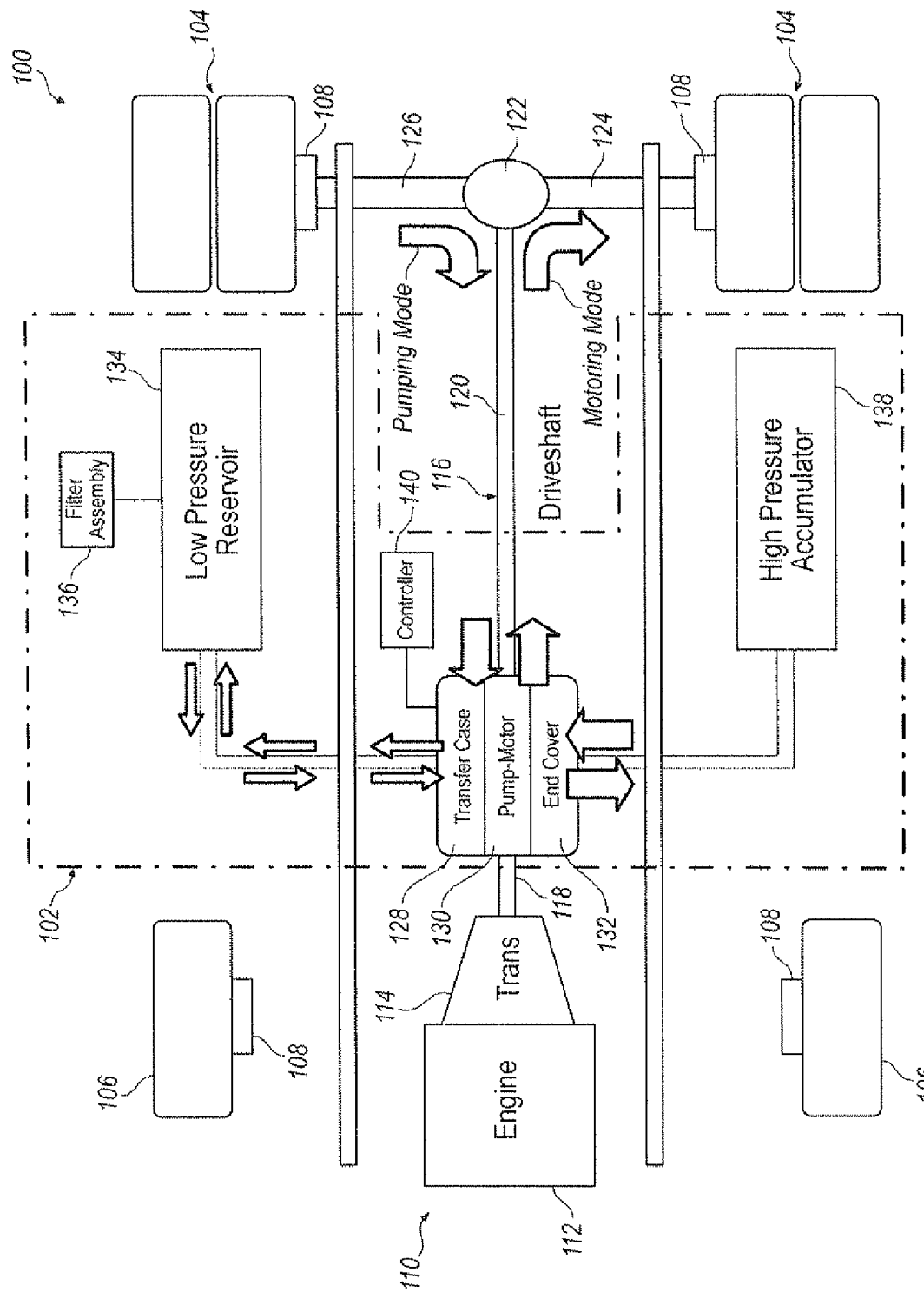
FIG. 1 is a schematic illustration of a vehicle with an exemplary hydraulic drive system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Further, there are a number of constants introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

To facilitate the discussion that follows, the leading digits of an introduced element number will generally correspond to the figure number where the element is first introduced. For example, vehicle 100 is first introduced in FIG. 1.

Overview of an Exemplary Hydraulic Drive System in Illustrative Environment

Figure 2:
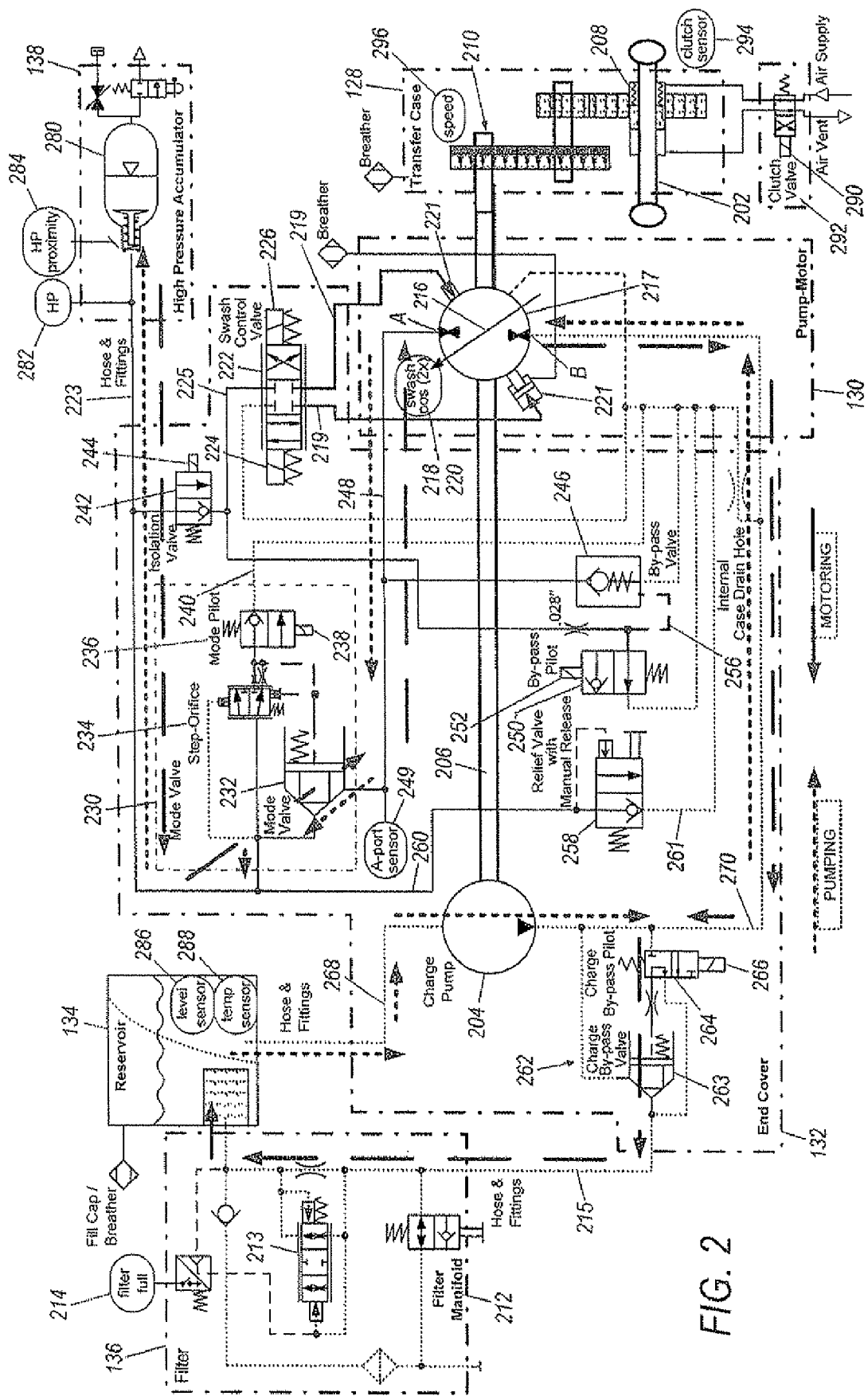
FIG. 2 is a schematic illustration of the components of a hydraulic drive system showing an exemplary flow in both a motoring mode and a pumping mode.

FIG. 1 schematically illustrates a motor vehicle 100 with an exemplary hydraulic drive system 102, known by the trademarks Hydraulic Launch Assist™ or HLA® by the assignee of the present application when used with a vehicle 100. A more detailed schematic of hydraulic drive system 102 is illustrated in FIG. 2 and discussed in detail below.

Vehicle 100 has four rear drive wheels 104 and two front non-drive wheels 106. In other illustrative embodiments all wheels may be drive wheels. Moreover, there may be more or fewer wheels for vehicle 100. Operably associated with each of the wheels 104 and 106 could be a conventional type of wheel brake 108. Preferably, the wheel brakes 108 are part of an overall electro-hydraulic brake (EHB) system, of a known type well, and commercially available.

Vehicle 100 includes a vehicle drive system, generally designated 110. Vehicle drive system 110 includes a vehicle engine 112, a transmission 114, and hydraulic drive system 102. Transmission 114 is operatively connected to engine 112 and transmits the torque generated by the engine 112 to wheels 104. Transmission 114 also interacts with hydraulic drive system 102 as discussed in greater detail below. The particular type of engine 112 and transmission 114 and the construction details thereof, as well as the arrangement of drive system 110 may be varied in a variety of ways. For example, vehicle 100 is not even limited specifically to use with what is normally thought of as an "engine", and therefore, it will be understood that references to an "engine" will mean and include any type of power source or other prime mover. Finally, although the hydraulic drive system 102 is illustrated and described in connection with a vehicle drive system 110, it may be utilized advantageously with any sort of hydraulic drive system of the type illustrated and described hereinafter, whether or not such system is part of a vehicle.

Extending rearwardly from the transmission 114 and also forming a portion of vehicle drive system 110 is a drive-line, generally designated 116. In the illustrated system 100, and by way of example only, the drive-line 116 includes a forward drive shaft 118, an intermediate drive shaft (not visible herein, but illustrated as element 202 in FIG. 2), and a rearward drive shaft 120, an inter-wheel differential 122 and left and right rear axle shafts 124 and 126. Those skilled in the art will understand, from a reading of the present specification, that the drive-line 116 has been illustrated and described as including the shafts 118, 202, 120, 124 and 126 primarily to facilitate understanding of the overall vehicle drive system 110, and not by way of limitation. For example, there may be fewer or more shafts and the shafts may be permanently or selectively connected to one another by way of clutches.

An exemplary arrangement of hydraulic drive system 102 is illustrated in more detail in FIG. 2. More specifically, FIG. 2 schematically illustrates the exemplary arrangement of the various elements of system 102 and their physical relationship with one another. As noted above, the disclosed arrangement is merely to facilitate discussion and the arrangement is not limiting. Moreover, certain elements may be added or removed without compromising the relevant operation of hydraulic drive system 102. FIG. 2 includes a number of sensors, switches, and solenoids.

Referring now to both FIGS. 1 and 2, in addition to the elements already described, which contribute to the flow of mechanical energy, the drive system 110 also includes hydraulic drive system 102, as noted above. Hydraulic drive system 102 is directed to the storing and releasing of hydraulic energy. A clutch 208 within a transfer case 128 helps provide the interface in transferring between mechanical and hydraulic energy as discussed in greater detail below.

Schematically in FIGS. 1 and 2, hydraulic drive system 102 includes transfer case 128, a hydrostatic pump-motor 130, an end cover 132 retaining a charge pump 204 (shown in FIG. 2) and a plurality of valve mechanisms 222, 232, 242, 246, and 258, a low pressure reservoir 134, a filter assembly 136 and a high pressure accumulator 138. Low pressure reservoir 134 is a type of accumulator, but of the low pressure type as opposed to high pressure accumulator 138. Thus, the terms low pressure reservoir and low pressure accumulator are used interchangeably for element 134. More generally, accumulator 138 is an example of a high pressure storage device while reservoir 134 is an example of a low pressure storage device. Since a reservoir is being used, hydraulic drive system 102 is an example of an open circuit. U.S. Pat. No. 6,971,232 illustrates an example of a closed system using an accumulator rather than a reservoir that is open to atmospheric pressure. The contents of U.S. Pat. No. 6,971,232 are incorporated herein by reference in its entirety. For various of the concepts discussed below, either a closed system or an open system may be used. Thus, general layout of hydraulic drive system 102 shown in the figures is merely illustrative.

While the various components are illustrated in particular physical structures for convenience of discussion it is possible for any or all of the components to be within a single or a subset of structures. Merely by way of example, motor-pump 130 could be incorporated within end cover 132, or these two components and transfer case 128 could be located within a single structure as illustrated schematically in FIG. 1. Moreover, not all components or sub-components (e.g., a specific element) are required. For instance, while a charge pump 204 is illustrated, in practice such a pump may not be required in view of the dual operationality of pump-motor 130 as discussed below. For example, a charge pump may not be required if a low pressure closed accumulator were used rather than a low pressure reservoir 134 at atmospheric pressure.

In general terms, the pump-motor 130 and components within end cover 132 provide the hydraulic pathway for movement of a hydraulic fluid such as oil between low pressure reservoir 134 and high pressure accumulator 138. As illustrated using a combination of FIGS. 1 and 2, transfer case 128 includes a shaft 206 that is mechanically connected to both the pump-motor 130 and the charge pump 204. A clutch 208 and gearing 210 selectively transfers torque between shafts 202 and 206.

The pump-motor 130 is used to convert between mechanical energy associated with the various shafts, including shafts 206, and hydraulic energy as stored in the form of pressure within hydraulic drive system 102. In normal operation of drive system 102 in a pumping mode, mechanical energy is stored as hydraulic energy while in a motoring mode, hydraulic energy is transferred to mechanical energy. In a precharge mode as discussed below with respect to FIG. 6, mechanical energy is also converted to hydraulic energy using pump-motor 130.

Typically, drive system 110, including hydraulic drive system 102, operates in two different modes at different times. In a first mode of drive system 110, called a regeneration or pumping mode (typically occurring in a deceleration cycle), a vehicle slows down, such as by an operating signal a braking operation. Kinetic energy of the vehicle then drives the pump-motor 130 as a pump, transferring hydraulic fluid from the low pressure reservoir 134 to the high pressure accumulator 138, and removing additional torque from drive-line 116. While not necessarily required, one advantage of using charge pump 204 is that it helps to prevent undesirable cavitation within pump-motor 130. In the illustrated system 100 energy comes from wheels 104 in the form of torque, through axle shafts 124 and 126, through differential 122, and then by way of shafts 116 and 202 into transfer case 128. In some approaches, wheels 106 may include appropriate shafting and related mechanisms to permit a similar recovery of kinetic energy. When clutch 208 is applied, energy of braking is transferred through gearing 210 to shaft 206, and finally to charge pump 204 and pump-motor 130. When a nitrogen gas accumulator is used, the fluid compresses the nitrogen gas within the accumulator 138 and pressurizes hydraulic drive system 102. Under some circumstances it may be possible to undertake a regeneration of pumping mode using engine 112 by way of transmission 114 and shaft 118, also connected to intermediate shaft 202.

In a second mode of drive system 110, called a launch assist or motoring mode (typically occurring in an acceleration cycle), fluid in the high pressure accumulator 138 is metered out to drive the pump-motor 130 as a motor. Pump-motor 130 applies torque to shaft 206 that is transferred through gearing 210, through applied clutch 208 and then through shafts 206, 120, differential 122, axle shafts 124 and 126, and finally to wheels 104. The motoring mode stops when most of the pressure is released from high pressure accumulator 138, as discussed in more detail below. Before motoring can again commence, regeneration of the high pressure accumulator 138 using the pumping mode must occur.

A controller 140 at least partly controls hydraulic drive system 102. Various informational inputs are received by controller 140, and then heuristics, i.e., logical rules or processes, are applied to the inputs. Outputs are then generated that influence operation of the hydraulic drive system 102 in the context of overall operation of drive system 110 of vehicle 100. While a separate controller 140 is illustrated, controller 140 may be incorporated into an overall vehicle electronic control unit (ECU) or as part of an ECU associated with engine 110 or transmission 114 or some combination thereof.

Figure 3:
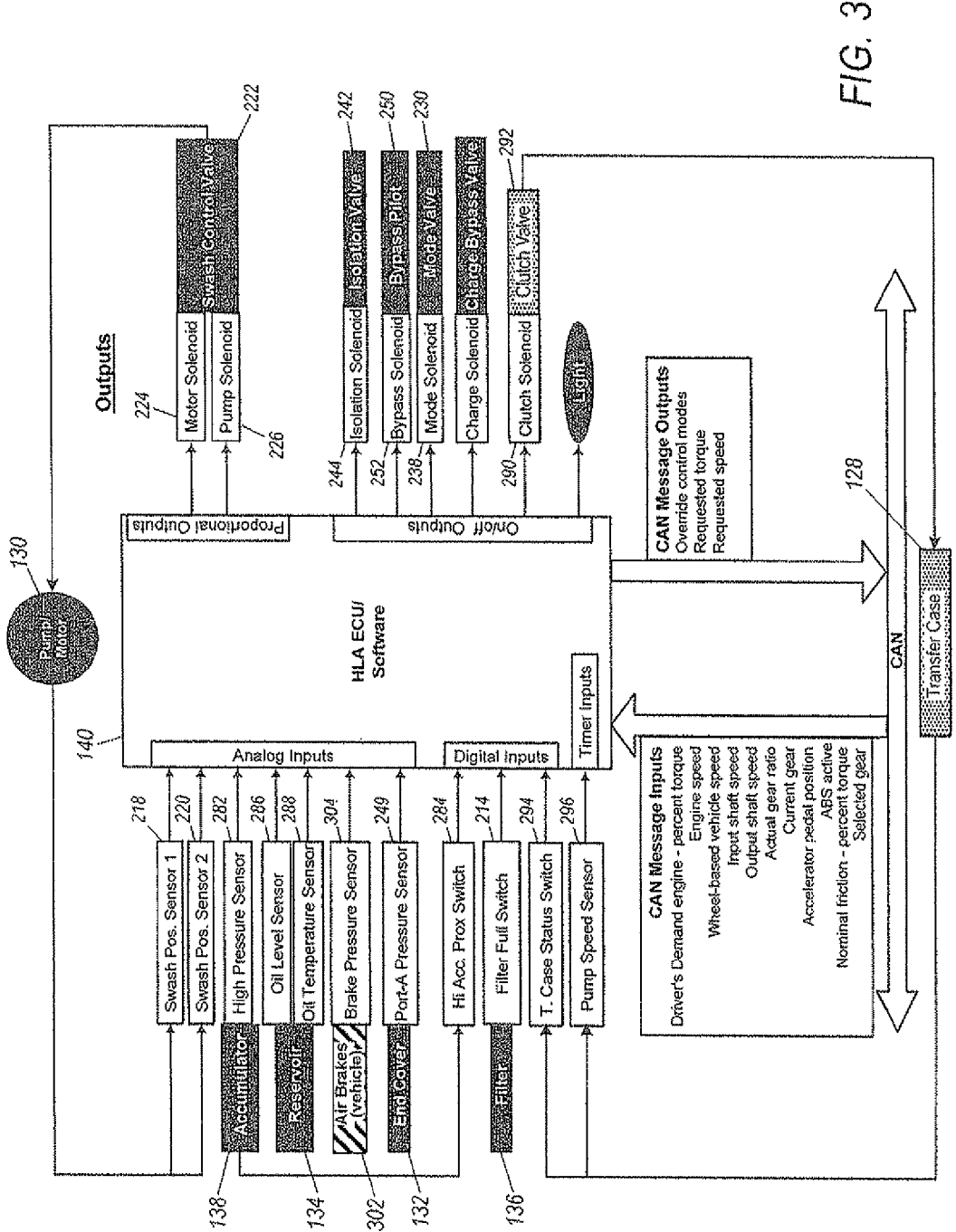
FIG. 3 illustrates various exemplary inputs and outputs associated with an exemplary hydraulic drive system that are used by a controller.

Various inputs and outputs associated with hydraulic drive system 102 that are used by controller 140 are illustrated in FIG. 3. For each of the sensors or switches discussed in FIG. 2, the same switch or sensor is shown in FIG. 3. Similarly, for each of the solenoids discussed in FIG. 2, a corresponding output from controller 140 is also shown in FIG. 3. As illustrated in FIG. 3, some of the inputs received by controller 140 from the elements associated with FIG. 2 are analog, while others are either digital or time-related. Similarly, some outputs to elements associated with FIG. 2 have a range of values or are proportional in nature while others are binary in nature.

Further, as illustrated in FIG. 3, when a separate electronic control unit (ECU) is in communication with other ECUs within vehicle 100, controller 140 receives message inputs from the overall vehicle Controller Area Network (CAN) and submits message outputs to the CAN. A well known communications standard defined by the Society of Automotive Engineers (SAE) is SAE J1939 for CAN-based communications. SAE J1587 is another possible communications standard that could also be used, but is generally not as robust. Moreover, other communications standards, such as ISO9141 K, or other known standards, may be used. The terminology associated with the various inputs, which follows, is provided in accordance with J1939 in accordance with the specifications for that standard and is.

Examples of possible CAN messages that can be input into controller 140 follow in Table 1:

TABLE 1

| Can Message Inputs |
| --- |
| Driver's demand, engine - percent torque |
| Driver's demand, engine - engine speed |
| Wheel-based vehicle speed |
| Input shaft speed |
| Output shaft speed (TransShaftSpeed) |
| Actual gear ratio |
| Current gear |
| Accelerator pedal position |
| ABS active |
| Nominal friction - percent torque |

Examples of possible CAN messages that can be output from controller 140 follow in Table 2:

TABLE 2

| Can Message Outputs |
| --- |
| Override control modes |
| Requested torque |
| Requested speed |

Referring back to FIG. 2, filter assembly 136 includes valving, including a filter manifold 212, a valve mechanism 213 and a digital switch 214 that triggers only when the filter is full. Switch 214 of filter assembly 136 is also illustrated in FIG. 3 as one of the digital inputs into controller 140. It is envisioned that various filter assemblies 136 may be used within hydraulic drive system 102. One exemplary assembly 136 is discussed in co-pending application Ser. No. 11/408,504, which is a continuation-in-part of application Ser. No. 10/828,590 and a continuation-in-part of Ser. No. 10/624,805, all of which are incorporated herein in their entirety.

Filter assembly 136 is in communication with a port of the low pressure reservoir 134 by means of a conduit 215, disposed on the "low pressure" side of the hydraulic drive system 102. In general, the conduits associated with the "low pressure" side are illustrated by closely dashed lines between components while conduits associated with the "high pressure" side are illustrated by solid lines between components. Internal conduits disposed solely between elements making up a component are illustrated in a "bolder" line weight and are not necessarily part of the "high pressure" or the "low pressure" side of the system. Often, they are selectively part of one side or the other.

The operation and operation of an exemplary filter assembly 136 in the context of a hydraulic drive system such as exemplary hydraulic drive system 102 is discussed in greater detail in U.S. Pat. No. 6,971,232, the contents of which are incorporated herein by reference in their entirety.

In one illustration pump-motor 130 is of the variable displacement type. However, the pump-motor 130 may be of many types of constructions including, but not limited to bent axis, vane, or radial piston. In the present illustration pump-motor 130 is an axial piston type. It includes a swash-plate 216 contained within a pump-motor unit 217 and two swash position sensors 218 and 220. To vary the angular displacement of swash-plate pump-motor unit 117 includes some sort of displacement-varying means, such as at least two fluid pressure servo actuators (stroking cylinders) of the type shown in FIG. 2 and designated as 221. More information concerning the stroking cylinders is provided in U.S. Pat. No. 7,076,946, which is incorporated herein in its entirety. Any of a variety of servo actuators may be used and are not limited to the type of actuators schematically represented in FIG. 2. The servo actuators 221 are connected hydraulically to the outlets of a typical electro-hydraulic controller by way of conduits 219, the electro-hydraulic controller labeled as a swash control valve 222. Swash control valve 222 is located within end cover 232. The operation of the swash control valve 222 is to communicate pressurized fluid from a conduit 225 on the "high pressure" side of the system to the servo actuators 221 using conduits 219 as appropriate to achieve the desired angle and displacement of swash-plate 216, all of which is generally well known to those skilled in the pump and motor art, and especially, in the axial piston pump art. To control the operation of the appropriate servo actuators 221, swash control valve 222 includes a motor solenoid 224 and a pump solenoid 226. The two solenoids are controlled proportionally by controller 140 and are used to position swash-plate 216, by way of valve 222 and the appropriate servo actuator 221, either in a positive angular displacement when the motoring mode is desired or in a negative angular displacement when the pumping mode is desired. The angular displacement of swash-plate 216 is determined by either position sensor 218 or position sensor 220, the readings of which are then input into controller 140, as shown in FIG. 3. Typically, only one sensor is required, the other sensor acting as a backup in case of failure of the other sensor. It is possible, however, that both sensors 218 and 220 might be used together to provide an average determination of the angular displacement of swash-plate 216.

Whenever the pump-motor unit 217 is in its neutral condition (which is the typically the case whenever the vehicle is neither in motoring mode nor in pumping mode), there is substantially no flow within the hydraulic drive system 102 between the pump-motor 130 and the accumulators 134 and 138. However, as is well known, because of the pre-charge on each of the accumulators 39 and 41, as will be discussed in greater detail subsequently, the hydraulic drive system 102 remains "pressurized" even while the pump-motor unit 217 is in its neutral condition. When pump-motor unit 217 is in its neutral condition, then ideally swash-plate 216 has zero angular displacement. In actuality, inefficiencies result because of the swash-plate 216 drifting away from its zero angular displacement or alternatively, while the swash-plate 216 is in its correct orientation there is an issue with the signal from sensor 218 and/or 220 that drifts. Thus, it is desirable to address drifting related to measurements or the actual positioning of swash-plate 216, A mechanism to reduce drift is addressed below.

In addition to swash control valve 222, end cover 132 includes a mode control valve assembly 230. In turn, mode control valve assembly 230 includes a mode valve 232. Operably associated with, i.e., incorporated into, the mode control valve 232 is a step-orifice control valve 234, and a solenoid type mode pilot valve 236 with an on/off solenoid 238, the outlet of the mode pilot valve being in communication with a source of low pressure (such as reservoir 134, or merely the low pressure side of the hydraulic drive system 1023) by means of a conduit 240. The operation and operation of an exemplary mode valve assembly 230 in the context of a hydraulic drive system such as exemplary hydraulic drive system 102 is discussed in greater detail in U.S. Pat. No. 6,971,232, the contents of which are incorporated herein by reference in their entirety.

End cover 132 also includes an isolation valve 242 that is disposed in series in conduit 243 between high pressure accumulator 138 and swash control valve 222. Isolation valve 242 is preferably a poppet-type valve, which is solenoid and is operated by solenoid 244. Whenever hydraulic drive system 102 is operating, the isolation valve 242 is "ON", i.e., high pressure is freely communicated from the high pressure accumulator 138 to the swash control valve 222 by way of conduit 223. Whenever the hydraulic drive system 11 is "OFF", the isolation valve 61 is spring-biased to the position shown in FIG. 2, in which the isolation valve keeps the pump-motor 130 and the swash control valve 222 "isolated" hydraulically from the high pressure accumulator 138, so that the high pressure accumulator 138 does not "leak down" through the swash control valve while the system 102 is not operating. The isolation valve 242 acts as a "key on" for the hydraulic drive system 102. It is used to put the hydraulic drive system 102 in standby. It isolates the high pressure side of the hydraulic drive system 102 from the low pressure side of the system. It also provides pilot pressure to the by-pass valve 246.

References herein to the hydraulic drive system 102 being "OFF" will be understood to mean and include both that portion of the vehicle 100 operating cycle when the vehicle 100 is not in a pumping-motoring mode, as well as those times when the vehicle 100 is not operating at all (engine "off" condition).

End cover 132 also has a by-pass valve 246, which may also be referred to as an "unloading" valve or as a "dump" valve, as those terms are well understood in the valve art. Bypass valve 246 is disposed between the outlet port A of the pump-motor unit 217 at its input and the "low pressure" side of the hydraulic drive system at its output. It is used to "unload" the pump-motor 130.

To help determine the pressure level within the "high pressure" side, such as within conduit 248, end cover 132 includes a sensor 249, the readings of which are input into controller 140 as shown in FIG. 3. Sensor 249 may be of any type and is not limited to an analog sensor. Sensor 249 is used to measure exit pressure from port A of pump-motor 130.

The by-pass valve 246 will "unload" the pump-motor 130 whenever the engine is "off," i.e., no driving pressure is present in the conduit 223 or in conduit 248, so that the pump-motor 130 does not transmit unintended torque to the shaft 202. To unload the pump-motor 130, a by-pass pilot 250 with associated controllable solenoid 252 is operatively connected to the by-pass valve 246 by an internal conduit 256. The by-pass pilot 250 selectively permits the by-pass valve 246 to open, thereby releasing pressure from the "high pressure" side of the system to the "low pressure" side. When hydraulic drive system 102 is operational, however, the by-pass pilot 250 and associated solenoid 252 prohibit the pressurized fluid from passing through the by-pass valve 246, as is well known.

The hydraulic drive system 102 also includes, in the end cover 132, a relief valve generally designated 258 which, as is shown in FIG. 2, is spring biased to a closed position. The valve 258 is illustrated as a poppet valve. An inlet of the relief valve 258 is in communication with a conduit 260, which interconnects the inlet of the relief valve 258 with the port of the high pressure accumulator 138 by way of conduit 223, and with the inlet of the mode control valve 230. Whenever the pressure in the conduit 260 exceeds a predetermined maximum, the relief valve 258 is biased (moved "left" in FIG. 2) to a position which permits communication from the conduit 256 to a conduit 261, which is on the "low pressure" side of the hydraulic drive system 102.

A charge by-pass valve assembly 262, including a charge by-pass valve 263, a charge by-pass pilot 264, and a charge by-pass pilot solenoid 266 are illustrated in FIG. 2 as disposed between low pressure conduit 270 and low pressure conduit 215. Charge by-pass valve assembly 262 is closed by way of solenoid 266 during a pumping operation so that fluid flowing through charge pump 204 and pump-motor 130 is not simply recycled back to low pressure reservoir 134 without charging high pressure accumulator 138. However, the charge by-pass valve assembly 262 is open during motoring as illustrated in FIG. 2 and discussed in greater detail below.

The high pressure accumulator 138 is illustrated as being located outside of end cover 132. However, as noted above, in some cases components such as the high pressure accumulator 138 can be located in the same physical housing or structure as those discussed with respect to end cover 132. Similarly, components physically located within end cover 132, for example, may be associated with other structures without precluding proper operation of hydraulic drive system 102.

High pressure accumulator 138 represents the termination of the "high pressure" side of hydraulic drive system 102 in association with conduit 223. High pressure accumulator 138 includes a high pressure accumulator unit 280, a pressure level sensor 282 and a high pressure accumulator proximity switch 284. Sensor 282 is analog and is used to measure the pressure associated with or stored in the accumulator unit 280. By way of example only, the high pressure accumulator 138 is of the gas-charge type. At the end of a typical deceleration cycle (pumping mode), the high pressure accumulator unit 280 is charged up to the maximum system pressure, typically about 5000 pounds per square inch (PSI), but possibly even higher.

During a motoring mode where the stored pressurized fluid within accumulator 138 is released, a pressure point may be reached where high pressure proximity switch 284 generates a digital signal indicating the closing of the accumulator unit 280, whereby further flow of pressurized fluid from the accumulator is prohibited. Switch 284 also selectively provides that signal as an input to controller 140 as shown in FIG. 3. The rules governing activation of high pressure accumulator proximity switch 284 are discussed in greater detail below. However, in general, switch 284 only triggers when too much of the pressurized fluid has escaped from accumulator unit 280 during the motoring mode and the pressure within the accumulator unit has abruptly dropped toward zero. This condition is undesired. Nor does it occur frequently. However, when it does occur, hydraulic drive system 102 uses the occurrence to learn how to prevent it as discussed below with respect to the temperature compensation for pressure limits. A hydraulic pressure is necessarily maintained, within the accumulator 138, such that a minimum amount of oil is always retained in the high pressure accumulator and such that there is always a predetermined, minimum charge pressure within both of the conduits 223 and 260.

It is important to be able to stop motoring before switch 284 is activated. However, the amount of fluid that can be ejected from the high pressure accumulator unit 280 varies with temperature. It is very difficult to accurately measure a temperature in real-time or near real-time within hydraulic drive system 102 in association with the operation of high pressure accumulator 138. Thus, a different approach, based on a pressure compensation, is disclosed below to accurately control the flow from the accumulator 238 and to stop it before the activation of switch 284. Nevertheless, if the pressure within accumulator 138 and associated conduits 223 and 260 does drop toward zero, resulting in activation of switch 284 to close accumulator unit 280 from additional outward flow then two things occur: first the condition is used to adjust the pressure threshold such that such an excessive flow is prevented in the future as discussed with respect to temperature compensation for pressure limits, below; and second, a precharge operation such as discussed below is required.

Low pressure accumulator or reservoir 134 represents the termination of the "low pressure" side of hydraulic drive system 102 in association with conduits 215 and 268. As discussed in more detail below, conduit 215 is used to provide hydraulic fluid to low pressure reservoir 134 by way of filter assembly 136 while conduit 268 represents the pathway by which fluid is removed from the reservoir such as that necessary to charge high pressure accumulator 138.

When element 134 is a reservoir, as shown in the exemplary system 102, it includes a hydraulic fluid level sensor 286 and a hydraulic fluid temperature sensor 288. The sensors may be analog or digital or of any type performing the requested function. In general, the type of sensors used within hydraulic drive system 102 is not intended to be limited to that illustrated. The level of fluid within reservoir 134 increases as motoring takes place and decreases as pumping removes fluid from the reservoir to recharge high pressure accumulator 138. The fluid level is also increased when hydraulic drive system 102 is shut down. Typically, the temperature of the hydraulic sensor will increase as hydraulic drive system 102 is utilized, but is also influenced by outside environmental conditions such as ambient temperature.

Transfer case 128 and several of its elements were discussed above with respect to FIG. 1. Transfer case 128 represents the interface between the mechanical portions of the vehicle drive system 110 and hydraulic drive system 102. Intermediate shaft 202 forms a portion of the vehicle driveline 116. Shaft 202 is selectively engaged to hydraulic drive system 102 by way of a clutch 208. In the illustrated system, clutch 208 is pneumatically operated by way of a clutch solenoid 290 forming part of a clutch valve 292, the activation signal of which is generated by controller 140 as shown in FIG. 3. When aggressive clutching of the type discussed below is utilized within hydraulic drive system 102, then solenoid 290 is preferably based on pulse width modulation (PWM) so that it can be selectively and gradually applied. Otherwise, a simpler on/off solenoid controls a mechanical, dog-type clutch. A corresponding Confirmation that the clutch has engaged is determined using digital clutch sensor 294, which is input into controller 140 as a transfer case status switch digital signal. Gearing 210 is shown using a two-stage reduction so as to provide an appropriate balance between the rotational speed and associated torque of shaft 206, which is connected to pump-motor unit 217 and charge pump 204. Other gear ratios may also be used depending on the arrangement desired and the nature of the pumps. Shaft 206 selectively rotates. It will not always be rotating even if shaft 202 is rotating. On the other hand, it is possible for shaft 206 to rotate even if shaft 202 is not rotating. Clutch 208 and gearing 210 provide the interface between shafts 202 and 206.

To determine the speed of shaft 206, a speed sensor 296 is used. The speed of shaft 206 is then input as a timer input into controller 140, as shown in FIG. 3. Typically, the speed of shaft 206 is measured in revolutions per minute although other units of measurement may also be used. Speed sensor 296 provides another mechanism to determine if clutch 208 has engaged, even if clutch sensor 294 suggests that the clutch has engaged. Associated with clutch 208 is a clutch solenoid 290, which is selectively activated by controller 140, as shown in FIG. 3.

Still referring to FIG. 2, the pump-motor unit 217 includes a port (designated "A"), which is connected by means of the "high pressure" level conduit 248 to the mode control valve 232. The pump-motor unit 217 also includes another port (designated "B") which, by means of the "low pressure" conduit 270, is in fluid communication with the filter assembly 136 after passing through the charge by-pass pilot 264 and charge by-pass valve 262, and into "low pressure" conduit 217.

Generally, as shown by the appropriate arrowed lines associated with the fluid flow in FIG. 2 for "pumping" and "motoring", when the pump-motor unit 217 is in the pumping mode, the port A is the pressurized, outlet port (see arrows in pump symbol in FIG. 2), and when the unit is in the motoring mode, the port A is the pressurized, inlet port and the port B is the exhaust, outlet port.

At this point, to provide background for the discussions of particular aspects of hydraulic drive system 102 that follow, the general operation of the hydraulic drive system during routine motoring and pumping will be summarized with respect to FIG. 2. The discussion that follows assumes that accumulator 138 is already charged beyond a certain minimum threshold pressure since a typical pumping operation is illustrated first. The ability to efficiently precharge hydraulic system 102 during what would typically be a motoring operation if accumulator 138 is less than a minimum threshold pressure is discussed below.

As mentioned previously, when the vehicle 100 is neither decelerating nor accelerating, the pump-motor unit 217 and charge pump 104 are de-clutched, by the mechanism of a clutch 208. With the pump-motor unit 217 and charge pump 204 de-clutched from the intermediate drive shaft 202, the overall vehicle drive system 110 shown in FIG. 1 operates in the same manner as if the hydraulic drive system 102 were not present.

When the vehicle operator begins to perform a braking operation which is represented in FIG. 3 with respect to the illustration of the vehicle brakes 302 and a corresponding brake sensor 304 showing the degree of requested braking in an analog format, one result is that the clutch 208 is actuated using clutch valve 292 by way of solenoid 290, such that the pump-motor unit 217 is now clutched to the drive-line system 116 (i.e., to the intermediate drive shaft 202). As discussed below, it has been determined that there are undesirable inefficiencies in applying the clutch in a traditional manner. To reduce those inefficiencies, in one exemplary approach hydraulic system 102 implements what may sometimes be referred to as aggressive clutching.

Once clutch 208 is applied, an appropriate command signal is provided by controller 140 to pumping solenoid 226 of swash control valve 222, displacing the swash-plate 216 in a "negative" direction such that the rotation of the intermediate drive-line 202 (with the vehicle moving in a forward direction) causes the pump-motor unit 217 and the charge pump 204 to pump pressurized fluid from the port A to the conduit 248. The fluid is pulled from low pressure reservoir 134 by way of conduit 268 and first passes through charge pump 204 before reaching port B of the pump-motor 217 by way of "low pressure" conduit 270, where it enters the pump motor unit.

The displacement of the swash-plate 216 (and therefore, the fluid output per rotation of the drive-line 202) is typically proportional to the extent to which the vehicle operator depresses the brake pedal. It is known how to set the displacement of the swash-plate 216 proportional to the brake torque applied by the operator, or to the displacement of the brake pedal, and therefore further discussion of the displacement of the swash-plate 216 is not necessary herein.

With the charge pump 204 and pump-motor unit 217 in the pumping mode, pressurized fluid communicated through the conduit 248 unseats a poppet member in the mode control valve 232, such that the pressurized fluid flows into the conduit 223, and thereby pressurizes the high pressure accumulator 138. At the same time, conduit 260 is also charged with the pressurized fluid, but the fluid flow does not take place along this conduit.

At the completion of the deceleration portion of the braking cycle (pumping mode), the vehicle operator may release the brake pedal 302 and subsequently begin to depress the accelerator. This event is represented as one of the possible CAN message inputs to controller 140 discussed above with respect to FIG. 3. Controller 140 communicates an appropriate signal to swash control valve 222 by way motoring solenoid 224, which uses pressure to command the pump-motor unit 217 to transition from the pumping mode (described previously), to the motoring mode.

In the motoring mode, the swash-plate 216 is disposed at an angular inclination opposite that which existed when the unit was in the pumping mode (i.e., the swash-plate 216 goes "over-center" to a positive angular inclination). When the pump-motor unit 217 is in the motoring mode, the swash-plate 216 is displaced such that flow through the pump-motor unit 217 (from port A to port B) will cause the pump-motor unit to transmit torque to the drive-line shaft 202, tending to drive the intermediate shaft 202 of the drive-line system 110 in a direction corresponding to the same forward movement in which the vehicle is already engaged. By way of example only, the swash control valve 222 is constructed such that pressurized fluid can always flow from the conduit 248 to the conduit 223 (i.e., the pumping mode). However, only when the mode pilot valve 236 receives an appropriate input signal to its solenoid is there an appropriate pilot signal to solenoid 238. The pilot signal assists in the opening of the poppet member of mode valve 232 to permit relatively unrestricted flow of high pressure fluid from the accumulator 138 through the conduit 223, and then through the conduit 223 to the port A (inlet port in motoring mode) of the pump-motor unit 217.

Energy stored within the high pressure fluid is transferred through pump-motor unit 217 to rotating shaft 206. The energy is transferred mechanically through gearing 210 and to intermediate shaft 202 when clutch 208 is applied. The energy is then transferred along drive-line system 110 to wheels 104.

The "low pressure" fluid exits pump-motor unit at port B into conduit 270. It then passes through charge by-pass valve assembly 262, which has been opened as opposed to its state during pumping and into conduit 215 where it then goes through filter assembly 136 and into low pressure reservoir 134.

Logical Inputs and Outputs into the HLA Controller

Figure 4:
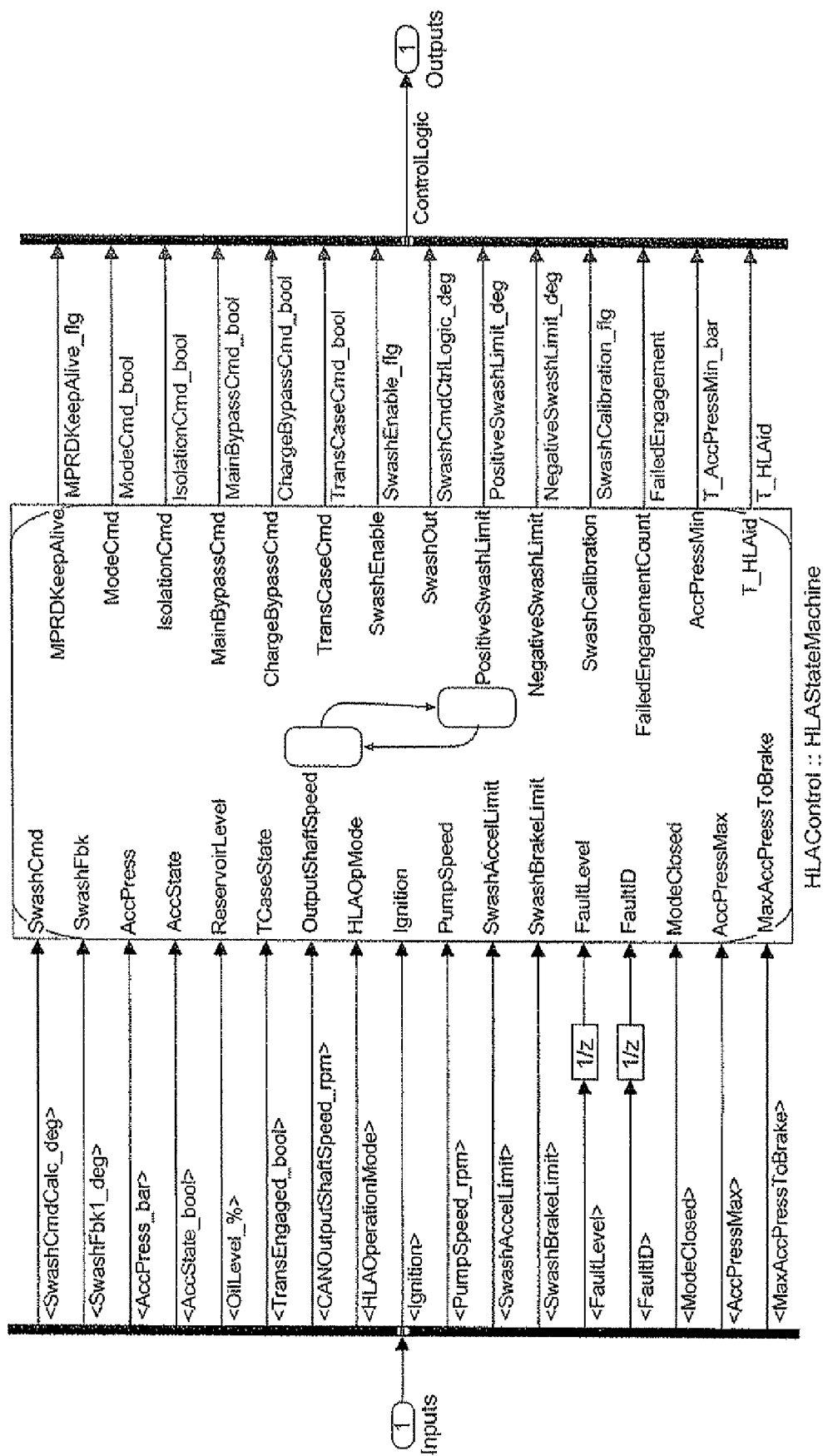
FIG. 4 illustrates various exemplary logical inputs and outputs into a controller associated with a hydraulic drive system.

An overview of the control logic associated with controller 140 is illustrated in FIG. 4, which illustrates at least a subset of the various inputs that may be provided to controller 140. Some of the inputs into the control logic of FIG. 4 are constants while others are variables. Rules implemented in controller 140, as discussed in greater detail below, result in the various outputs to elements illustrated in FIG. 2 by way of the specific inputs illustrated in FIG. 4. An overview of the various inputs identified in FIG. 4 is provided in Table 3, which follows. A number of the inputs are discussed in greater detail below with respect to specific operations associated with hydraulic drive system 102.

TABLE 3

Figure 12:
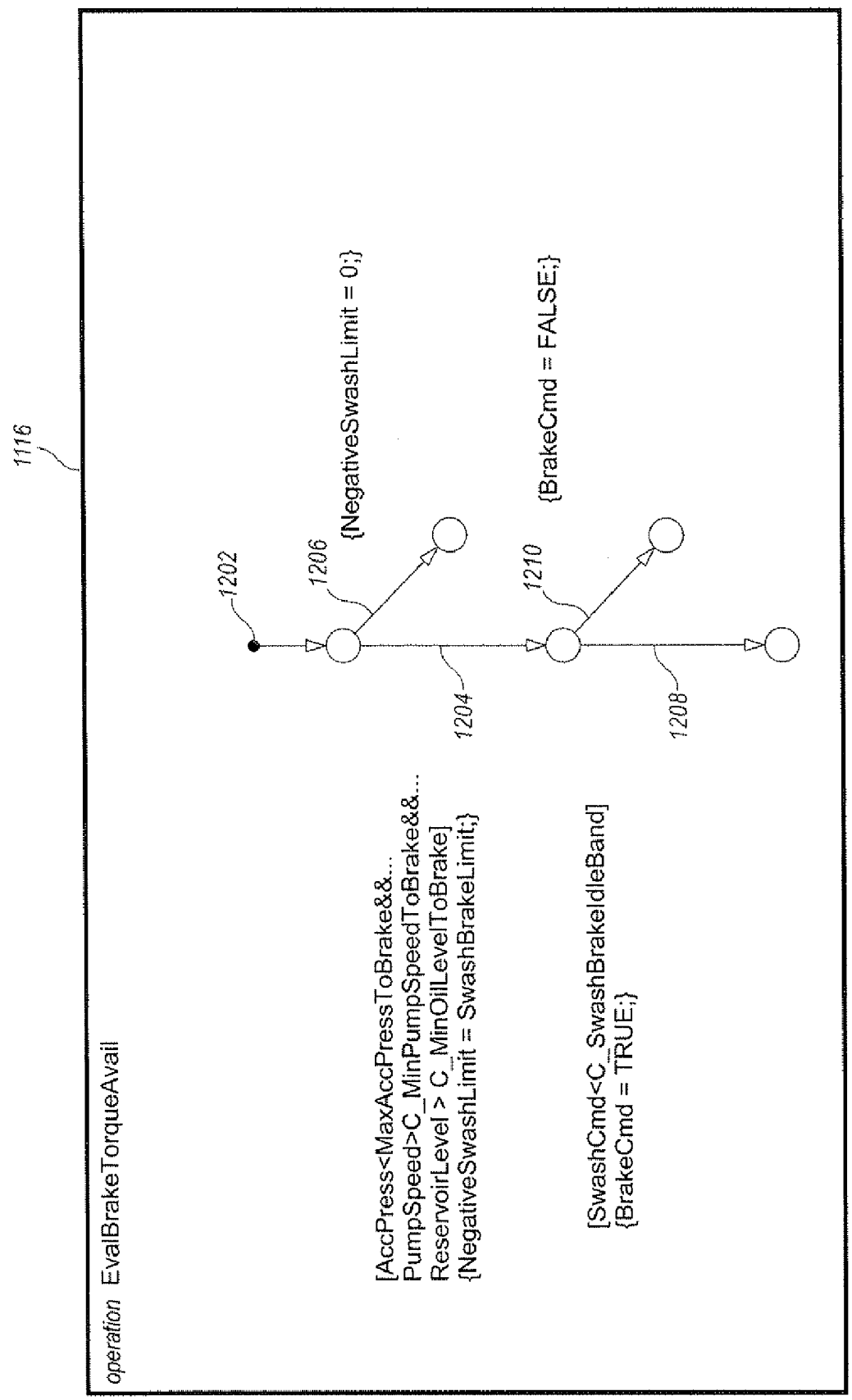
FIG. 12 is an exemplary flow of an operation EvalBrakeTorqueAvail associated with FIG. 11.
Figure 13:
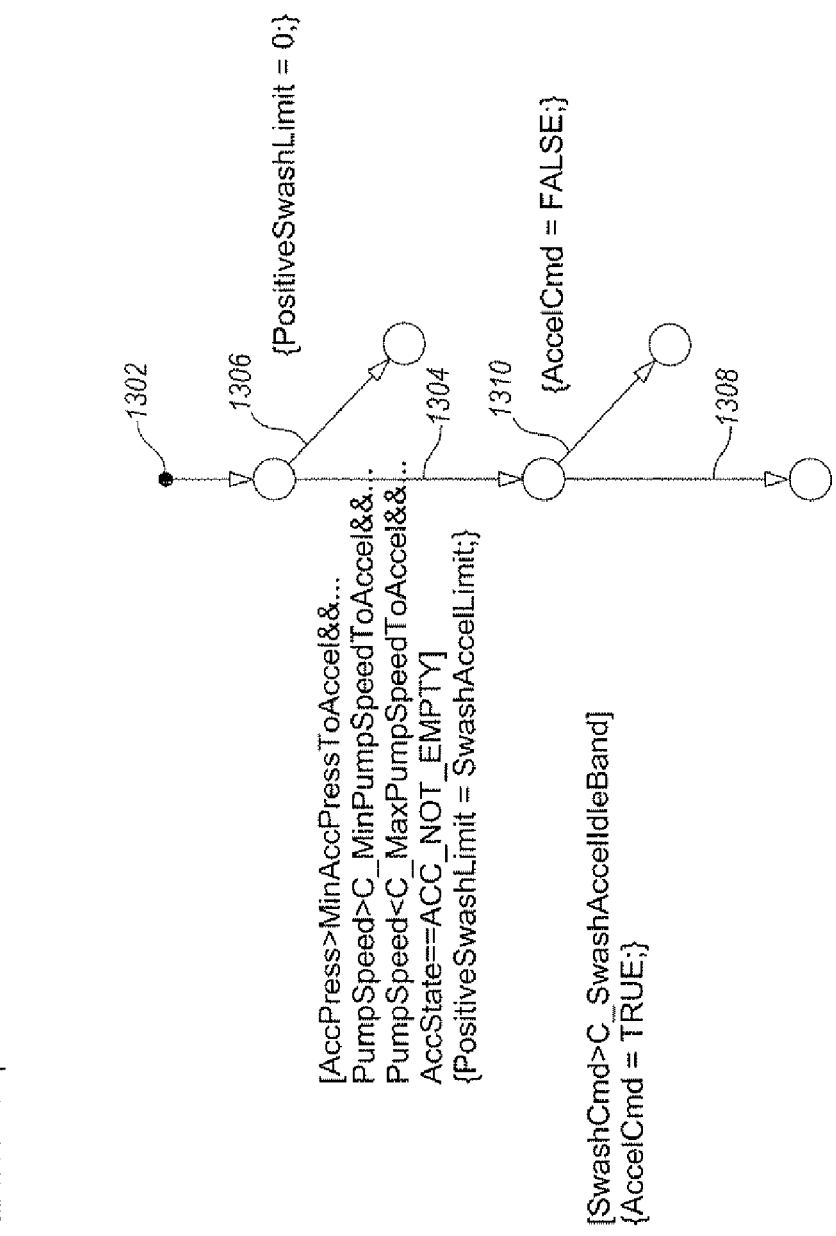
FIG. 13 is an exemplary flow of an operation entitled EvalAccelTorqueAvail associated with FIG. 11.

| Input | Comments |
|---|---|
| SwashCmd | This input results from a determination of a swash-plate position command, discussed below with respect to Equations 1, 2, and 3 in combination with FIG. 5. |
| SwashFbk | Sensor reading from sensor 218 and/or sensor 220. |
| AccPress | Sensor reading from sensor 282. |
| AccState | Signal from the high pressure accumulator proximity switch 284. The two states associated with the switch are "accumulator not empty" (ACC_NOT_EMPTY) and "accumulator empty" (ACC_EMPTY). During normal operation of hydraulic drive system 102 moving between motoring and pumping the switch should not change states into (ACC_EMPTY) unless the accumulator is undesirably bled below a threshold minimum pressure, meaning that more volume of hydraulic fluid has been removed from the accumulator unit 280 then desired at a particular temperature, as discussed with respect to FIGS. 7 and 8 below. |
| ReservoirLevel | Sensor reading from level sensor 296. |
| TCaseState | Signal input from t. case status switch (clutch sensor) 294. |
| OutputShaftSpeed | Input from the CAN representing the speed of shafts 124 and 126 to wheels 104. The shafts 124 and 126 selectively rotate depending on the application of mechanical energy within vehicle 100 and in drive-line 116. |
| HLAOpMode | This input is an internal variable. The controller 140 monitors a number of CAN signals and (gear, engine speed, ABS status, Cruise status, the HLA -On/Off switch) and tells the hydraulic drive system 102 whether or not it may operate. For example, if the system is in a normal operational mode then a flag "vsc_normal" is set. If the hydraulic drive system 102 is to shut down, there are two different ways for it to shut down. A so-called expedited "hard shutdown" takes place in a time-critical situation such as when the anti-lock brake system activates and the hydraulic drive system is to be overridden or when there is a loss of control of the hydraulic drive system 102. A so-called "soft shutdown" indicated by an input value of "VC_SOFT_SHUTDOWN" takes place when a cycle is first completed and then the system shuts down (e.g., a predefined temperature limit is exceeded). A vehicle operator is more likely to notice a "hard shutdown" then a "soft shutdown". |
| Ignition | This input tells controller 140 whether engine 112 is on or off, When the ignition is turned off, the pressure from the high pressure 238 is typically bled off, necessitating a precharge mode when the hydraulic drive system is reactivated as discussed below. |
| PumpSpeed | Relates to the speed of pump-motor unit 217 and is a measurement provided by sensor 296. |
| SwashAccelLimit | This input represents the maximum angular displacement that is permitted based on conditions affecting hydraulic drive system 102 (e.g., accumulator pressure 282, high pressure proximity accumulator state 284 and faults detected) and the speed of pump-motor 217 during motoring mode. If the speed is greater than a desired threshold (e.g., greater than 2000 revolutions per minute (RPM)), the maximum angular displacement is typically decreased from the maximum permitted for the particular swash pump-motor 217 to minimize the possibility of damage to the pump-motor unit. Normally, the pump has a displacement that ranges between +/− fifteen (15) degrees. For motoring, the convention used in the present application is that it has a positive angular displacement. The specific SwashAccelLimit is directly derived from the mechanical operation of the pump-motor 217 and is typically associated with a lookup table. See FIG. 13 and FIG. 23. |
| SwashBrakeLimit | This input represents the maximum angular displacement that is permitted based on conditions affecting hydraulic drive system 102 (e.g., accumulator pressure 282, high pressure proximity accumulator state associated with switch 284 and faults detected) and the speed of pump-motor 217 during pumping mode. It is measured based on a negative angular displacement using the convention of the present application. The discussion with respect to SwashAccelLimit is applicable here. See FIGS. 12 and 17. |
| FaultLevel | This input represents a fault from a fault management routine. Some faults are hardware related (e.g., a failure of one of the sensors, solenoids or a hardware fault communicated by the CAN). Other faults relate to logic issues from system operationality where an expected output (e.g., movement of swash-plate 216) does not follow from a command to move the swash-plate. In one exemplary approach, one type of fault level may be designated as fault level "1" while a different type of fault level may be designated as fault level "2". If there are no faults then the variable FaultLevel is set to "0" (neither "1" nor "2"). A fault will also result under other conditions, such as too little hydraulic fluid in system 102 as determined by level sensor 286 within low pressure reservoir 134. |

TABLE 3-continued

| Input | Comments |
|---|---|
| FaultId | An input giving the fault identification. |
| ModeClosed | An input that is based on a determination that mode valve 232 is closed. |
| AccPressMax | This is an input into controller 140 coming from a table taking into account the temperature. At different temperatures this number is different. At this pressure the pumping mode is exited. In one exemplary approach the maximum pressure is 5000 PSI. An exemplary graph showing how the input may be provided in Bars at various temperatures in degrees Celsius follows: |

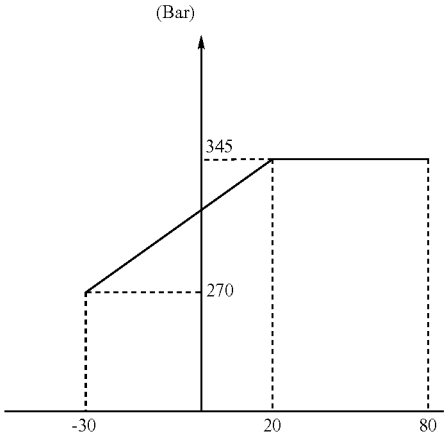

| Input | Comments |
|---|---|
| MaxAccPresstoBrake | This is an input into controller 140 coming from a table that takes into account the temperature. At different temperatures this number is different. It is the maximum pressure at which the hydraulic drive system 102 can still enter into pumping mode. This is also the pressure at which, if the system is in a pumping mode, it will enter the exit state. In one exemplary approach, it uses the same graph as for AccPressMax, but the pressures are offset by a negative 25 Bars. Thus, for example, the values at the transition points would be: 270-25, 345-25 and 345-25. |
| MinAccPressToAccel | |
| MinAccPressToMotor | This is actually an internal variable related to the temperature compensation heuristic discussed below with respect to FIGS. 7__and 8__. It is the minimum pressure at which the hydraulic drive system 102 can still enter into motoring mode. It is also the pressure at which, if the system is in motoring mode, it will enter into an exit state. Typically this variable is set equal to the value of AccPressMin plus an offset. |
| OilTemp | The temperature measured by sensor 288 in reservoir 134. |

Table 4 provides an overview of the various outputs of controller 140 identified in FIG. 4. A number of the outputs are discussed in greater detail below with respect to specific operations associated with hydraulic drive system 102.

TABLE 4

| Output | Comments |
|---|---|
| MPRDKeepAlive | An output from controller 140 to the main power relay driver circuit (MPRD) of vehicle 100. When the ignition of vehicle 100 is turned off controller maintains this signal high (MPRDKeepAlive) to indicate to the MPRD circuit that it must not yet turn off the power on the actuators associated with the system until a controlled shutdown of hydraulic drive system 102 takes place. Among other things, accumulator 138 is bled, and controller 140 also ensures that the various valves are turned off in a particular sequence, beginning first with mode valve 230. |

TABLE 4-continued

| Output | Comments |
|---|---|
| ModeCmd | Signal to mode valve solenoid 238. Condition "ON" means the mode valve 230 is open. |
| IsolationCmd | Signal to isolation valve solenoid 244. Condition "ON" means the valve 242 is set to open. |
| MainBypassCmd | Signal to bypass valve solenoid 252. Condition "ON" means the bypass valve 250 is set to closed. |
| ChargeBypassCmd | Signal to charge valve solenoid 266. Condition "ON" means the charge by-pass valve 263 is set to closed. |
| TransCaseCmd | Signal to clutch valve solenoid 292. Condition "ON" means apply in an ON/OFF mode. However, in one example discussed below involving aggressive clutching, clutch 208 is a hydraulic clutch and the solenoid is a PWM solenoid. |
| SwashEnable | A flag related to enablement of a closed loop swash control for displacement of swash-plate |

TABLE 4-continued

Figure 6:
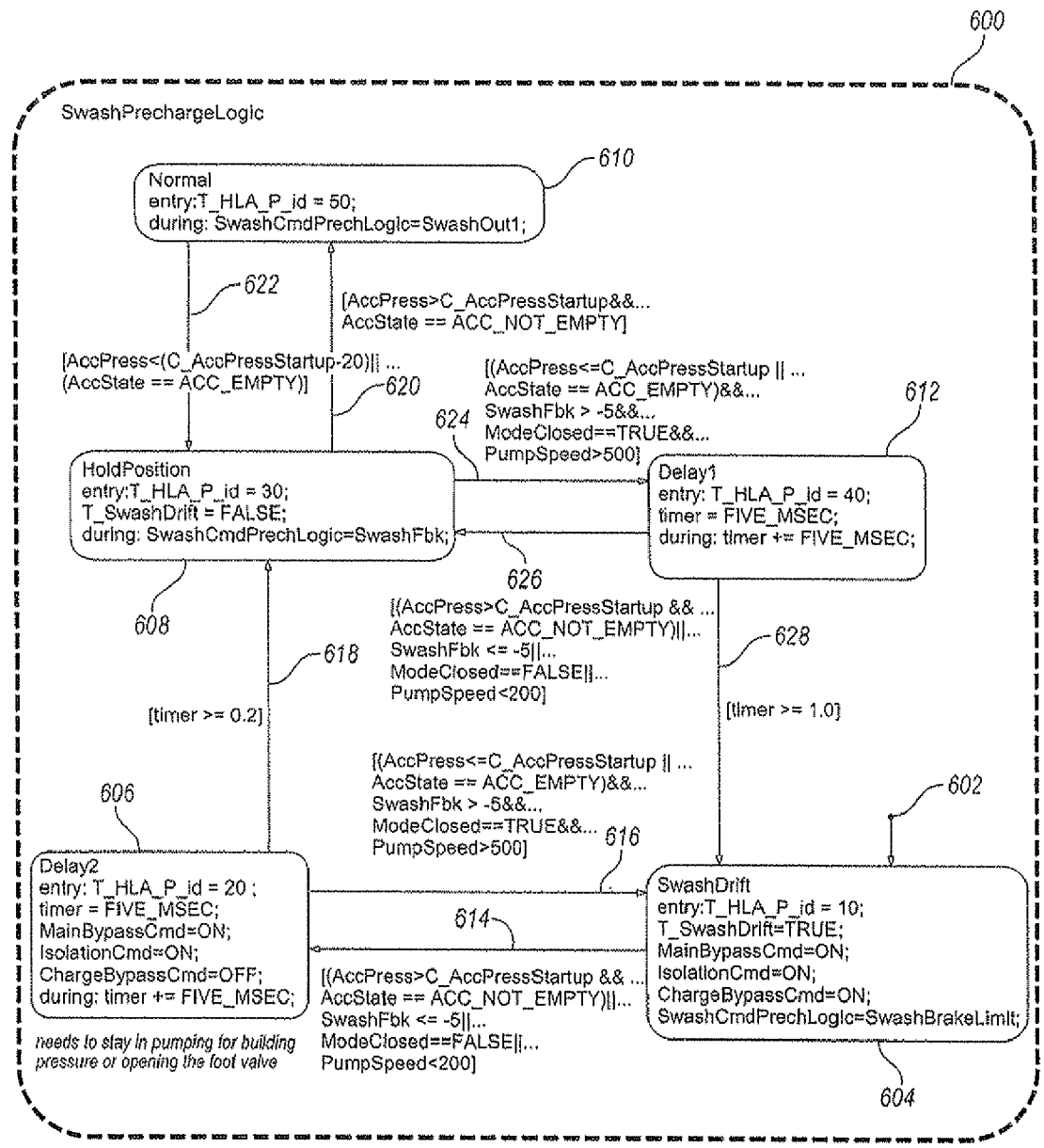
FIG. 6 is an exemplary flow diagram related to precharge logic

| Output | Comments |
| --- | --- |
|  | 216. The flag is generally set to "TRUE" if the hydraulic drive system 102 is in normal operation even if the swash-plate is in its neutral orientation. There are some cases where the flag is set to "FALSE" such as when the precharge logic is utilized. (FIG. 6). In the example where precharge logic is active the swash-plate is left in the pumping orientation even though there is insufficient pressure to maintain that position. If the flag were set to "TRUE" a FaultLevel would be set stating that the swash-plate cannot be "controlled" to the desired position. Thus, when SwashEnable is set to "FALSE" the swash-plate 216 is uncontrolled. Therefore, it may be commanded to an orientation even though the conditions are not generally preferable for such an orientation. |
| SwashOut | The Set Point for the closed loop position control of the swash-plate 216. |
| PositiveSwashLimit | An output to pump-motor unit 217 giving the maximum swash-plate angular displacement based on pump speed as measured by sensor 296. If a pump-motor normally has a possible displacement in the range of +/- fifteen (15) degrees, then the actual acceptable angular displacement will be decreased as pump speed goes up to minimize possible damage to the pump-motor. Typically a look up table is used based on the mechanical operation of the pump. This output relates to the motoring mode and represents positive angular displacement. See FIG. 23. |
| NegativeSwashLimit | See PositiveSwashLimit. However, the output relates to the pumping mode and represents negative angular displacement. See FIG. 17. |
| SwashCalibration | A flag associated with the calibration of the swash-plate 216 as part of the heuristic NeutralDriftCalibration 900 discussed below with respect to FIGS. 9 and 10. The two conditions for the flag are "FALSE" and "TRUE". The flag is set in operational realm 1108 of FIG. 11 when the motoring mode has been exited. |
| FailedEngagementCount | A flag indicating engagement failures related to clutch 208 and is used for fault detection and fault management. See, for example, the discussion of flow-line 3012. |
| AccPressMin | Output from the temperature compensation heuristic 800 discussed below with respect to FIGS. 7 and 8 and relates to the change in state for switch 284. When this pressure is measured by sensor 282 during the motoring mode, the system 102 then exits the motoring mode. |
| T_HLAid | This represents an identification signal for various states as illustrated below, which is used for debugging. |
| InletPress | The inlet pressure associated with clutch 208 measured by sensor 2928 when using a hydraulic clutch as part of a hydraulic circuit 2900 with aggressive clutching, as discussed with respect to FIGS. 29 through 35 below. |

Figure 5:
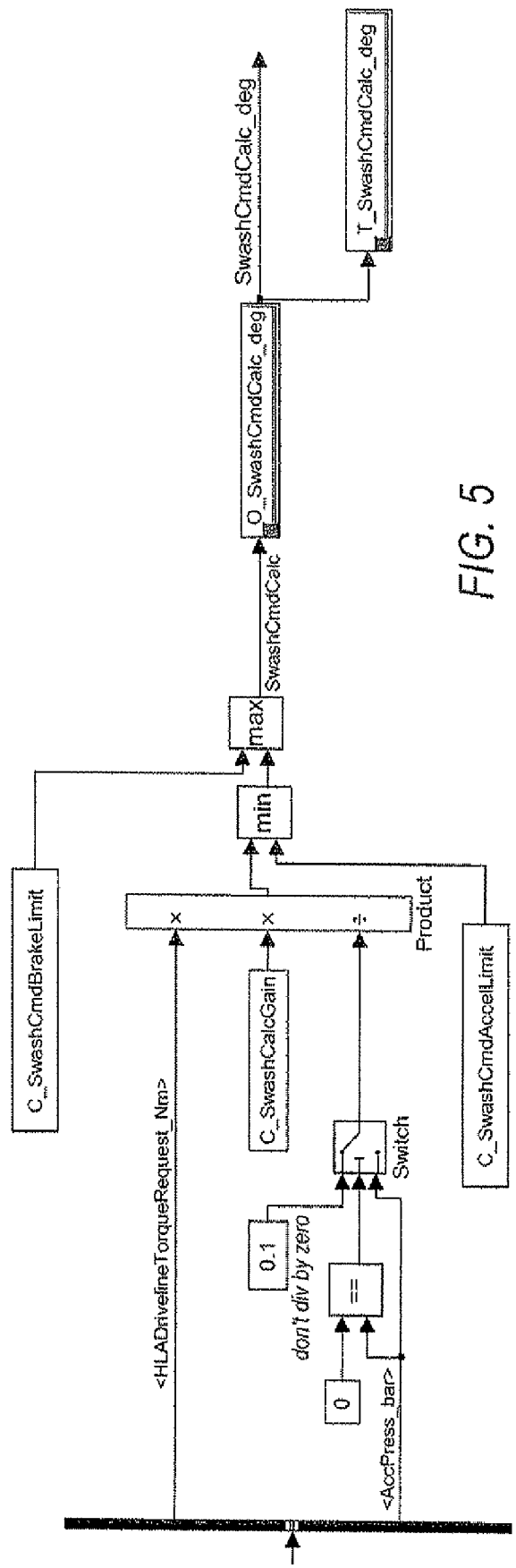
FIG. 5 is an exemplary flow diagram related to an explanation for a swash-plate position command known by the variable SwashCmd.

An example of a determination of a swash-plate position command SwashCmd, first discussed with respect to Table 3 above and used as an input for controller 140, is now discussed with respect to FIG. 5. In general, an operator request for torque is translated into a swash displacement determination whereby the torque equals a pressure divided by the product of hydraulic displacement and a constant. When there is no request for torque, the swash-plate position command shall be zero (0) degrees.

More specifically, there are two inputs into making a determination of angular displacement of swash-plate 216. The first input is a driver request for torque, i.e., a torque command (Nm). The request for torque may be as a result of either driver braking or driver acceleration. Possible inputs include that from brake pressure sensor 304 in FIG. 3, or the CAN message related to accelerator pedal position. The second input, "AccPress_bar", accumulator pressure (bar), is "AccPress," measured from sensor 282 in FIG. 2 as shown at 504. The swash position command shall be zero "0" degrees when the vehicle torque command is zero. Otherwise, in one illustrated approach:

$$\text{Swash Command} = \text{Torque Command}(Nm)/(K*\text{Accumulator Pressure}(bar)) \qquad \text{Equation 1}$$

Where
K=250 cubic centimeters/revolution*TransferCaseRatio/2*pi*10*(15) deg, and for an exemplary transfer case, TransferCaseRatio=2.55.

Thus, an acceleration torque command results in a positive swash command and a braking torque command results in a negative swash command.

Once a Swash Command is calculated, however, there has to be a potential adjustment related to saturation for acceleration. In particular, the swash position command shall be saturated to a SwashLimit value, where the SwashLimit is if PumpSpeed<2500 RPM then SwashLimit=15 deg if PumpSpeed>3000 RPM then SwashLimit=0 if 3000 RPM>PumpSpeed>2500 RPM then
  SwashLimit decreases linearly from 15 deg to
  7.5 deg. $\qquad$ Equation 2

The values of 2500 RPM, 3000 RPM, 15 degrees and 7.5 degrees are merely exemplary. The values will depend on the actual characteristics of pump-motor 130, but are chosen to prevent inadvertent damage or inappropriate long-term wear issues to the pump-motor. Nevertheless, the values will generally be proportionally adjusted depending on the specific pump-motor 217. For example 7.5 degrees is half of 15 degrees.

Similarly, once a Swash Command is calculated, there has to be a potential adjustment related to saturation for braking. The swash position command shall be saturated to a SwashLimit value, where the SwashLimit is if PumpSpeed<2500 RPM then SwashLimit=-15 deg if PumpSpeed>3000 RPM then SwashLimit=0 if 3000 RPM>PumpSpeed>2500 RPM then
  SwashLimit varies linearly from -15 deg to -7.5
  deg. $\qquad$ Equation 3

As illustrated in FIG. 5, the torque command is HLADrivelinTorqueRequest_Nm, the accumulator pressure is "AccPress_bar", constant K is C_SwashCalcGain, the saturation for acceleration is C_SwashCmdAccelLimit and the saturation for braking is C_SwashCmdBrakeLimit.

Once again, the values of 2500 RPM, 3000 RPM, -15 degrees and -7.5 degrees are merely exemplary. The values will depend on the actual characteristics of pump-motor 130 as noted above.

Thus, a preliminary value will first be calculated in accordance with Equation 1 if thresholds related to the inputs for torque and accumulator pressure are met. Then a determination related to saturation for acceleration is made in accordance with Equation 2. The minimum value of the results of Equations 1 and 2 is determined. The minimum value is compared to the calculation for braking in accordance with Equation 3 and the maximum value is used. The resulting maximum value is typically used as the input for SwashCmd within controller 140 as shown in Table 3.

Under some circumstances, however, the input for Swash-Cmd is overwritten by certain rules, often based on conditions being detected within hydraulic drive system 102, such as when high pressure accumulator 138 is first being charged at start up, or when they hydraulic drive system is being shutdown.

Precharge Logic

The discussion above concerning the pump mode and the motoring mode of hydraulic system 102 assumed that the hydraulic drive system 102 was in a normal operating state. A more detailed discussion of the exiting from either a normal motoring mode or a normal pumping mode is discussed beginning with FIG. 11. However, when system 102 is not in such a state it advantageous to precharge high pressure accumulator 138. In the context of the present description precharge relates to the need to add some amount of hydraulic fluid so that the fluid has a sufficiently high pressure threshold to activate and otherwise operate the various hydraulic controls (e.g., valve actuation) within the hydraulic drive system 102 that are powered by hydraulic fluid from the accumulator 138.

For example, when hydraulic drive system 102 does a controlled shutdown upon the turning off of a vehicle ignition, it is desirable to drain the high pressure accumulator 138 to inhibit undesirable wear to the accumulator or other components within hydraulic drive system 102, provide ease of servicing and related issues. Accumulator 138 needs to be re-pressurized upon re-activation of the hydraulic drive system 102. Similarly, while a temperature compensation methodology is discussed below with respect to the desirable operation of high pressure proximity switch 284, at times the pressure within the high pressure accumulator 138 may drop below a predetermined minimum threshold, again requiring precharging high pressure accumulator 138

Operation of a precharge logic heuristic 600, entitled SwashPrechargeLogic, is illustrated with respect to FIG. 6. In general, the flag SwashEnable is initially set to "FALSE." (Table 4). The swash-plate 216 is set to a desired angular orientation in the pumping direction and the necessary valves are placed in the proper orientation to permit the pumping cycle to take place even as the vehicle 100 is actually motoring. Thus, when precharging is taking place, some of the increased level of energy generated by the engine 112 passing through drive-line 116 as mechanical energy is diverted to the hydraulic drive system 102 as hydraulic energy. Once precharging takes, place, however, normal motoring and pumping modes take place as discussed in greater detail herein beginning with FIG. 11.

Precharge logic heuristic is required because there is no control over the swash-plate 216 when the accumulator 138 is discharged. As noted above, control of the swash-plate 216 requires hydraulic fluid from the accumulator 138 to operate. Hence, it is a type of boot-strapping. If there were adequate swash control with a discharged accumulator 138, it would not be as inefficient to just wait until a first braking event for vehicle 100 where the hydraulic drive system 102 is already designed to charge the accumulator 138.

An entry point 602 to the SwashPrechargeLogic heuristic 600 is illustrated in FIG. 6. Preferably, heuristic 600 is always active within controller 104 and available for use when necessary by the system 102. Various operational realms associated with SwashPrechargeLogic heuristic 600 are represented by the encircled regions 602, 604, 606, 608, 610.

In the flows that are illustrated in the various figures, the term "operational realm" refers to a system state. However, additional states can exist within each of the operational realms. Moreover, yet other states can exist within the states described below. Thus, the terms "operational realm", "state" and "box" are used to provide guidance concerning the level being discussed within hydraulic drive system 102 for the indicated topic. States are described within operational realms and boxes are described within states. If an encircled region for an operational realm, state or box is in bold, typically there is a more detailed discussion in an accompanying figure. Within an operational realm, state or box, it is possible to have an operation, which is represented by a rectangular box within the indicated flow. Often, the operation is then discussed in more detail in a separate figure, particularly when the rectangle is bold.

A title for each operational realm is provided in the first line of information in each operational realm 604, 606, 608, 610, and 612. The second line, entitled "entry: T_HLAP_id" is used for debugging purposes and need not be discussed further herein. The other lines of information in each box provide conditions to be applied when in the operational realm and will be discussed as appropriate. The term "during:" represents an instruction to perform the processing indicating by the instruction following the ":" while in the operational realm represented by the relevant encircled region 604, 606, 608, 610, and 612. More specifically, the term "during:" refers to actions that are executed when a state receives an event while it is active with no valid transition away from the state. Finally, the term "exit:" refers to actions executed when a state is exited as the result of a transition taken away from the state.

Between each of the operational realms 604, 606, 608, 610, and 612 are one or more arrowed flow-lines, labeled respectively as 614, 616, 618, 620, 622, 624, 626 and 628. Each of the flow-lines has conditions associated with it that are generally associated with Boolean operators.

Boolean operators are represented in generally known ways. For example, the operator "AND" is represented by the designation "&&"; the operator "OR" is represented by the designation "||"; the operator "EQUAL TO" is represented by the designation "=="; the operator "NOT EQUAL TO" is represented by the designation "~=" the operator "LESS THAN" is represented by "<"; the operator "GREATER THAN" is represented by ">"; the operator "LESS THAN OR EQUAL TO" is represented by the operator "<="; the operator "GREATER THAN OR EQUAL TO" is represented by the operator ">=". The designation " . . . " simply indicates that the conditions that need to be satisfied are continued on the next line of text. The conditions associated with a particular flow-line are bracketed by square brackets "[ ]".

When entering one of the operational realms, states or boxes discussed in more detail below, the term "entry:" refers to actions executed when a particular "operational realm", "state" or "box" is entered as the result of a transition taken to that state. The use of other Boolean operators or flow commands and a more detailed explanation of FIG. 6 and those of a similar nature also set forth herein will be clear to an individual of ordinary skill with respect to the program known as "StateFlow" and more particularly to version 6.4 of the program. "StateFlow" is provided by The MathWorks, Inc., 3 Apple Hill Drive, Natick, Mass. 01760-2098. The user guide and related reference materials for "StateFlow" and more particularly version 6.4 of the program are incorporated herein by reference. Additional information can also be located at the URL http://www.mathworks.com/products/ stateflow/. The logic associated with FIG. 6 applies equally to other figures discussed below with respect to other aspects of hydraulic drive system 102.

When hydraulic drive system 102 is activated such as after a shutdown of vehicle 100 and the vehicle ignition is turned on as captured by the control logic of controller 140 in FIG. 4, controller 140 invokes SwashPrechargeLogic heuristic 600 at point 602. The SwashPrechargeLogic heuristic 600 then in turn enters the operational realm 604, entitled SwashDrift. A flag T_SwashDrift is set to "TRUE". In general terms and as also illustrated by the command SwashCmdPrechLogic= SwashBrakeLimit using the variable SwashCmdPrechLogic, when the flag is set to "TRUE" a command is sent to the swash-plate 216 by controller 140 asking it to go to a maximum available angular displacement in the negative direction to facilitate pumping. In one exemplary embodiment the value is negative fifteen (−15) degrees, but the maximum available angular displacement will depend on characteristics of the pump-motor unit 217 and the value of SwashBrake-Limit as set forth in Table 3.

Similarly, the terms MainBypassCmd, IsolationCmd and ChargeBypassCmd have already been discussed with respect to Table 4 and they are set to "ON" as illustrated in FIG. 6. In summary, when solenoid 252 is "ON," hydraulic fluid cannot pass from the "high pressure" side to the "low pressure" side using by-pass valve 246, which is forced closed. When solenoid 244 is "ON," fluid may pass in either direction through isolation valve 242, not being limited to one way movement toward accumulator 138 by way of the illustrated check valve. When the bypass solenoid is "ON", the charge by-pass valve 262 is forced closed so fluid passing through the charge pump 204 does not simply go back into reservoir 134 via conduit 215.

Further, when in operational realm 604, when an operator of vehicle 100 commands an acceleration, the clutch 208 is activated, the vehicle starts to move, the pump-motor 217 and charge pump 204 begin to rotate about shaft 206 and precharging begins.

As precharge pumping takes place while in operational realm 604, fluid flows from reservoir 134, along conduit 268, through charge pump 204, along conduit 270, through pump-motor 130, along conduit 248, through mode valve 232 against the pressure of its spring, into conduit 223 and finally into the high pressure accumulator 138.

Heuristic 600 moves from operational realm 604 to operational realm 606, entitled Delay2, by way of flow-line 614. This transition occurs when one of the acceptable indicated conditions associated with flow-line 614 are met. In a first set of acceptable conditions, accumulator pressure AccPress must be greater than the constant C_AccPressStartup, and the state of high pressure accumulator switch AccState must equal "not empty". In one illustrated embodiment, the constant C_AccPressStartup is one-hundred bars. A second acceptable condition is that the sensor reading SwashFbk is less than equal to minus five degrees as measured from sensors 218 and/or 220. A third acceptable condition is that the mode valve is not actually closed (i.e., is set to "ON"). A final acceptable condition is that the speed PumpSpeed of pump-motor unit B17 measured from sensor 296 is less than 200 RPM. The pump speed is used with heuristic 600 since a minimum speed is required for pressure increase within the high pressure accumulator 130 to take place. The actual speed required will vary with characteristics of the pump-motor 130, charge pump 204 and other aspects of system 102.

When high pressure accumulator 138 begins to fill using the SwashPrechargeLogic heuristic 600, the valve associated with switch 284 only begins to open when the pressurized flow along conduit 223 begins to open it. This is done to protect the bladder associated with accumulator unit 280 such as when a pressurized gas arrangement is utilized. In one approach accumulator unit 280 has a bladder that contains nitrogen. However, even if the valve opens, the switch will not change states between "accumulator empty" and "accumulator not empty" by way of AccState (as described in Table 3) until a minimum threshold pressure is met. During normal motoring and pumping modes switch 284 will stay in the "accumulator not empty" state because the minimum threshold pressure continues to be met. A different heuristic is discussed below with respect to FIGS. 7 and 8 that helps to ensure that the switch state does not change even with changes in temperature. If the heuristic fails, however, then the SwashPrechargeLogic heuristic 600 becomes active.

Once in realm 602, a timer is set during which solenoid 252 is set to "ON," the isolation solenoid 244 is set to "ON," but the charge by-pass solenoid 266 is set "OFF." Thus, fluid can now pass into reservoir 134 through conduit 215 from conduit 270. Other time periods of delay can be used. The use of five milliseconds is merely exemplary. In selecting a time period for delay it is important to have a set period of delay to eliminate potential false signals or noise on the various switch indicators before moving into operational realm 608, or if more time is required to build up accumulator pressure. Thus, as illustrated, it is possible to pass either back to operational realm 604 or move on to operational realm 608 from operational realm 606.

System 600 will move back to operational realm 604 as represented by flow-line 616 if the following conditions are met. First, either the accumulator pressure must be less than the constant C_AccPressStartup, or switch 284 must be in the accumulator empty state. If either condition is met and (i) the angular displacement of swash-plate 216 is greater than negative five (5) degrees; (ii) the mode valve 232 is closed, meaning that solenoid 238 is not activated, and (iii) the speed of motor-pump unit 217 is greater than a predetermined value such 500 RPM as measured by sensor 296, then the position of swash-plate-216 should be adjusted. A SwashDrift correction is again required at operational realm 604.

Once the timer shows a time greater to or equal to 0.2 seconds without any conditions requiring a return from operational state 606 to operational state 604 by way of flow-line 616 then, as represented by flow-line 618 the system 600 moves to operational realm 608, entitled HoldPosition. The time period of 0.2 seconds is merely exemplary. It is selected as a long enough time, however, to provide confidence that further use of the SwashDrift operational realm 604 is not required.

At operational realm 608 the flag T_SwashDrift is set to "FALSE." The flag prevents any specific control of the swash-plate 216. Then, while in the operational realm 608, the variable SwashCmdPrechLogic is set equal to the sensor reading SwashFbk from sensors 218 and/or 620. While in this operational realm the SwashPrechargeLogic heuristic 600 waits until the high pressure accumulator starts to fill and become pressurized. Thus, the flag T_SwashDrift is typically set to "FALSE" for normal motoring or pumping operations. However, as with the flag SwashEnable (Table 4), there are times when it is desirable to have an override of the normal operation of hydraulic drive system 102 between the motoring mode and the pumping mode. When T_SwashDrift is set to "TRUE," precharging takes over and sets both the valves and the orientation of swash-plate 216.

Generally control will pass from operational realm 608 to operational realm 610, entitled Normal, along flow-line 620. As shown in association with flow-line 620, control passes between operational states 608 and 610 when the accumulator pressure AccPress is greater than constant C_AccPressStartup and the switch 284 is in the accumulator not empty state.

Normally, while the vehicle 100 is operating normally between various motoring and pumping modes, system 600 will stay in operational realm 610 and the variable SwashCmdPrechLogic will equal SwashOut1. SwashOut1 is preferably set at a predetermined constant rate, which applies when hydraulic drive system 102 moves out of pumping or motoring mode and is used to make sure that the displacement of swash-plate 216 does not vary too quickly.

SwashPrechargeLogic heuristic 600 will leave operational state 610 to return to HoldPosition operational realm 608 by way of flow-line 622 only if one of two conditions is met. The first condition is met if the pressure of accumulator 138 becomes less than the constant C_AccPressStartup minus a predetermined offset. In the illustrated system the offset is twenty (20) bar. The second condition is met if high pressure accumulator proximity switch 284 enters the accumulator empty state.

Apart from transition to operational realm 610, there is a second way to leave the HoldPosition operational realm 608, i.e., by way of flow-line 624. Such transition occurs only if controller 140 perceives a problem with pressure within the high pressure accumulator 138, e.g., the accumulator is the state "accumulator empty" or below the pressure represented by C_AccPressStartup. The conditions associated with flow-line 624 are the same as for flow-line 616 representing a transition between operational realms 604 and 606.

Operational state 612 is essentially a built-in time delay mechanism where, by of example, a time delay variable may be set to five (5) milliseconds. Control will return back to the HoldPosition operational state 608 if the conditions of flow-line 626 are met. Again showing symmetry, the conditions of flow-line 626 are the same as for flow-line 614 between operational states 604 and 606. On the other hand, if controller 140 perceives problems with the system 102 having lost the necessary minimum accumulator pressure for high pressure accumulator 138, then after a predetermined period of time, illustrated as greater than or equal to one second, control will return to operational realm 604. The entire process will begin again, including the forced movement of the swash-plate 216 to the necessary angular displacement and the valves being set to maximize pressure buildup when mechanical energy is converted to hydraulic energy by way of charge pump 204 and pump-motor 130.

Temperature Compensation for Pressure Limits

As discussed in detail above, the SwashPrechargeLogic heuristic 600 is used to precharge high pressure accumulator 138 to at least a minimal pressure such that the high pressure proximity accumulator switch 284 changes state from "accumulator empty" (ACC_EMPTY) to "accumulator not empty" (ACC_NOT_EMPTY) by way of variable AccState. It is desirable that SwashPrechargeLogic heuristic 600 only be used only upon the turning on of the ignition of vehicle 100 and initial activation of hydraulic drive system 102, which is necessary because accumulator 138 has been bled to atmospheric pressure when the ignition was last turned off. Such a bleeding is performed for various reasons, including the desire to maximize the operational life of the accumulator. Completely bleeding the accumulator 138 is not desired, however, when hydraulic drive system 102 is in its normal operational state.

There is an appropriate cut off point for AccState where a majority of the appropriate volume of hydraulic fluid has been removed from the high pressure accumulator unit 280 such that the removal of any additional volume of fluid will result in a precipitous pressure drop, thereby requiring the use of heuristic 600 to recharge the high pressure accumulator 138. A pressure point is selected to remove as much volume of fluid as possible for a given temperature without inadvertently permitting the precipitous drop in pressure, thereby creating the need to continuously invoke heuristic 6100 during normal operation of system 102. Thus, as noted above and in Table 3, it is desired to avoid a change of state AccState for accumulator switch 284 during normal operation of hydraulic drive system 102 between motoring mode and pumping mode.

Figure 7A:
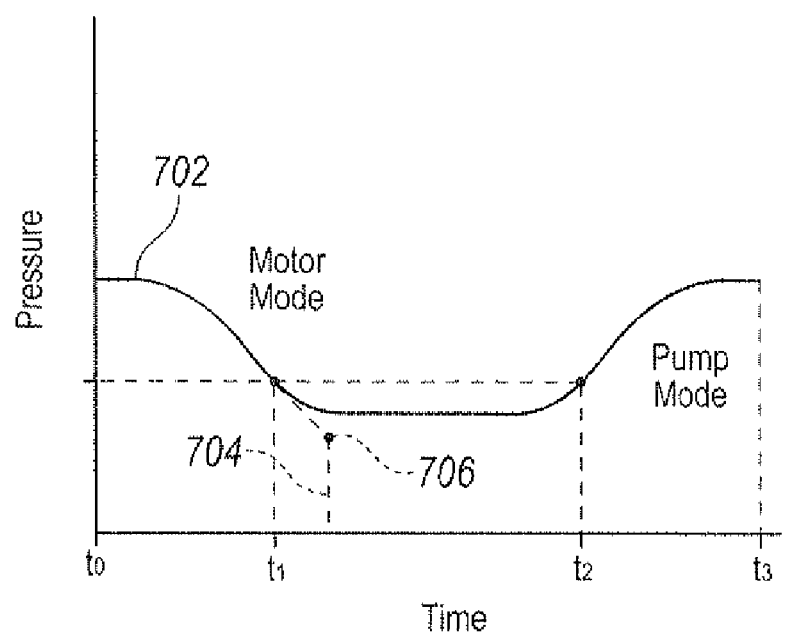
FIG. 7A illustrates a desired change in pressure for a sensor associated with an exemplary hydraulic drive system between a motoring mode and a pumping mode.

FIG. 7A shows the desired changes in pressure for sensor 282 during normal motoring and pumping modes, and transitions therebetween, by way of line 702. At time t0 motoring begins and the pressure of accumulator 138 is at its maximum level. As motoring takes place, bleeding pressurized fluid from the accumulator, the pressure begins to drop. Once the pressure reaches a predefined threshold motoring stops without the accumulator switch changing state from "accumulator not empty" to "accumulator empty" as shown at time t1. Then, between time t1 and time t2, neither motoring nor pumping takes place within hydraulic drive system 102 although vehicle 100 itself is moving. However, at some point vehicle 100 begins to decelerate, invoking the pumping mode at time t3. Pumping continues until the pressure of fluid stored in accumulator 238 is generally the same as that at time t0. The system recycles back to time t0 and the process begins again.

Unfortunately, however, at times, pressure is not correctly maintained. Instead of maintaining at least a minimal pressure as shown between times t1 and t2, the accumulator abruptly loses all of its pressure essentially all at once after a certain minimum pressure level is reached as shown by line 704 and point 706. The reason for such pressure loss is generally that too much hydraulic fluid was permitted to leave the accumulator unit 280. Under such circumstances, it takes time and energy to precharge the accumulator unit 280 using heuristic 600 as discussed above, which decreases the operational efficiency of system 102 because normal motoring and pumping is not possible when precharging is taking place. Moreover, as noted above, there is no control of swash-plate 216 if there is no pressurized hydraulic fluid available.

Figure 7B:
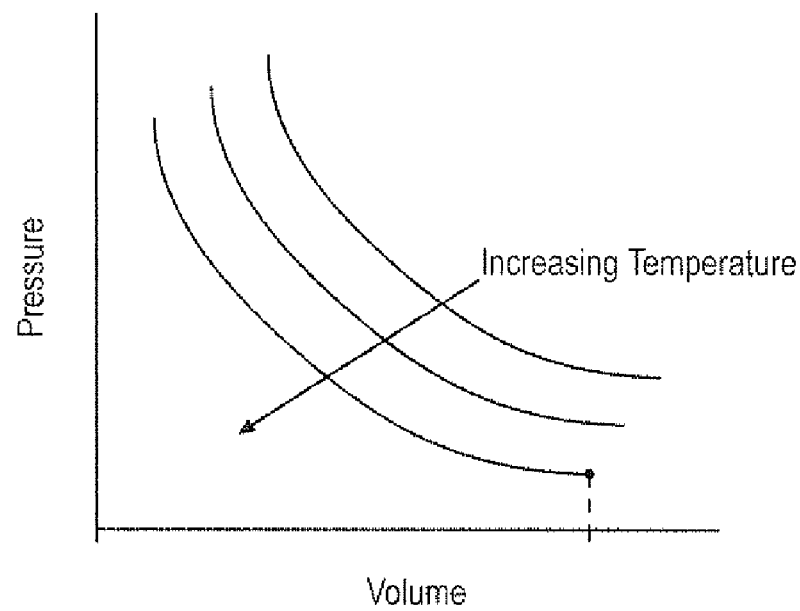
FIG. 7B illustrates various graphs of pressure versus volume to show that as temperature increases, the less volume of hydraulic fluid that can be stored at the same pressure.

In practice, the conditions under which proximity switch 284 should change state to avoid complete bleeding of high pressure accumulator unit 280 is not constant but varies significantly with temperature. As illustrated in FIG. 7B, various graphs of pressure versus volume show that as temperature increases, the less volume of hydraulic fluid that can be stored at the same pressure.

Thus, it has been found that, to minimize the need to invoke SwashPrechargeLogic heuristic 600, a mechanism is necessary to adjust parameters associated with the activation of switch 284 between the states "accumulator empty" and "accumulator not empty." Such adjustment accommodates for pressure changes as a result of temperature changes, thereby affecting the amount of volume that can be removed at any one time from high pressure accumulator unit 280.

Measuring temperature in association with the use of accumulator 130, including high pressure sensor 282, high pressure proximity accumulator switch 284 and accumulator unit 280 has been problematic. In practice, as mentioned above, it has been difficult to determine a real-time temperature reading that is capable of determining when the maximum volume of hydraulic fluid can be removed from accumulator 138 without the pressure dropping precipitously.

In general terms, pressure is monitored within hydraulic drive system 102 as follows. Pressure sensed by sensor 282 is stored at the time that switch 284 changes state and opens to permit the commencement of the motoring mode. This is shown at time t0 in FIG. 7A. The pressure sensed by the sensor 282 is again stored when switch 284 changes state between "accumulator not empty" and "accumulator empty" at time t1, particularly if there is an undesirable precipitous drop in pressure. Under such a circumstance, an offset for the pressure is added as a hysteresis and the new and higher value of pressure is used as the new pressure limit for the change of state for switch 284 so that the associated valve shuts off before the volume of fluid becomes undesirably low. Thus, the pressure at which motoring stops because of a change of pressure is compared against a threshold pressure that can be adjusted based on changing conditions.

Such an approach has been found to be more accurate to changing conditions then simply measuring fluid temperature in an attempt to determine amount of acceptable volume removal from the high pressure accumulator 130. Nevertheless, the use of temperature such as that measured by sensor 288 for reservoir 134 does provide some guidance. Particularly when a vehicle 100 is first started and system temperature is generally constant, the temperature information is preferably used to provide an initial pressure for setting the change in state of switch 284, which is then adjusted as temperature increases over time. If the temperature goes down for same reason (e.g., idling for a period of time), it is also possible to reduce the pressure level for switch activation at time t1 accordingly.

Figure 8:
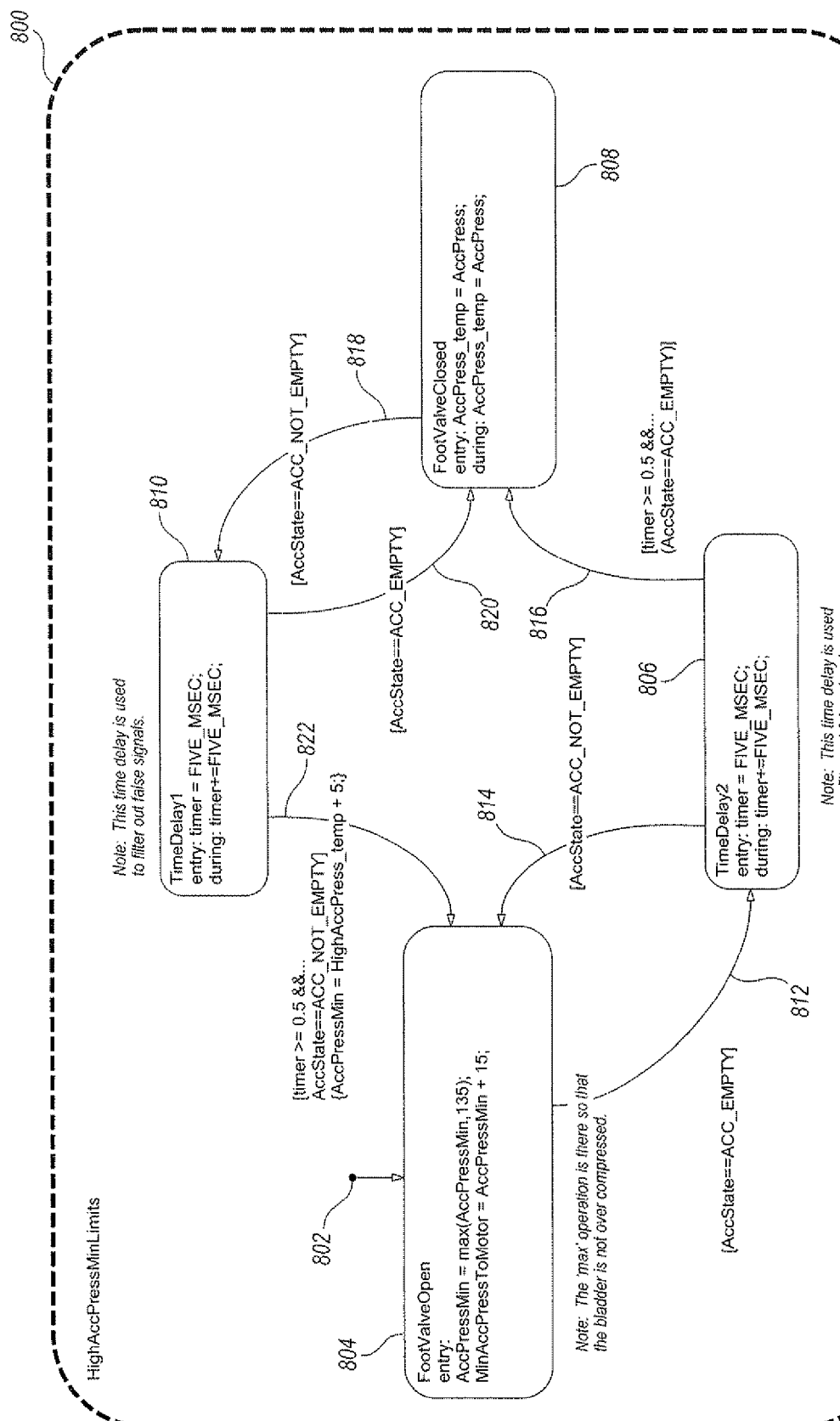
FIG. 8 illustrates the flow of a heuristic related to temperature compensation for pressure limits.

A HighAccPressMinLimits heuristic 800 is illustrated in FIG. 8. Heuristic 800 begins at entry point 802 and includes operational realms 804, 806, 808, and 810.

Operational realm 804 is entitled FootValveOpen. The variable AccPressMin is equal to the maximum value of either the prior iteration of AccPressMin or a preset constant, illustrated in the example as 135 bars, which is roughly atmospheric pressure at an ambient temperature of twenty (20) degrees Celsius. AccPressMin should reflect, however, the minimum acceptable value of pressure for hydraulic system 102. For example, the initial minimum pressure is also based on the precharge pressure designed for accumulator unit 280. Thus, the "max" operation is typically used to prevent accidental over-compression of a bladder associated with high pressure accumulator unit 280 when a gas accumulator with bladder is utilized.

AccPressMin is defined above in Table 4. The initial default value of AccPressMin may be changed depending on the value of the temperature measured by a sensor such as sensor 288, and will typically be higher as the temperature is higher. Thus, in some approaches, a lookup table is provided and the minimum value of 135 bars is adjusted upwardly as the temperature measured by sensor 288 increases.

Next, the variable MinAccPressToMotor is set equal to the variable AccPressMin plus a predetermined offset. In the exemplary flow, the offset is 15 bars. MinAccPressToMotor is defined in Table 4 above. It is used to help determine when system 102 should enter the motoring mode.

Control passes from operational realm 804 to operational realm 806, entitled TimeDelay2, when high pressure proximity accumulator switch 284 changes state to "accumulator empty" and closes high pressure accumulator 280 as shown by flow-line 812. Operational realm 806 provides a time delay to filter out false signals. In the illustrated heuristic, the a time variable is set to five milliseconds. If it turns out that there was a false signal and switch 284 has not changed state to "accumulator empty," then control passes back to FootValveOpen operational realm 804. Preferably, hydraulic drive system 102 should never leave operational realm 804 during normal operation of the system for the reasons noted above. However, if it does, e.g., because an adjustment is required because of changes in temperature, the discussion that follows addresses the actual pressure adjustments that need to be made in one exemplary approach using heuristic 800.

Thus, control passes from operational realm 806 to operational realm 808, entitled FootValveClosed, if the time delay is greater or equal to 0.5 seconds and the accumulator switch 284 has entered the state "accumulator empty," as shown by flow-line 816.

In FootValveClosed operational realm 808 a temporary value is set to the current accumulator pressure as measured by sensor 282. This temporary pressure value continues to update until the valve associated with switch 284 changes state and opens. In other words, control of heuristic 800 stays within operational realm 808 until switch 284 changes state to "accumulator not empty" as shown by flow line 818. The pressure measured at the time of such a state change is captured in the variable HighAccPress_temp.

Flow-line 818 connects to operational realm 810, entitled TimeDelay1, which performs the same operation as in operational realm 806 although the time may not be identical. If it turns out that there was a false signal and the accumulator state should be "accumulator empty" then control passes back to operational realm 808.

Otherwise, if the time is greater than 0.5 seconds and the state of accumulator switch 284 is "accumulator not empty" then the variable AccPressMin is set to the value of AccPress_Temp when in operational realm 808 and then increased by a preset amount, illustrated as 5 bars. This is shown in flow-line 822, passing control from operational realm 810 back to FootValveOpen operational realm 804. As noted above, ideally, control will remain within operational realm 804 until further temperature compensation because of pressure limits is required.

Compensation for Swash Neutral Drift

As noted above, when hydraulic drive system 102 is discharging (e.g., in a motoring mode) the swash-plate 216 is moved in a positive angular displacement, up to a maximum angle such as fifteen (15) degrees. Similarly, when the hydraulic drive system 102 is charging (e.g., precharging or in a normal pumping mode), the swash-plate is moved in a negative angular displacement up to a maximum angle such as fifteen (15) degrees. When the system is in a neutral position, however, neither pumping nor motoring, ideally the swash-plate 216 is in a neutral position of zero displacement, which is set at zero (0) degrees. When the swash-plate 216 is at zero degrees it is considered at an absolute neutral position.

In practice, however, either the swash-plate 216 or the sensors 218 and/or 220 that measure the positioning of the swash-plate 216 have a tendency to drift and a compensation has been found beneficial to calibrate the swash-plate and sensors to adjust for the drift so that the overall system works more efficiently in overall operation. In the discussion that takes place below reference to drift of the swash-plate 216 also refers to potential issues with sensor signal drifting that can result from sensor readings as well.

Figure 9:
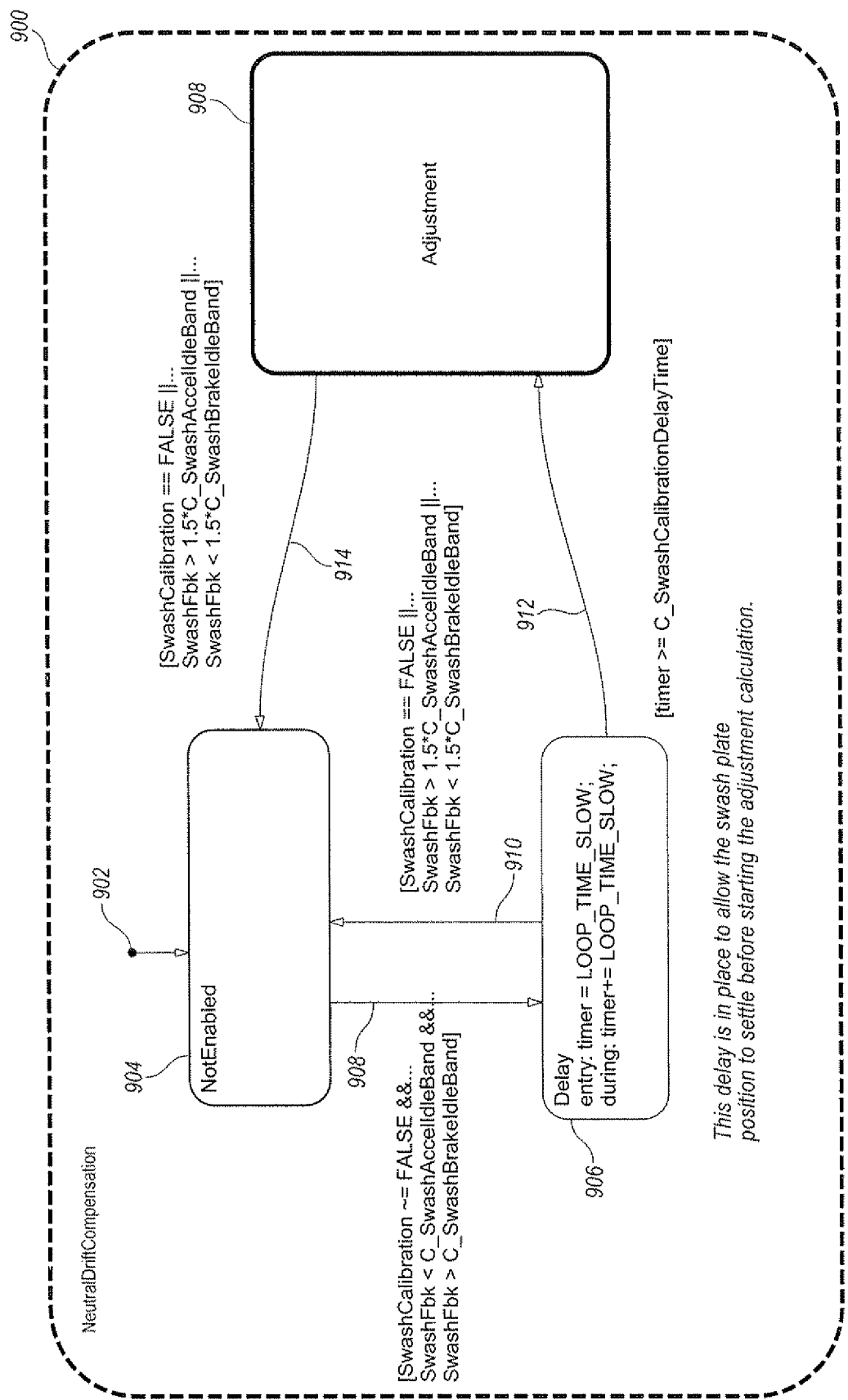
FIG. 9 is an exemplary flow diagram related to compensation for swash neutral drift.
Figure 10:
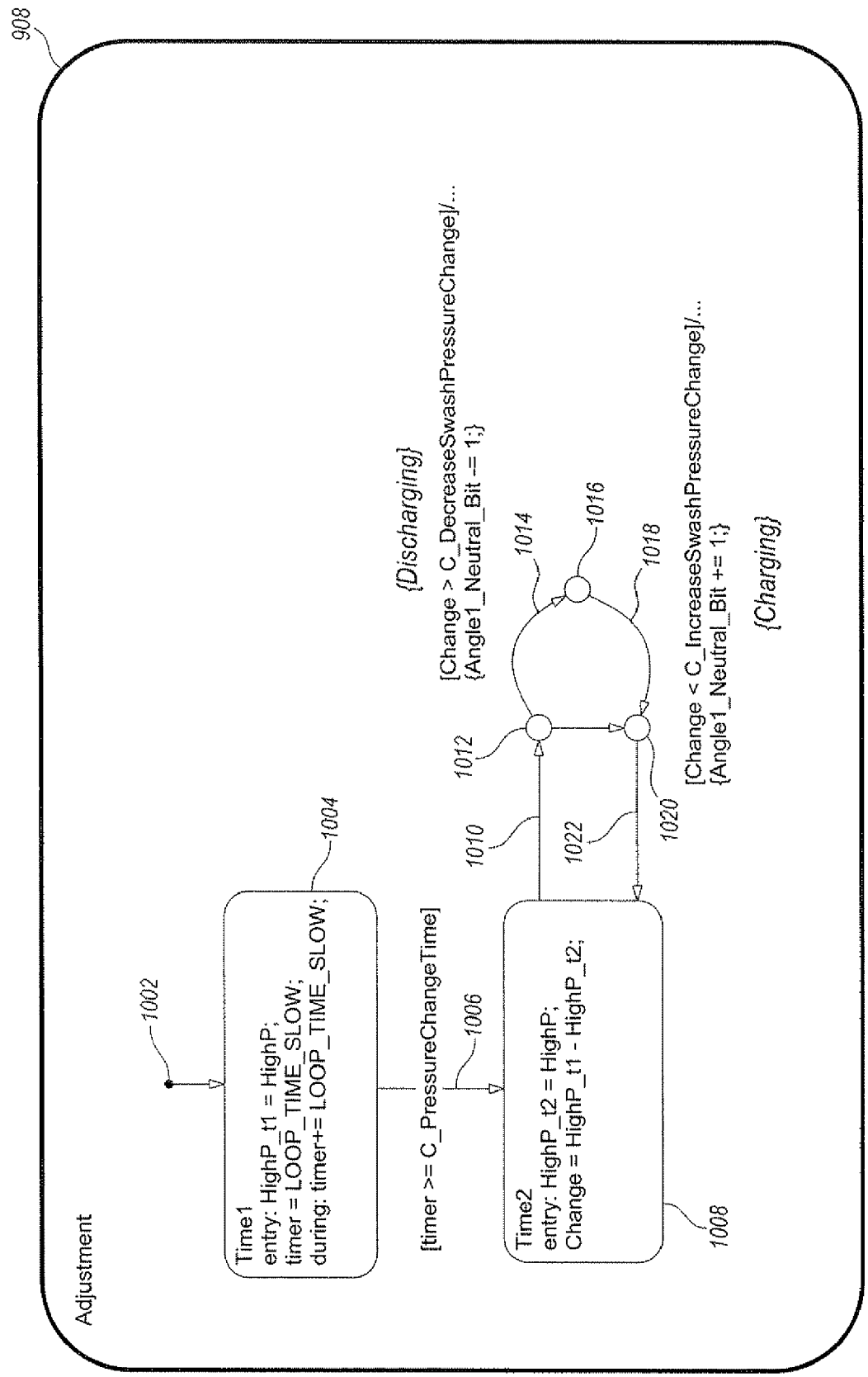
FIG. 10 is an exploded view of a portion of the flow of FIG. 9.

Operation of a heuristic called NeutralDriftCompensation 900 is illustrated in FIGS. 9 and 10. Heuristic 900 includes operational realms 904, 906 and 906. Details of operational realm 906 are explained in greater detail in FIG. 10. As discussed in more detail with respect to FIG. 11, adjustment for drift of the swash-plate 216 preferably takes place after the motoring mode is terminated, as shown with respect to the transition from operational realm 1110 to operational realm 1108 by way of flow-line 1130. The conditions associated with flow-line 1130 in addition to those associated with the exit of the motoring mode are discussed below with respect to operation 1112 in FIG. 11 and FIG. 15.

In order for drift compensation to take place, one of the conditions that needs to be satisfied is that the mode valve 232 needs to be open. Valve 232 is open when hydraulic drive system 102 is in motoring mode. Controller 140 then checks for a flow through pump-motor unit 217 in the motoring direction to see if there has been any drift.

NeutralDriftCompensation heuristic 900 begins at entry point 902, the default state, entitled NotEnabled. Control remains within operational realm 904 until the conditions of flow-line 908 are met. First, flag SwashCalibration, discussed above as one of the output variables from controller 140, and must not be equal to "FALSE." A "FALSE" value of the SwashCalibration flag indicates that (i) the hydraulic drive system 102 has just exited from motoring mode; (ii) the mode valve 232 is still open to permit flow to go from accumulator 138 to the reservoir 134; and (iii) there is sufficient vehicle speed for an effective neutral drift sensing. Second, a reading SwashFbk from sensor 218 and/or 210 must be less than a constant C_SwashAccelIdleBand and greater than a second constant C_SwashBrakeIdleBand, indicating that the swash-plate 216 is believed to be in the neutral position. In one illustrated approach, constant C_SwashAccelIdleBand is +0.25 degrees, while constant C_SwashBrakeIdleBand is −0.25 degrees. If all three conditions are met then using flow-line 908, control passes from operational realm 904 to operational realm 906, entitled delay. On the other hand, even if the flag SwashCalibration has been set not equal to "FALSE", control will not pass to the next operational realm if the position of swash-plate 216 is within an operational band extending between constant C_SwashBrakeIdleBand and constant C_SwashAccelIdleBand. An exemplary value of C_SwashAccelIdleBand is one-half (0.5) degree. Use of the constant C_SwashAccelIdleBand represents a recognition that it is unrealistic to expect the swash-plate 216 to remain exactly at single point of zero (0) degrees even when in neutral and properly calibrated for drift. Further, the band of acceptable "neutrality" may be easily adjusted as a result of hardware and environmental issues, or specific performance considerations. For example, the constants may be changed under certain operational protocols as appropriate.

Once in Delay operational realm 906, a time delay is imposed in accordance with the variable LOOP_TIMESLOW, which can vary as appropriate. The delay is imposed in operational realm 906 to permit the swash-plate 216 to settle in a rest position before starting an adjustment calculation as discussed with respect to operational realm 908. As shown by flow-line 910, an adjustment to swash-plate 216 will not be performed if one of three indicated conditions is met. First, if the flag SwashCalibration is set as "FALSE," then control returns from Delay operational realm 906 back to NotEnabled operational realm 902. Control also returns from Delay operational realm 906 back to NotEnabled operational realm 902 if the sensor readings from sensors 218 and/or 220 are either greater than constant C_SwashAccelIdleBand or less than C_SwashBrakeIdleBand. However, a multiplication factor of 1.5 is illustrated for the indicated conditions to avoid the need to enter into operational realm 908 on a too frequent basis. Under some circumstances, however, there will be no offset. The offset is merely shown to be illustrative of one approach.

On the other hand, if the conditions associated with flow-line 910 are not met, but the delay time is greater than or equal to the constant C_SwashCalibrationDelayTime as shown by flow-line 912, control passes to operational realm 908, entitled Adjustment. The value of the constant will depend on operational, environmental, and hardware characteristics related to hydraulic drive system 102, but should desirably made as reasonably short as possible.

Control will pass from Adjustment operational realm 908 back to NotEnabled operational realm 902 by way of flow-line 914 if the same conditions that are discussed with respect to flow-line 910 are met with respect to flow-line 914. In some approaches, portions of the conditions, such as the offset value (here, 1.5 for both), may be different.

The operations that take place within operational realm 908 are illustrated in FIG. 10. The operational realm is entered at point 1002 where it goes into a state 1004 entitled Time1. A pressure reading is taken that is reflected as HighP at some appropriate point within hydraulic system 102, such as, for example, using AccPress_bar from high pressure accumulator sensor 282. The value of the pressure is saved using variable HighP_t1 and a timer starts such as that in operational realm 906. Once the timer has a value greater than or equal to the constant C_PressureChangeTime as shown by flow-line 1006, control moves from state 1004 to state 1008 entitled Time2. Typically, the constant C_PressureChangeTime is set on the order of a second or so. In state 1008 the pressure from the same sensor such as sensor 282 is again measured and saved using the temporary variable HighP_t2. The two temporary variables representing the pressure at time 1 within state Time1 and at time 2 within state Time2 are then compared.

If there is a change in pressure between the two pressure readings then there is flow. If there is flow then the pump-motor unit 130 is actually not in neutral. If the change in pressure between the two times is positive, meaning that a pressure discharge is taking place (e.g., motoring), then the operational realm 908 needs to adjust the swash-plate 216 in the negative direction. However, if the change of pressure is negative, then a charging operation is taking place (e.g., pumping) and the operational realm needs to adjust the swash-plate 216 in the positive direction. The process needs to continue until operational realm 908 is exited by one of the conditions associated with flow-line 914 in FIG. 9 being satisfied as discussed above.

More specifically, the rest of the adjustment process is illustrated by way of flow-line 1010, condition point 1012, flow line 1014, condition point 1016, flow-line 1018, condition point 1020, and flow-line 1022, finally returning to state 1008.

As shown by flow-line 1014 between condition points 1012 and 1014, if the change in pressure is greater than the constant C_DecreaseSwashPressureChange, then the swash-plate 216 is adjusted a minute amount Angle1_Neutral_Bit in the negative direction as represented by the condition "−=1". In contrast, as shown using flow-line 1018 between condition points 1018 and 1020, if the change in pressure is less than the same constant, then the angular displacement of the swash-plate 216 is adjusted by the amount represented by the variable Angle1_Neutral_bit in the positive angular direction, as represented by the condition "+=1". Typically, Angle1_Neutral_Bit is set to be on the order of 0.04 degrees, meaning that the change in angular displacement is very small for each iteration of the adjustment process. If the change in angular displacement is insufficient because of time constraints, the value can be increased accordingly.

Exiting from Motoring Mode and Pumping Mode

FIGS. 11 through 28 concern the movement of hydraulic drive system 102 from a neutral state to either one of a pump mode or a motoring mode in normal operation, and then the exiting from each of the modes back to the neutral state. If the exiting is due to an operator command, the path followed uses a constant rate methodology as described in more detail below. However, if the exiting is due to the hydraulic drive system 102 approaching a condition limit, typically based on either the speed of pump-motor 130 or measured pressure of accumulator 138, then the path followed uses a variable rate methodology, which has been termed "soft exit".

By using the term constant rate we mean that there is so much a change in the displacement of swash-plate 216 per second (e.g., 15 degrees in 500 msec).

On the other hand, when timing is an issue, different metrics, namely the concern with both pressure (bar) and pump speed (RPM), is used. By using the term variable rate we mean that there is so much a change in the displacement of swash-plate 216 per change in pressure associated with accumulator 138 or a change in pump speed of pump-motor 130.

To facilitate the discussion that follows, it is to be assumed that hydraulic drive system 102 exits the pumping mode at a constant rate when an operator of vehicle 100 is done braking (e.g., the operator's foot removed from the brake pedal). Hydraulic drive system 102 exits braking at a variable rate when the maximum amount of hydraulic energy has been stored in the system or if another condition specific to the system has been met.

Hydraulic drive system 102 exits the motoring mode at a constant rate when an operator command causes the exit (e.g., the foot is removed from the gas pedal). Hydraulic drive system 102 also exits motoring when the system 102 has exhausted the stored energy available to promote acceleration.

Exiting the pumping mode at a constant rate is generally slower then exiting at a variable rate. Because performance issues associated with hydraulic drive system 102 are not the limiting factor (e.g., there is no issue with respect to the pressure stored or remaining in the system), the variable rate can be based on time. Other factors also influence both pressure and speed.

When using variable rate exiting, however, as the limit is approached then less displacement of swash-plate 216 is allowed. Generally, the limit is reached at the same time zero displacement is reached. In this way there is a gradual or "soft exit". However, such an exit is nonetheless faster than constant rate exiting. Both the constant rate exit state and the variable rate state, however, represent transitions from either a motoring mode or a pumping mode and the neutral state.

More specifically, it is desirable to undertake a soft exit from a motoring mode when the pressure associated with high pressure accumulator 138 drops to a predetermined level as discussed above, for example with respect to FIG. 7A, or if the pump-motor unit 217 exceeds a desired pump speed limit. Thus, both conditions (pressure of high pressure accumulator 138 and speed of pump-motor unit 217) are monitored carefully. Similarly, to exit pumping mode, a maximum desirable pressure must be reached for high pressure accumulator 138 or the speed of pump-motor unit 217 exceeds a threshold value. In either case, however, unless there are extenuating circumstances such as a fault, it is desirable to exit out of the pumping mode or the motoring mode in a manner that maximizes torque, but also is accomplished in a manner that is not abrupt or disruptive to long-term operation of hydraulic drive system 102. Moreover the transition of hydraulic drive system to the neutral state should permit engine 112 to smoothly adjust for the changing torque load. Such a transition is accomplished through a controlled adjustment or modulation of swash-plate 216, taking into account the current pressure and the end pressure to reach a neutral displacement. Temperature can also play a factor. Nevertheless, preferably the swash-plate 216 is gradually de-stroked.

Figure 11:
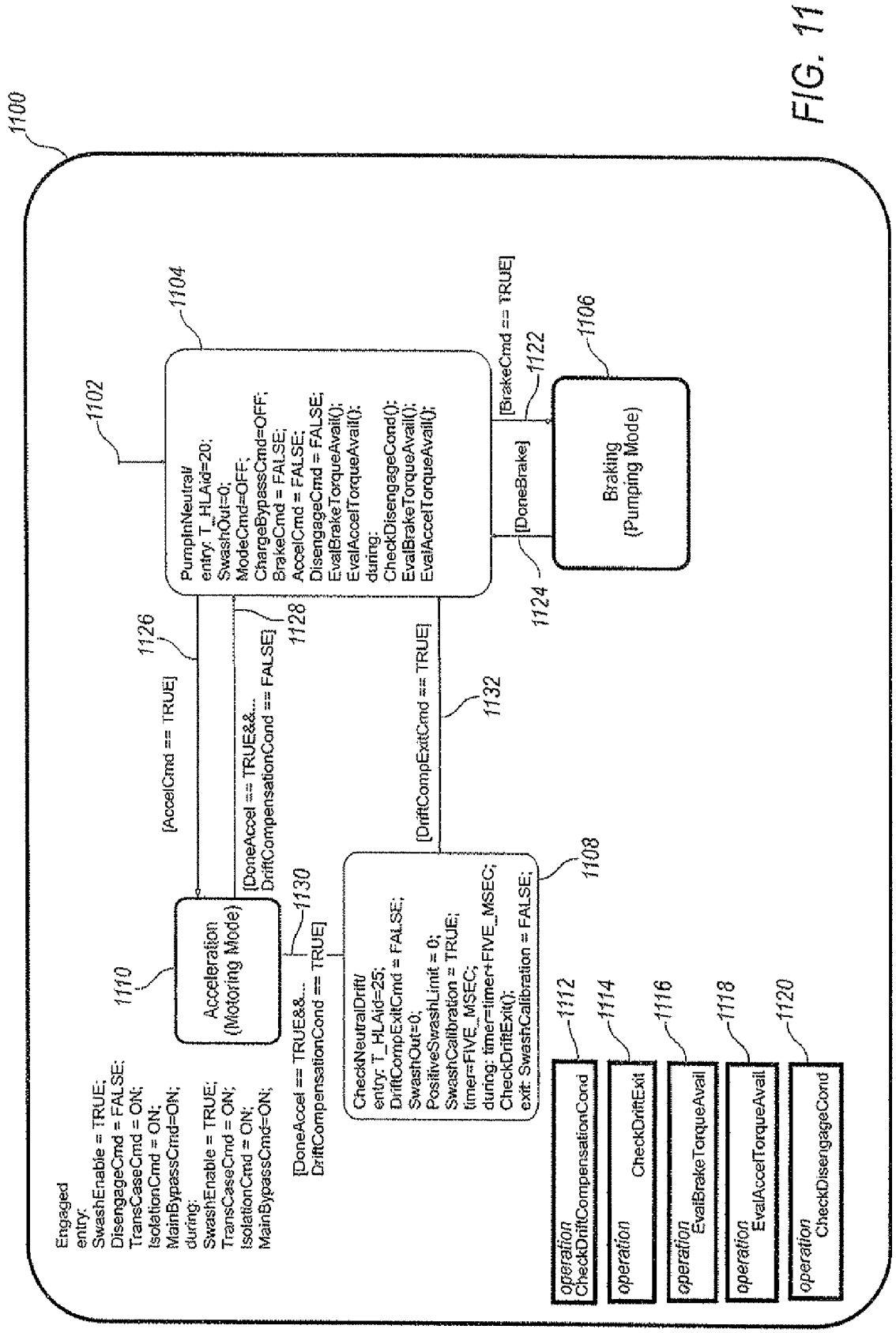
FIG. 11 is an exemplary flow diagram showing the operation of a hydraulic drive system from a neutral state to either one of a pump mode to a motoring and then the exiting from each of the modes back to the neutral state.

FIG. 11 represents an example of a hydraulic drive system 102 when it is in an engaged state 1100, represented by the term Engaged. When entering engaged state 1100, the flag SwashEnable is set equal to "TRUE" to permit operation of a close loop swash control for displacement of swash-plate 216. A variable called DisengageCmd is set to "FALSE" within controller 140. Further the variables IsolationCmd and MainBypassCmd are both set to condition "ON," meaning that the isolation valve 242 is set to open while the bypass valve 250 is set to closed. While in engaged state 1100, certain actions are executed when the state receives an event while it is active with no valid transition away from the state. These actions include setting SwashEnable to condition "TRUE". Further, an appropriate signal is set to clutch valve solenoid 290 when the flag associated with TransCaseCmd is set to "ON". Finally, both IsolationCmd and MainBypassCmd are maintained in the "ON" condition.

Engaged state 1100 is entered by way of entry point 1102. There are various operational realms 1104, 1106, 1108, and 1110 associated with engaged state 1100. There are also various operations 1112, 1114, 1116, 1118, and 1120 that are called while in engaged state 1100.

Once engaged state 1100 is entered by way of entry point 1102, control passes first to operational realm 1104, entitled PumpInNeutral. While in this operational realm the variable SwashOut is set equal to "0," meaning that the set point for the swash-plate is at a neutral displacement of zero (0) degrees. The mode valve 230 is set to a closed position by the variable ModeCmd being set to the condition "OFF," while the charge by-pass valve 263 is set to an open position by the variable ChargeBypassCmd being set to the condition "OFF". Flags associated with variables BrakeCmd and AccelCmd are both set to "FALSE," meaning that neither motoring nor pumping should take place. The variable DisengageCmd is set to "FALSE".

Further, operation 1116, entitled EvalBrakeTorqueAvail, is executed within operational realm 1104. As illustrated in an exemplary manner in FIG. 12, operation 1116 is entered by way of entry point 1202. As shown by flow-line 1204 if three conditions are met then the variable NegativeSwashLimit is set to equal to the value associated with the variable SwashBrakeLimit, meaning that the hydraulic drive system 102 has braking torque available and can go into pumping mode upon receiving an operator command. The variable SwashBrakeLimit is discussed above, including with respect to Table 3. Otherwise, if any one of the conditions is not met, then the variable NegativeSwashLimit is set equal to "0," as shown by flow-line 1206, meaning that the hydraulic drive system 102 cannot deliver braking torque. The three conditions are that (i) the pressure measured by sensor 282 must be less than the value set by MaxAccPressToBrake; (ii) the speed of pump-motor 130 must be greater than the constant represented by C_MinPumpSpeedToBrake, which represents the minimum pump speed that is acceptable to permit the pumping mode; and (iii) the reservoir level associated with the measurement of sensor 286 must be greater than the constant C_MinOilLevelToBrake, which represents the minimum level of hydraulic fluid in low pressure reservoir 134. The value of the two constants will be different depending on the specific hydraulic drive system 102, but are set so that if the conditions are met the pumping mode may be appropriately entered. As noted above with respect to Table 3, the value of MaxAccPresstoBrake is related to temperature.

If the conditions of flow-line 1204 are met, then if the variable SwashCmd is less than the constant C_SwashBrakeIdleBand, indicating that an operator braking command is present, then the flag BrakeCmd is set to "TRUE," as shown by flow-line 1208. This means that the hydraulic drive system 102 is commanded to transition to a pumping mode (i.e., a braking state). Otherwise, the flag BrakeCmd is set to "FALSE" as shown by flow-line 1210, and the hydraulic drive system 102 will remain in PumpInNeutral operational realm 1104. SwashCmd is an input resulting from a determination of a swash plate position command, discussed with respect to Table 3 and FIG. 5. The constant C_SwashBrakeIdleBand is discussed with respect to FIG. 9.

Operational Realm 1104 also executes the operation 1118, entitled EvalAccelTorqueAvail. As illustrated by way of example in FIG. 13, operation 1118 is entered by way of entry point 1302. For the variable PositiveSwashLimit to be set equal to the value associated with the variable SwashAccelLimit, four conditions, listed below, must be satisfied. Otherwise, i.e., if any one of the conditions is not met, then the variable PositiveSwashLimit is set equal to "0" as shown by flow-line 1306, indicating that the hydraulic drive system 102 cannot deliver an accelerating torque (while in braking). The variable SwashAccelLimit is discussed above, including with respect to Table 3. The first condition is that the accumulator pressure 282 must be greater than a value associated with the variable MinAccPressToAccel. As noted above with respect to Table 3, the value of MinAccPressToAccel is related to temperature. The second condition is that the speed of pump-motor unit 217 must be greater than constant C_MinPumpSpeedToAccel (discussed with respect to FIG. 12). The third condition is that the speed of pump-motor unit 217 must be less than a constant C_MaxPumpSpeedToAccel, which is the maximum speed of pump-motor unit 217 to permit the motoring mode. The fourth condition that must be met is that the flag AccState associated with high pressure proximity switch 284 must be set to the condition "accumulator not empty." The value of the constants will be different depending on the specific hydraulic drive system 102, but are set so that if the conditions are met the motoring mode may be appropriately entered.

If the conditions of flow-line 1304 are met, then hydraulic drive system 102 can provide an accelerating torque. Further, if the variable SwashCmd is greater than the constant C_SwashBrakeIdleBand, then the flag AccelCmd is set to "TRUE" as shown by flow-line 1308, meaning that the hydraulic drive system will transition to motoring mode, Acceleration operational realm 1110. Otherwise, the flag AccelCmd is set to "FALSE" as shown by flow-line 1310, indicating that the hydraulic drive system 102 will stay in the PumpInNeutral operational realm 1104. SwashCmd is an input resulting from a determination of a swash plate position command, discussed with respect to Table 3 and FIG. 5. The constant C_SwashAccelIdleBand is discussed with respect to FIG. 9.

Figure 14:
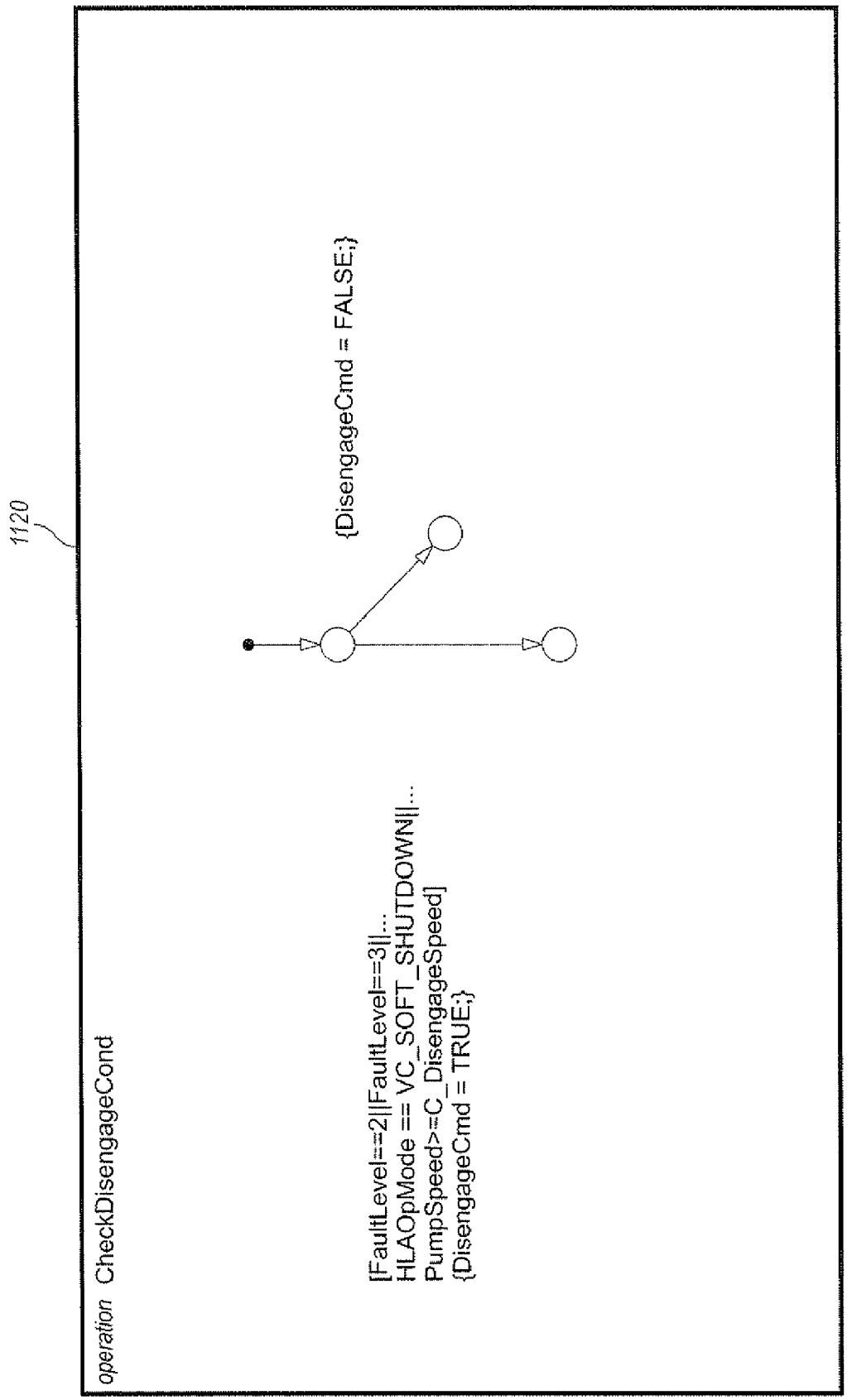
FIG. 14 is an exemplary flow of an operation entitled CheckDisengageCond associated with FIG. 11.

As control of hydraulic drive system 102 remains within operational realm 1104, operations 1116 and 1118 continue to be executed. An additional operation 1120 is also executed, and which is entitled CheckDisengageCond. An example of the operation 1120 is illustrated in FIG. 14. The flag DisengageCmd, used to exit out of state 1100, is set equal to "TRUE" if there is a specified type of fault that takes place within hydraulic drive system 102. Control will also exit state 1100 if the variable HLAOpMode, discussed above with respect to Table 3, is set to execute a "soft shutdown." Finally, the DisengageCmd flag will also be set equal to "TRUE" if the speed of pump-motor unit 217 is greater than or equal to a disengagement speed represented by the constant C_DisengageSpeed. The value of the constant C_DisengageSpeed will depend on various conditions as well as the physical make up of the relevant portions of the hydraulic drive system 102.

Control will leave operational realm 1104 to pass into operational realm 1106 to permit pumping when the flag BrakeCmd is set equal to "TRUE," as shown by flow-line 1122. Control will return to operational realm 1104 when the pumping mode is complete as shown by flow-line 1124. The position of the swash plate 216 is controlled to permit an exit to operational realm 1104 either by de-stroking to neutral in a constant rate manner as discussed with respect to state 1706 or by de-stroking to neutral in a variable rate manner as discussed with respect to state 1708, both of which are discussed further below.

Similarly, control will leave operational realm 1104 to pass into operational realm 1110 to permit motoring when the flag AccelCmd is set equal to "TRUE," as shown by flow line 1126. As shown by flow-line 1128, control will return to operational realm 1104 when the motoring mode is complete, and when there is no need to adjust for drift of swash-plate 216 as discussed with respect to FIG. 9.

Figure 15:
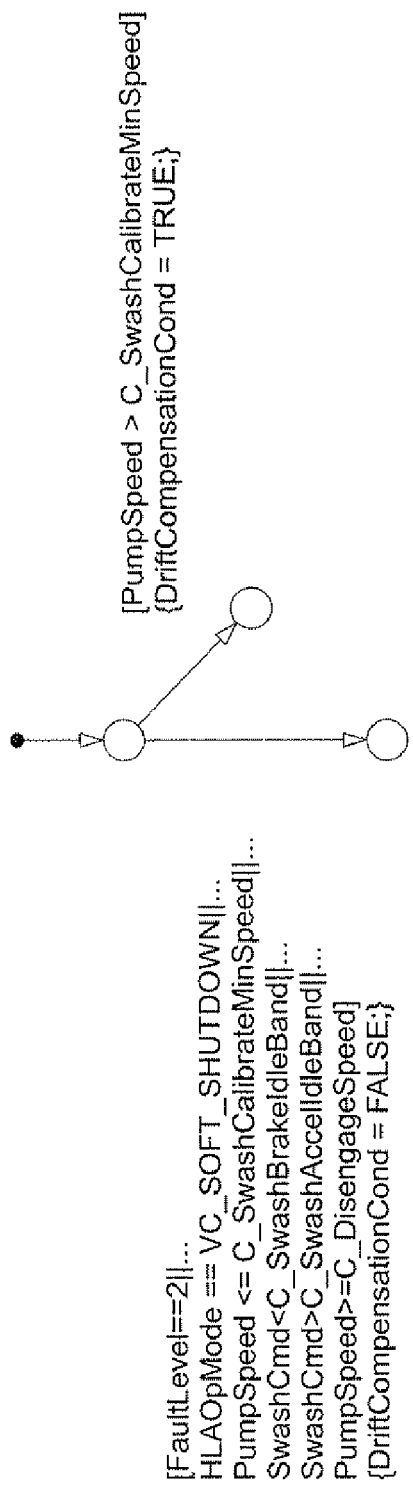
FIG. 15 is an exemplary flow of an operation entitled CheckDriftCompensationCond associated with FIG. 11.

The operation 1112, entitled CheckDriftCompensationCond, is illustrated in FIG. 15. The flag DriftCompensationCond is set to "FALSE" if one of the following conditions is met: (i) a specified fault occurs; (ii) the hydraulic drive system 102 enters into a "soft shutdown" mode; (iii) the speed of pump-motor unit 217 is less than equal to the constant C_SwashCalibrateMinSpeed (the minimum speed of pump-motor unit 217 at which calibration of the swash-plate 216 can take place); (iv) the value of the variable SwashCmd is less than the constant C_SwashBrakeIdleBand or greater than the constant C_SwashAccelIdleBand; or (v) the speed of pump-motor unit 217 is greater or equal to the constant C_Disengagespeed. Otherwise, if the variable PumpSpeed is greater than the constant C_SwashCalibrateMinSpeed, then the flag DriftCompensationCond is set to "TRUE".

However, even when the motoring mode is complete, if there is a need to adjust for drift of the swash-plate 216 then operational realm 1108, entitled CheckNeutralDrift, is entered. As illustrated by flow-line 1130, the flag DoneAccel is set to "TRUE" and the flag DriftCompensationCond is set to "TRUE". The operational realm 1108 sets conditions and timing for executing the neutral drift compensation 900. Control of the operational realm 1108 exits when appropriate by the flag DriftCompExitCmd being set equal to "TRUE," and then returns back to operational realm 1104 by way of flow-line 1132, where the pump-motor 130 is in neutral.

Figure 16:
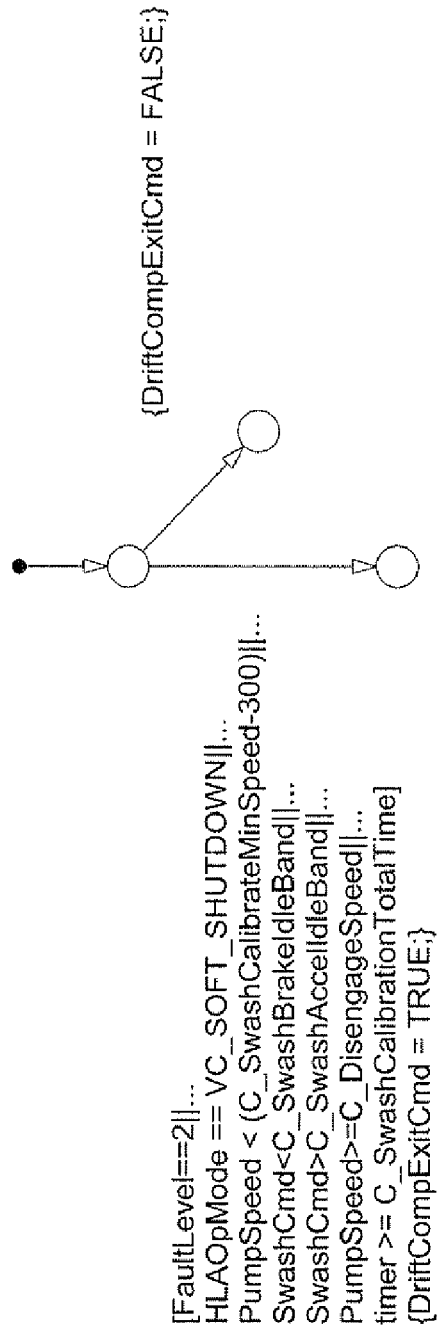
FIG. 16 is an exemplary flow of an operation entitled CheckDriftExit associated with FIG. 11.

Operation 1114, entitled CheckDriftExit, is used in deciding whether to exit operational realm 1108. As illustrated in FIG. 16, an exit takes place when one of the exemplary conditions is met. The conditions illustrated include (i) a predefined system fault; (ii) a command to undertake a soft shut down hydraulic drive system 102; (iii) the variable SwashCmd being either less than or greater than the indicated constant as discussed with respect to FIG. 5; (iv) the speed of the pump-motor 130 being less than a constant entitled C_SwashCalibrateMinSpeed (the minimum speed of pump-motor unit 217 at which calibration of the swash-plate 216 can take place) minus an offset illustrated as being 300 RPM; (v) the pump speed being greater or equal to the constant C_DisengageSpeed (a disengagement speed of pump-motor unit 217); or (vi) a timer value being greater than a constant C_SwashCalibrationTotalTime (the total time permitted for swash calibration to take place). As noted elsewhere, the constants are set depending on hardware, operational and environmental conditions. If one of the exemplary conditions is not met then the flag DriftCompExitCmd is set to "FALSE".

Figure 17:
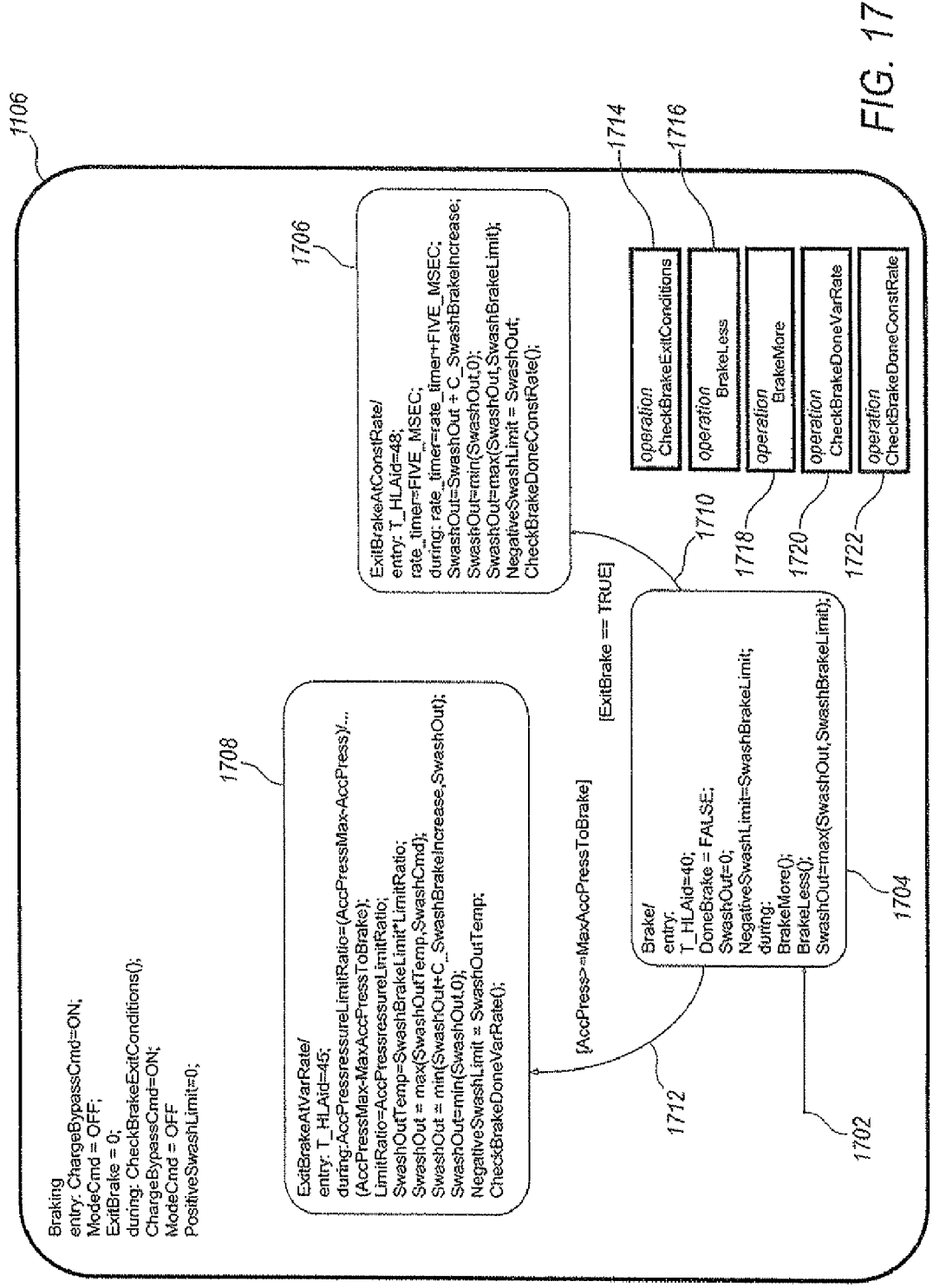
FIG. 17 is an exploded view of a portion of the flow of FIG. 11 and relates to a pumping mode.

The operational realm 1106 associated with the operation of the pumping mode, entitled Braking, is illustrated in greater detail in FIG. 17. Operational realm 1106 is entered by way of entry point 1702. Three states, 1704, 1706, and 1708 are illustrated in FIG. 17. Control initially passes into state 1704, entitled Brake. When a flag ExitBrake is set to "TRUE", control then passes to state 1706, entitled ExitBrakeAtConstRate, as shown by flow-line 1710. Otherwise, when the pressure of accumulator sensor 282 is greater than the value of MaxAccPressToBrake (Table 3) control passes from state 1704 to state 1708, entitled ExitBrakeAtVarRate, as shown by flow-line 1712. Various operations, 1714, 1716, 1718, 1720 and 1722 are called while in operational realm 1106.

When entering operational realm 1106, mode valve is 232 is closed, and the variable ExitBrake is set to the value of "0". While in the operational realm 1106 when the operation 1714, entitled CheckBrakeExitConditions, is being executed, the mode valve 232 is set to a closed orientation and the charge by-pass valve 263 is set to a closed orientation by operation of solenoid 266. The variable PositiveSwashLimit is set to the value of "0". The variable PositiveSwashLimit is used with motoring mode as opposed to pumping mode as discussed in Table 3.

Figure 18:
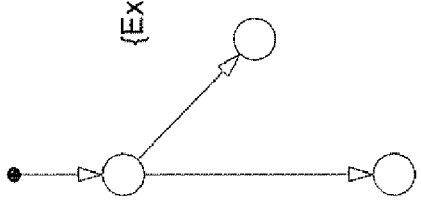
FIG. 18 is an exemplary flow of an operation entitled CheckBrakeExitConditions associated with FIG. 17.

The CheckBrakeExitConditions operation 1714 is illustrated in FIG. 18 in accordance with one exemplary approach. The flag ExitBrake is set to "TRUE" if one of the following conditions is met: (i) The variable SwashCmd is greater than or equal to the value of "0", (See Table 3 and FIG. 5); (ii) a predetermined fault takes place; (iii); the hydraulic drive system 102 is set to do a soft shutdown; (iv) the speed of pump-motor unit 217 is less than or equal to the constant C_PumpSpeedPumpExit, which is the lowermost speed of pump-motor unit 217 at which the pumping should cease; (v) the pump speed is greater than or equal to the constant of C_DisengageSpeed; or (vi) the level of low pressure reservoir 134 drops below a predetermined level represented by C_OilLevelPumpExit as measured by sensor 286. Otherwise, the flag ExitBrake is set to "FALSE," and control remains in the braking operational realm 1106. The constant C_PumpSpeedPumpExit is set at 150 RPM in one exemplary approach. However, more generally, the constant C_PumpSpeedPumpExit is set at a speed determined to be too low for any effective braking to take place, meaning that not much energy can be stored at the indicated speed; in this circumstance, controller 140 is programmed to initiate an exit of pumping mode.

From entry point 1702, control passes to state 1704, entitled Brake. The flag DoneBrake is set to "FALSE," while the variable SwashOut is set to the value of "0" degrees. The variable NegativeSwashLimit is set to the value represented by SwashBrakeLimit (Table 3). While in the Brake state 1704, the operation 1718, entitled BrakeMore, and the operation 1716, entitled BrakeLess, are executed.

Figure 19:
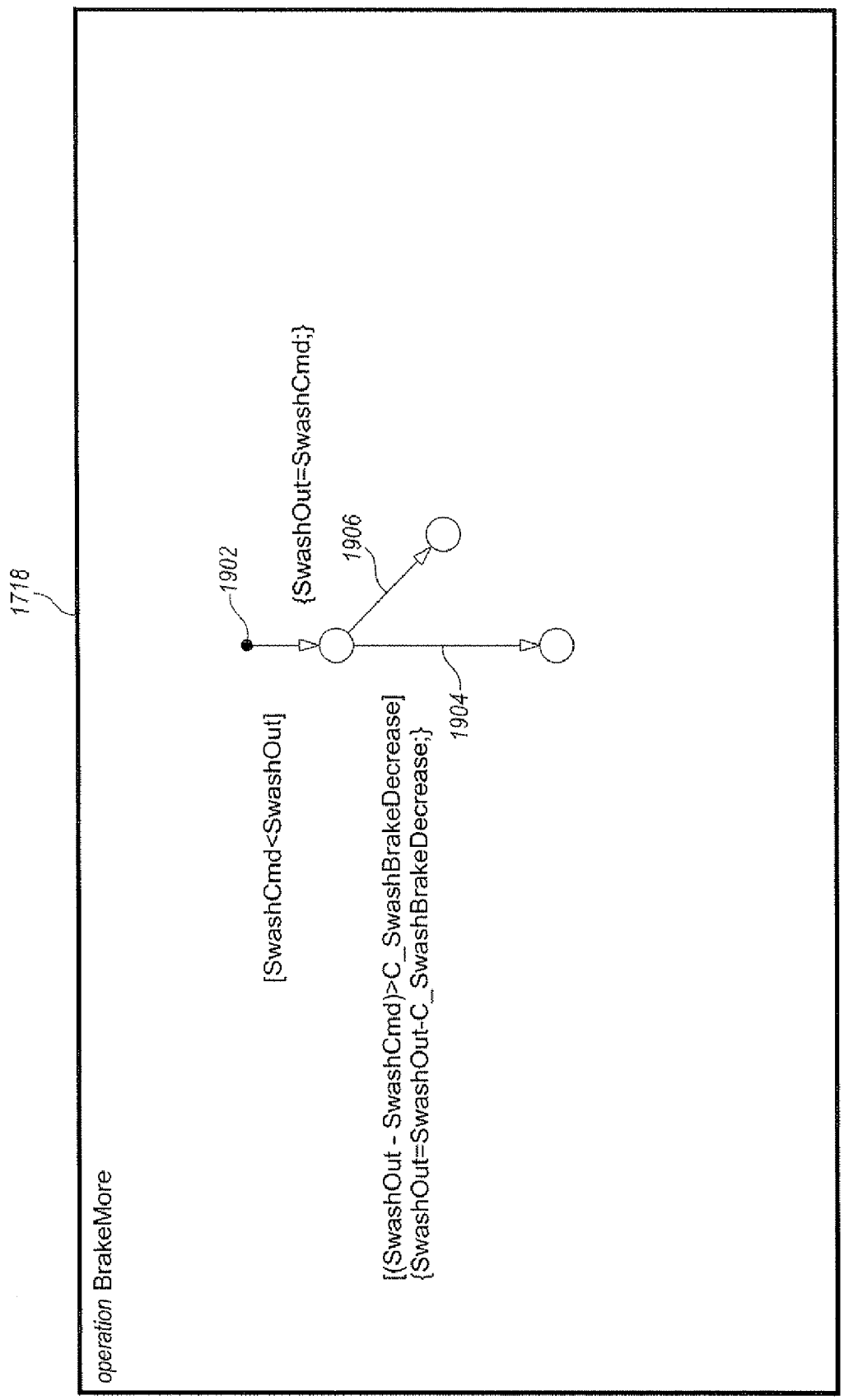
FIG. 19 is an exemplary flow of an operation entitled BrakeMore associated with FIG. 17.

An example of the BrakeMore operation 1718 is illustrated in FIG. 19. Operation 1718 is called when an operator command SwashCmd requests a more negative displacement to swash-plate 216. The operation continues if the variable SwashCmd is less than the value of the variable SwashOut as shown by flow-line 1902. This condition indicates that an operator of vehicle 100 continues to push on the braking pedal. Therefore, the braking command increases. Consequently, the variable SwashOut will be re-computed based on this continued braking command from the operator, but also accounting for a built-in constant rate that will always override an operator command.

Two possible outcomes upon a brake command are therefore possible. As shown by flow-line 1904, if the value of difference between the variables SwashOut and SwashCmd is greater than the constant C_SwashBrakeDecrease, then the variable SwashOut is set to its previous value less the value of the constant. Otherwise, as shown by flow-line 1906, the value of the variable SwashOut is set to the value of the variable SwashCmd.

Accordingly, if a commanded change is greater than the built-in rate of change, the built-in rate of change takes precedence. In one example, the built-in rate is 500 msec for a 15 degree change in angular displacement of swash-plate 216. Thus, if a change of two (2) degrees is commanded, the change cannot happen faster than 2 deg*(500 msec/15 deg) or 66.6 msec. C_SwashBrakeDecrease is set in one example at 0.15 degrees per cycle (i.e., count), where a cycle is 5 msec. Thus, only a 0.15 degree of change will be allowed in 5 msec. The result is that a maximum change from zero (0) degrees to fifteen (15) degrees cannot happen in less than 500 msec.

Figure 20:
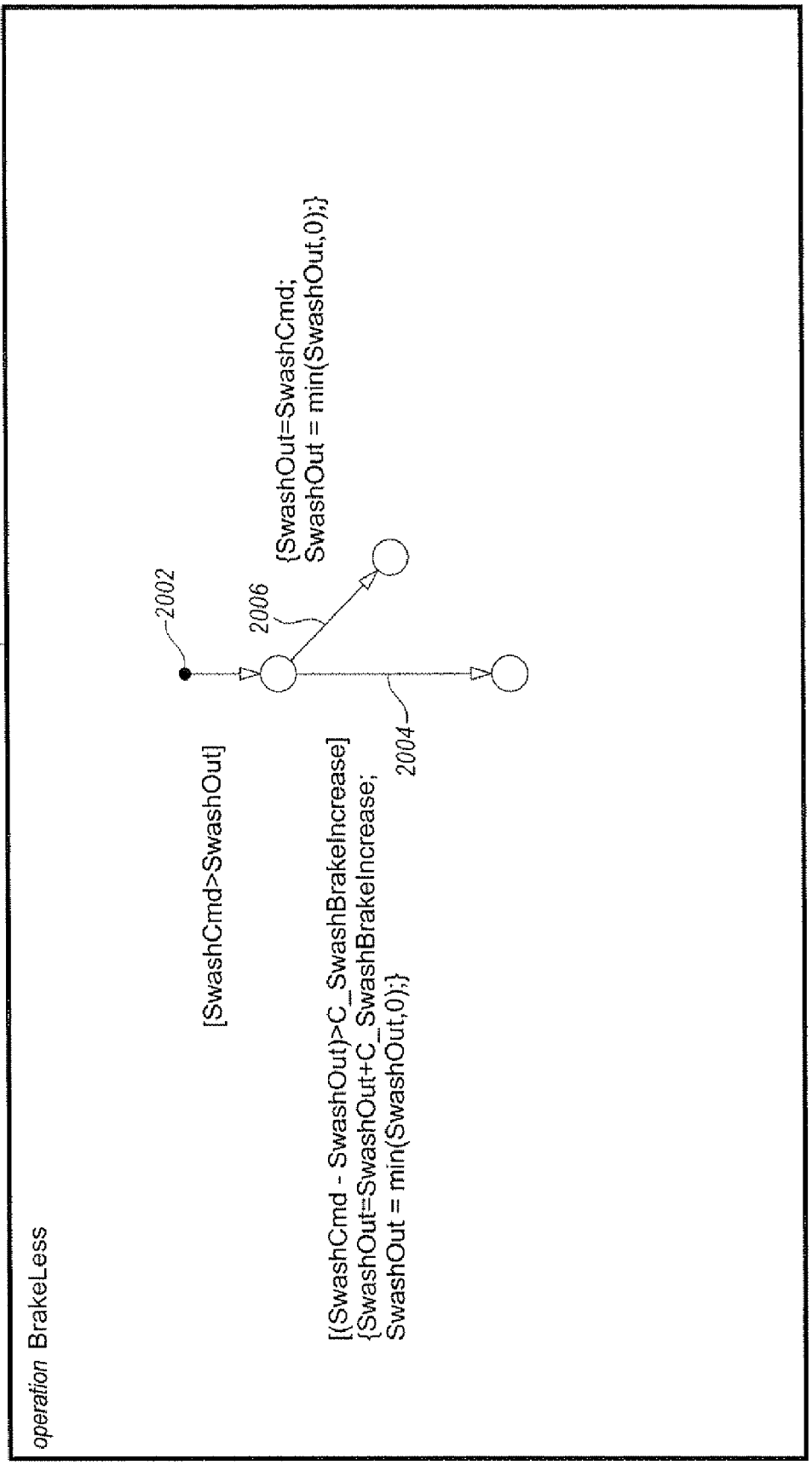
FIG. 20 is an exemplary flow of an operation entitled BrakeLess associated with FIG. 17.

On the other hand, as shown with respect to the BrakeLess operation 1716 in FIG. 20, this latter operation is utilized if the value of the variable SwashCmd is greater than the value of the variable SwashOut as shown by flow-line 2002. The operation 1716 is called if an operator command requests a less negative displacement of swash-plate 216. As shown by flow-line 2004, if the difference between the value of the variable SwashCmd and the variable SwashOut is greater than the constant C_SwashBrakeIncrease, then the value of the variable SwashOut is set to the prior value of SwashOut plus a constant C_SwashBrakeIncrease. Finally, the variable SwashOut is set equal to the minimum value of either the current value of SwashOut or "0". Otherwise, in the other branch of the operation 1716, as shown by flow-line 2006, the value of the variable SwashOut is set equal to the variable SwashCmd. Finally, the variable SwashOut is then set equal to the minimum of either the current value of the variable SwashOut or "0". The setting of the variable to "0," ensures that the system does not go into an acceleration realm of positive angular displacements. The constant C_SwashBrakeIncrease is set to 0.15 using the same rationale as for C_SwashBrakeDecrease, above.

Using the value of SwashOut from either operation 1716 or operation 1718, SwashOut is then set in state 1704 to the maximum of either the current value of SwashOut or the SwashBrakeLimit, whichever is larger (or in other words, whichever is less negative). This ensures that the command does not go beyond the limited command of SwashBrakeLimit, which is the number that is limited by the speed of pump-motor unit 217. In example, if the speed is greater than 2000 RPM, the maximum allowed displacement of swash-plate 216 goes down. (See Table 3).

The value of SwashOut changes while in the Brake state 1704. Depending on the exit conditions associated with either flow-line 1710 or 1712, control passes to different approaches for exiting braking. Following flow-line 1710 first, control passes to ExitBrakeAtConstRate state 1706 when the flag ExitBrake is set to "TRUE". A timer starts. While the timer is operating, the value of the variable SwashOut is set to the current value of SwashOut plus the constant C_SwashBrakeIncrease. Then the variable SwashOut is set to the minimum of the current value of SwashOut or "0". Next, the value of SwashOut is set to the maximum of the current value of SwashOut or the value of the variable SwashBrakeLimit. After the maximum value of SwashOut is determined, the variable NegativeSwashLimit (Table 4) is set equal to the current value of SwashOut. Finally, operation 1722, entitled CheckBrakeDoneConstRate is executed.

In state 1706, the swash-plate 216 is commanded to gradually increase from some negative value towards zero displacement, but by increments not larger than the constant C_SwashBrakeIncrease. Swash-plate 216 also needs to be limited by zero (0) on the positive or maximum side and by SwashBrakeLimit on the negative or minimum side. That is why SwashOut=min (SwashOut, 0) and SwashOut=max (SwashOut, SwashBrakeLimit).

Figure 21:
FIG. 21 is an exemplary flow of an operation entitled CheckBrakeDoneConstRate associated with FIG. 17.

The execution of CheckBrakeDoneConstRate operation 1722 is illustrated in FIG. 21. If the value of SwashOut is greater than or equal to the constant C_SwashBrakeIdleBand (reached neutral), or the time elapsed in state 1706 is greater than value of the constant C_SwashCmdBrakeLimit (see discussion with respect to FIG. 5) divided by SwashBrakeIncreaseRate, then the flag DoneBrake is set equal to "TRUE". Otherwise, the flag for DoneBrake is set equal to "FALSE".

Continuing to use the example of 500 msec as the maximum acceptable time to move swash-plate 216 from a maximum angular displacement to neutral when the maximum angular displacement is approximately fifteen (15) degrees, the value of SwashBrakeIncreaseRate as a ratio is set to 500 msec. Thus, the CheckBrakeDoneConstRate operation 1722 acts like a time out operation.

Exemplary values of various constants follow:

SwashBrakeDecreaseRate=15/0.5; % (deg/sec), larger magnitude

SwashBrakeIncreaseRate=15/0.5; % (deg/sec), smaller magnitude

C_SwashBrakeDecrease=SwashBrakeDecreaseRate*5 msec; % (deg)

C_SwashBrakeIncrease=SwashBrakeIncreaseRate*5 msec; % (deg)

If flow-line 1712 is followed between states 1704 and 1708, then the exit of braking is at a variable rate using ExitBrakeAtVarRate state 1708. The variable AccPressureLimitRatio is set equal to the difference between maximum pressure AccPressMax (Table 3) allowed in the high pressure accumulator 138 and the pressure AccPress measured by sensor 282 divided by the difference between AccPressMax and the variable MaxAccPressToBrake (Table 3). A variable LimitRatio is set equal to the value of the variable AccPressureLimitRatio. A variable SwashOutTemp is set equal to the variable SwashBrakeLimit (Table 3) multiplied by the variable LimitRatio. The value of SwashOut is then set to the maximum of the current value of SwashOutTemp or the value of the variable SwashCmd. Next, the value of SwashOut is set to the minimum of the current value of SwashOut plus an offset represented by the constant C_SwashBrakeIncrease. The value of SwashOut is here in case that, instead of going toward neutral, the swash-plate 216 is commanded to go in the opposite direction. In any event, it should not go faster than the built-in rate, as previously discussed. A command to swash-plate 216 to go in the opposite direction instead of toward neutral is likely to only happen when the pressure goes lower instead of higher and there is a need to ensure the constant rate.

The value of SwashOut is set to the minimum of the current value of the current value of SwashOut or the value "0". This setting prevents entering the acceleration realm of positive displacement. The value NegativeSwashLimit is set equal to the value of SwashOutTemp.

Finally, operation 1720, entitled CheckBrakeDoneVarRate, is executed. Swash-plate 216 will gradually move toward zero displacement by a factor proportional to how far the actual pressure is from the maximum allowed pressure. The pressure gradually goes more towards a maximum allowed pressure and the swash plate 216 gradually goes towards zero displacement. At the same time, there are protections provided to prevent an undesirable movement into positive displacement or towards more negative displacement if for some reason the pressure reverses.

Figure 22:
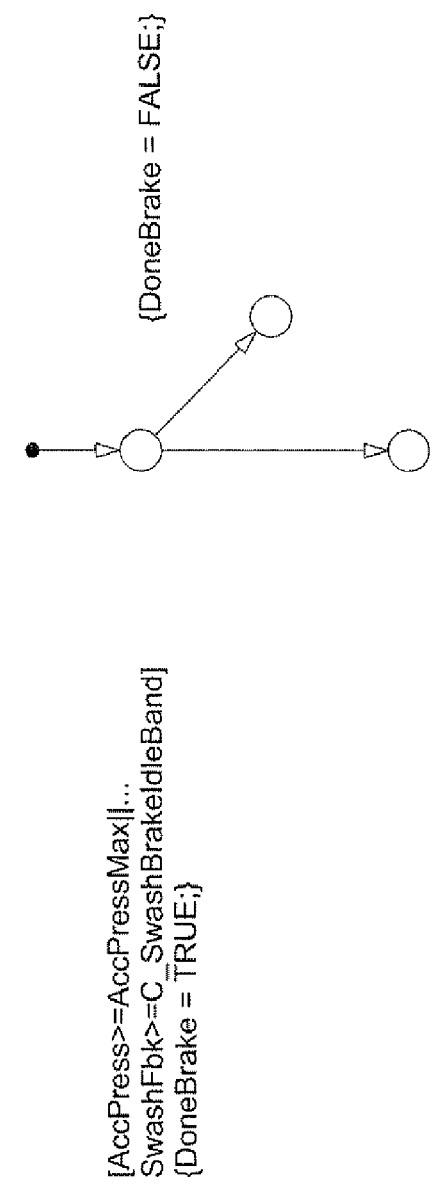
FIG. 22 is an exemplary flow of an operation entitled CheckBrakeDoneVarRate associated with FIG. 17.

The execution of CheckBrakeDoneVarRate operation 1720 is illustrated in FIG. 22. The flag DoneBrake is set equal to "TRUE" if the accumulator pressure AccPress is greater than the value of the maximum acceptable pressure AccPressMax, or if the angle SwashFbk from sensor 218 and/or 220 is greater or equal to than the constant C_SwashBrakeIdleBand. Otherwise, the variable DoneBrake is set to "FALSE". Generally, braking may be determined to be done if the swash-plate 216 is in its neutral position, or if the pressure of the accumulator 238 is at its maximum acceptable level.

Please note that there are symmetries between the pumping mode and the acceleration mode. For example, more generally the variable AccPressressureLimitRatio for both modes can be considered as the absolute value of the difference between a high pressure device pressure threshold and the measured pressure divided by the difference between the a high pressure device pressure threshold and a predetermined pressure. The high pressure device pressure threshold will either be AccPressMin or AccPressMax while the predetermined pressure will either be MinAccPressToAccel or MaxAccPressToBrake.

Figure 23:
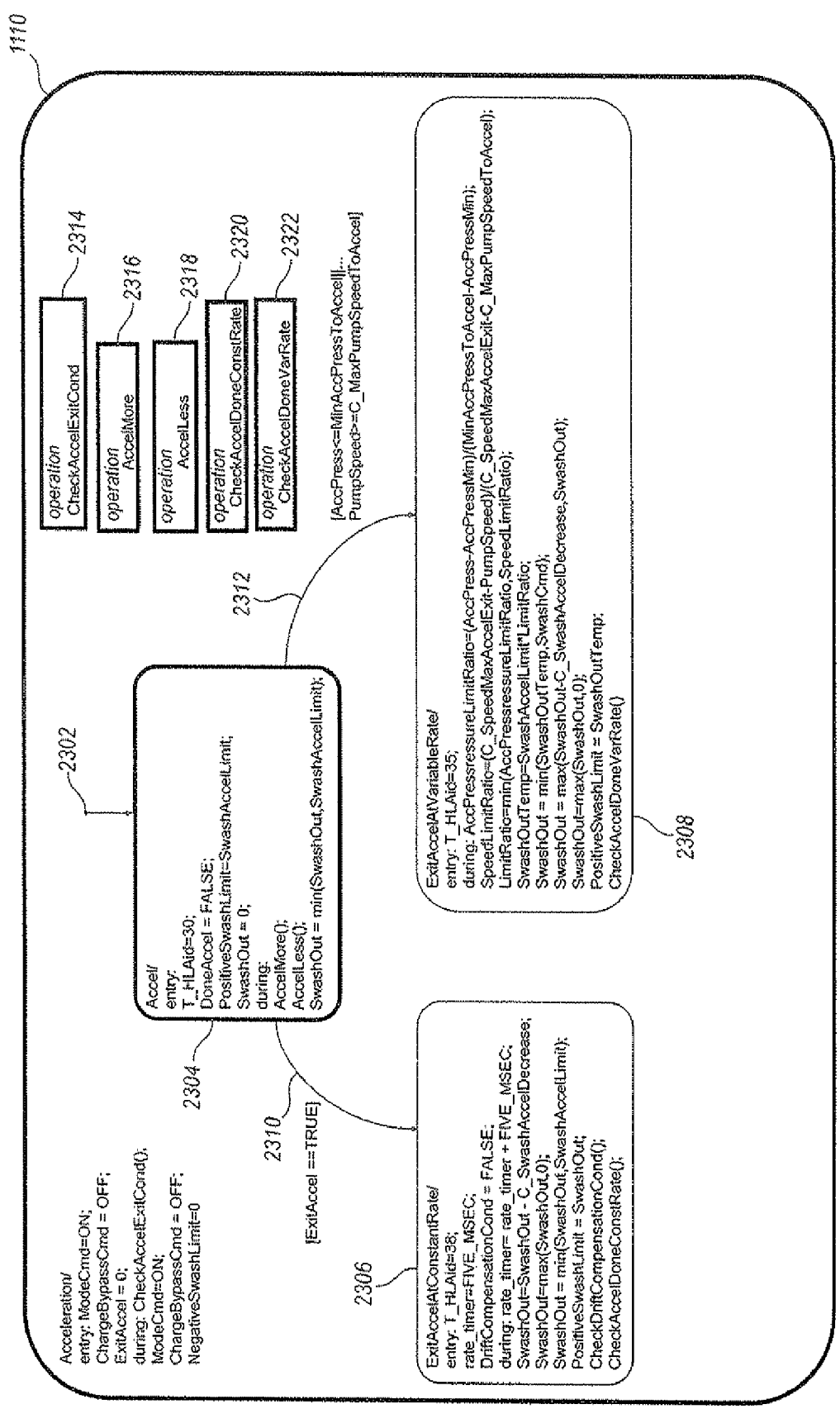
FIG. 23 is an exploded view of a portion of the flow of FIG. 11 and relates to a motoring mode.

Acceleration operational realm 1110 is shown in more detail in FIG. 23. Control enters into operational realm 1110 by way of entry point 2302. Three states, 2304, 2306, and 2308, are illustrated in FIG. 17. Control initially passes into state 2304, entitled Accel. When a flag ExitAccel is set to "TRUE", control passes to state 2306, entitled ExitAccelAtConstRate, as shown by flow-line 2310. Otherwise, when (i) the pressure of accumulator sensor 282 is less than or equal to greater than the value of MinAccPressToAccel; or (ii) the speed of pump-motor unit 217 is greater than or equal to the constant C_MaxPumpSpeedToAccel, then control passes from state 2304 to state 2308, entitled ExitAccelAtVarRate, as shown by flow-line 2312.

In one exemplary illustration MinAccPressToAccel is set equal to 150 Bars. This is the default value. The value, acting as a limit, is constantly being evaluated and modified by the temperature compensation heuristic 800 discussed with respect to FIGS. 7 and 8. The rationale is the following: this value is directly related (positive 15 bar offset) to the variable AccPressMin. AccPressMin defaults to 135 Bars in the illustration because it was found to be close to the accumulator precharge value. If hydraulic drive system goes below this value the high pressure proximity switch 284 closes and the pressure in the system drops to close to zero.} As noted above with respect to FIG. 13, the constant C_MaxPumpSpeedToAccel represents the maximum pump speed that is acceptable to permit the motoring mode without potentially damaging the pump-motor 130 or charge pump 204. Various operations, 2314, 2316, 2318, 2320 and 2322 are called while in operational realm 1110.

In contrast to the pumping mode, when entering operational realm 1110, a signal is sent to open mode valve 232 using solenoid 238 while there is no signal to charge by-pass valve 263, permitting it to become open. While in operational realm 1110, operation 2314, entitled CheckAccelExitCond, is executed. Also while in the operational mode 1110, the signal to solenoid 238 continues to be "ON," while the signal to charge by-pass valve solenoid 266 continues to be "OFF," The variable NegativeSwashLimit (Table 4) is set equal to "0," because the variable relates to the pumping mode and not to the motoring mode.

Figure 24:
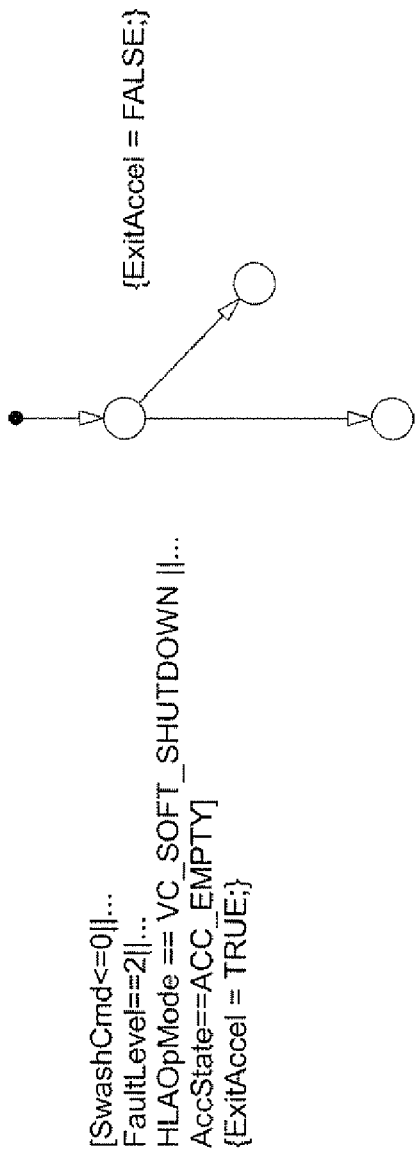
FIG. 24 is an exemplary flow of an operation entitled CheckAccelExitCond associated with FIG. 23.

CheckAccelExitCond operation 2314 is illustrated in FIG. 24. The flag ExitAccel is set equal to "TRUE" if one of the following conditions is met: (i) the variable SwashCmd is less than or equal to "0"; (ii) there is a predefined fault; (iii) the controller is set to do a "soft shutdown;" or (iv) the high pressure proximity switch 284 changes state to "accumulator empty." The latter condition will result in the need for invoking the precharge logic as discussed above. If none of the conditions (i) through (iv) are met, then the flag ExitAccel is set equal to "FALSE".

As noted above, when control passes to operational realm 1110, control enters at entry point 2302 and passes into Accel state 2304. The flag DoneAccel is set equal to "FALSE". The variable PositiveSwashLimit (Table 4) is set equal to the value of the variable SwashAccelLimit (Table 3), and the variable SwashOut (Table 3) is set equal to "0" degrees. While staying within operational realm 2304, operation 2316, entitled AccelMore, and operation 2318, entitled AccelLess are executed. Finally, the value of SwashOut is set as (i) the minimum of the current value of SwashOut after the operations are called, or (ii) the value of SwashAccelLimit.

Figure 25:
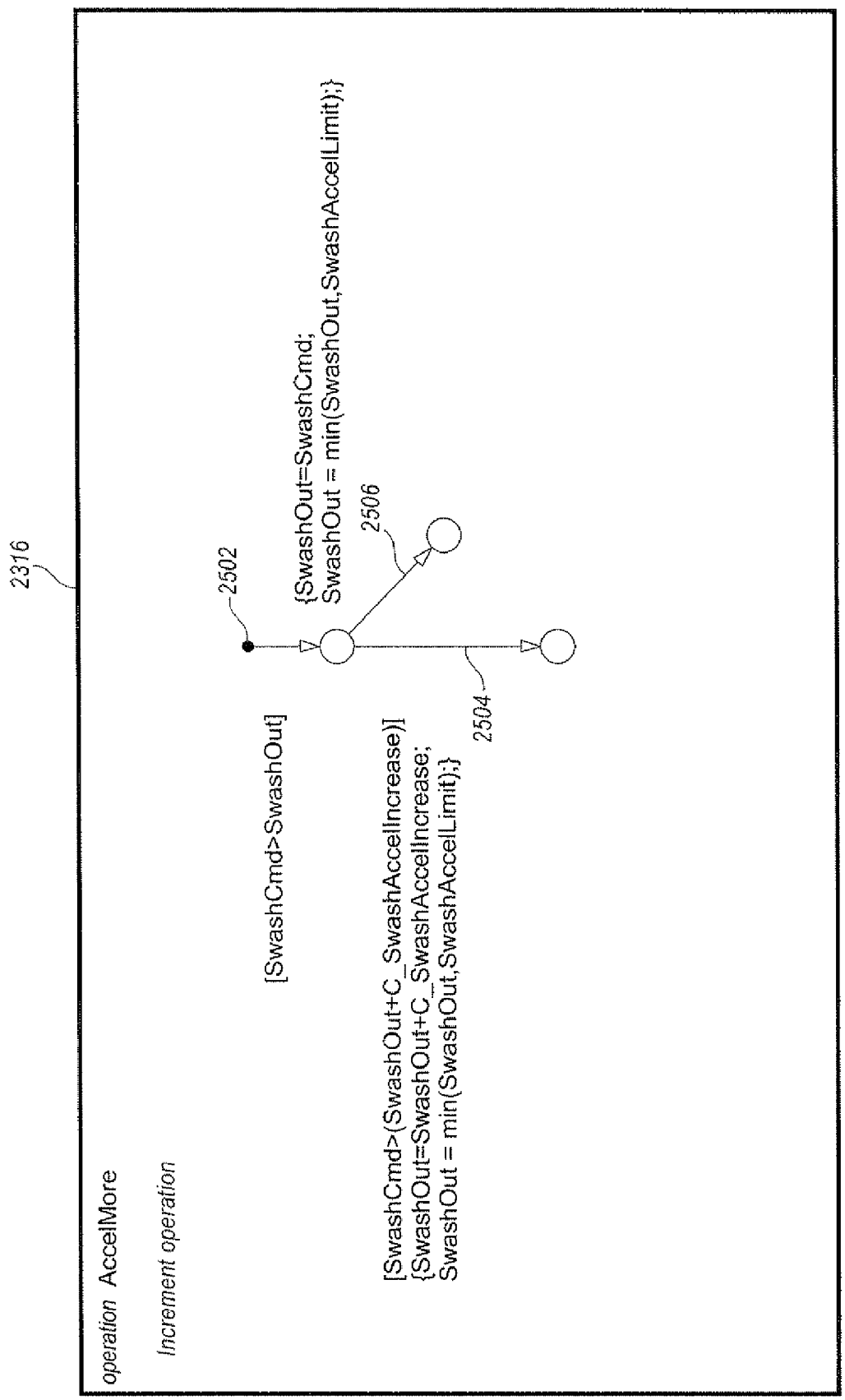
FIG. 25 is an exemplary flow of an operation entitled AccelMore associated with FIG. 23.

The AccelMore operation 2316 is illustrated in more detail in FIG. 25. Operation 2316 is called when an operator command requests a more positive displacement to swash-plate 216. In order for the operation 2316 to continue executing, the value of SwashCmd must be greater than the current value of SwashOut as shown by flow-line 2502. If the value of SwashCmd must be greater than the current value of SwashOut, then one of two values of SwashOut are possible. As shown by flow-line 2504, if the value of SwashCmd is greater than the current value of SwashOut plus the value of a constant C_SwashAccelIncrease, then the value of SwashOut is first set equal to the current value of SwashOut plus the amount of the constant C_SwashAccelIncrease.

Operation 2316 generally mirrors the one discussed above with respect to C_SwashBrakeIncrease in operation 1716. The purpose of the operation 2316 is to prevent an increase in angular displacement of swash-plate 216 of more than an equivalent of fifteen degrees in 500 msec using one set of exemplary values. A constant, built-in rate overrides any operator command seeking movement beyond the maximum acceptable built-in rate to avoid abrupt changes in acceleration.

Exemplary values of various constants follow:

% Motor Swash Constants (motoring is positive)

SwashAccelDecreaseRate=15/0.5; % (deg/sec)

SwashAccelIncreaseRate=15/0.5; % (deg/sec)

C_SwashAccelDecrease=SwashAccelDecreaseRate*5 msec; % (deg)

C_SwashAccelIncrease=SwashAccelIncreaseRate*5 msec; % (deg)

Finally, SwashOut is set to the minimum of the current value of SwashOut or the value of SwashAccelLimit. Otherwise, as shown by flow-line 2506, the value of SwashOut is set to the value of SwashCmd, and then the value of SwashOut is set to the minimum of either the current value of SwashOut or the value of SwashAccelLimit. Thus, the swash plate 216 is commanded to a more positive displacement (i.e., to accelerate more). First, there is a check to see if the increase in the operator command is greater than the built-in rate C_SwashAccelIncrease. If there is, then the operator command is overridden by the built-in rate. Otherwise, the operator command is applied because it is not greater than the maximum built-in rate, and therefore the operator command is acceptable. Further, the maximum command is generally limited to less than the value of SwashAccelLimit.

Figure 26:
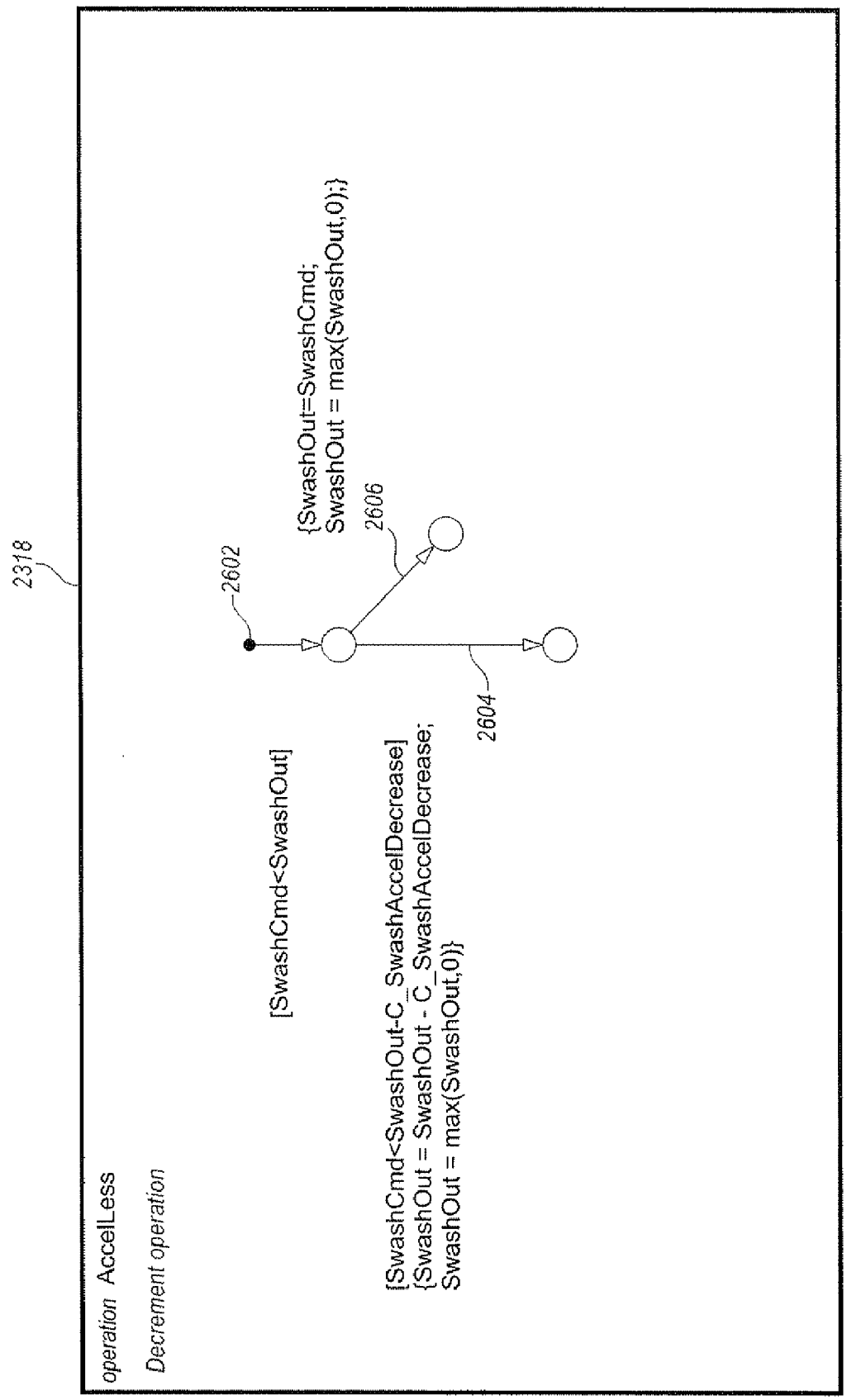
FIG. 26 is an exemplary flow of an operation entitled AccelLess associated with FIG. 23.

The AccelLess Operation 2318 is shown in more detail in FIG. 26. It is called when an operator command requests a less positive angular displacement to swash-plate 216. In order for the operation 2318 to continue, the value of the variable SwashCmd must be less than the value of the variable SwashOut as shown by flow-line 2602. If it is, then one of two possible flow-lines may be followed. As illustrated by flow-line 2604, if the value of SwashCmd is less than the difference between the value of SwashOut and the constant C_SwashAccelDecrease, then the value of SwashOut is set to the difference between the current value of SwashOut and the constant C_SwashAccelDecrease. Finally, the value of SwashOut is set to the maximum of the current value of SwashOut or "0". If the conditions associated with flow-line 2604 are not met, then, as shown by flow-line 2606, the value of SwashOut is first set equal to the value of SwashCmd. Then the value of SwashOut is set equal to the maximum of the current value of SwashOut or "0".

Swash-plate 216 in the foregoing scenario is commanded to a less positive displacement (i.e., to accelerate less). Controller 140 checks to see if the decrease in operator command is greater than the built-in rate C_SwashAccelDecrease, and if so, the operator command is overridden by the built-in-rate. Otherwise, the command is applied because it is not greater than the built-in rate and is therefore acceptable. Moreover, checks are placed to limit the operator command to no less than "0".

Control passes from Accel state 2304 to ExitAccelAtConstantRate 2306 by way of flow-line 2310 when the condition ExitAccel is set to "TRUE". When in state 2306, the flag DriftCompensationCond is set equal to "FALSE". A timer is started. While the timer is running, the value of SwashOut is set equal to difference between the current value of SwashOut and the constant C_SwashAccelDecrease (no change being permitted that is greater than the built-in rate). Next, the value of SwashOut is set to the maximum of either current value of SwashOut or "0". This setting is a guard to make sure the system does not decrease below "0". Next, the value of SwashOut is set to the minimum of the current value of SwashOut or the value of the variable SwashAccelLimit. This is a guard to a maximum SwashAccelLimit. Once the minimum value of SwashOut has been set, the variable PositiveSwashLimit is set equal to the current value of SwashOut. Finally, the CheckDriftCompensationCond operation 1112 is executed, followed by the operation 2320, entitled CheckAccelDoneConstRate.

Figure 27:
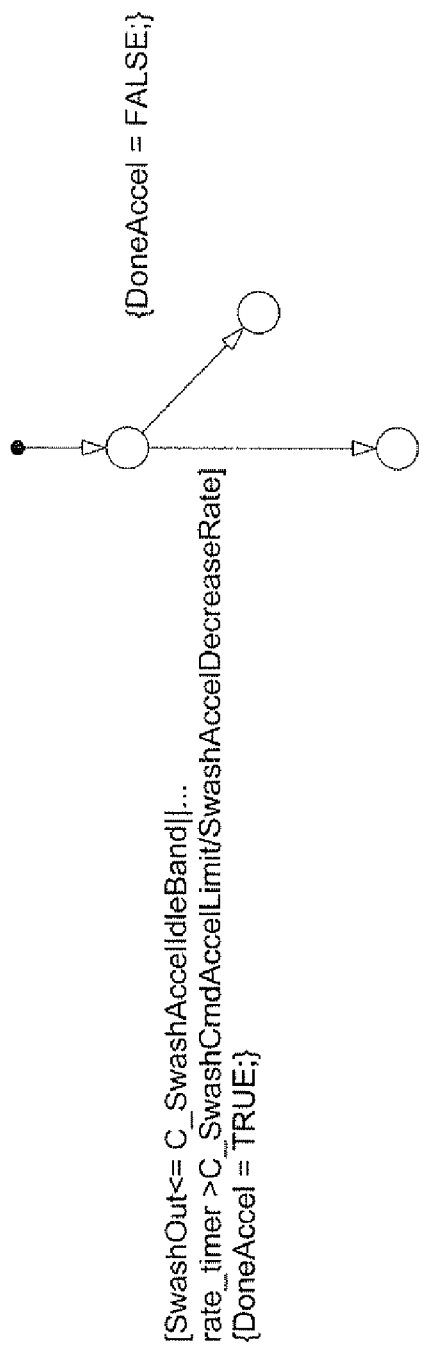
FIG. 27 is an exemplary flow of an operation entitled CheckAccelDoneConstRate associated with FIG. 23.

The CheckAccelDoneConstRate operation is discussed in more detail in FIG. 27. In order for the flag DoneAccel to be set equal to "TRUE," one of the following conditions must be met: (i) the value of SwashOut must meet be less than the constant C_SwashAccelIdleBand; or (ii) the time associated with the timer for state 2306 is greater than the value of C_SwashCmdAccelLimit (FIG. 5) divided by the value of the variable SwashAccelDecreaseRate. Otherwise, the flag DoneAccel is set equal to <"FALSE."

An alternative way to exit Accel state 2304 is to go to ExitAccelAtVariableRate state 2308 by way of flow-line 2312. One of two conditions associated with flow-line 2312 must be met. The accumulator press AccPress associated with sensor 282 must be less then or equal to the minimum pressure to accelerate MinAccPressToAccel. Alternatively, the speed of motor-pump 217 is greater than or equal to the constant C_MaxPumpSpeedToAccel.

When in state 2308, the value of the variable AccPressresureLimitRatio is equal to the difference between the accumulator pressure AccPress and the value of AccPressMin (Table 4) divided by the difference between the value of MinAccPresstoAccel and the value of AccPressMin. The variable SpeedLimitRatio is set equal to the difference between the constant C_SpeedMaxAccelExit and the current speed of pump-motor unit 217 divided by the difference between the constant C_SpeedMaxAccelExit and the constant C_MaxPumpSpeedToAccel. The constant C_SpeedMaxAccelExit is set in one exemplary approach at 2500 RPM. More generally, however, the value is set to a speed determined to be too high for the pump 217 to spin at displacement. Thus, the foregoing limitation is an operation of a hardware limitation. A variable SwashOutTemp is set equal to the value of SwashAccelLimit times the value of SpeedLimitRatio. Next the variable SwashOut is set equal to the minimum of the current value of SwashOutTemp or the current value of SwashCmd (to impose a change no higher than the variable limit).

Next, the value of SwashOut is set equal to the maximum of the difference between the current value of SwashOut and the constant C_SwashAccelDecrease, or the current value of SwashOut. This setting is done in case either the pressure or the speed begin to change in an opposite direction. Thus, this setting of SwashOut ensures a gradual change; in this case, the constant rate is used.

Finally, the value of SwashOut is set to the maximum of the current value of SwashOut or the value "0" to guard against no less than zero ("0") displacement. The variable PositiveSwashLimit is set equal to value of SwashOutTemp. Next, operation 2322, entitled CheckAccelDoneVarRate, is executed.

Figure 28:
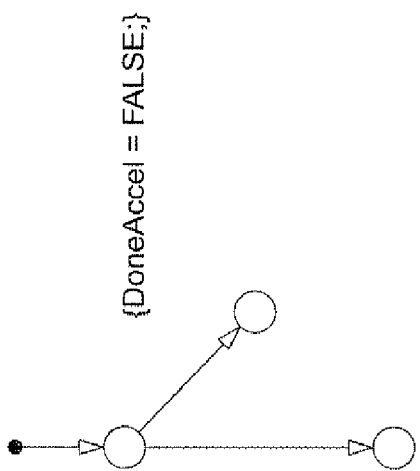
FIG. 28 is an exemplary flow of an operation entitled CheckAccelDoneVarRate associated with FIG. 23.

CheckAccelDoneVarRate operation 2322 is illustrated in FIG. 28. The flag DoneAccel is set equal to "TRUE" if one of following three exemplary conditions are satisfied: (i) the accumulator pressure AccPress is less than or equal to the value of AccPressMin; (ii) the speed of pump-motor 217 is greater than or equal to the constant C_SpeedMaxAccelExit; or (iii) the angular displacement SwashFbk of swash-plate 216 is less than or equal to the constant C_SwashAccelIdleBand. Otherwise, the flag DoneAccel is set equal to "FALSE".

Aggressive Clutching

Figure 29:
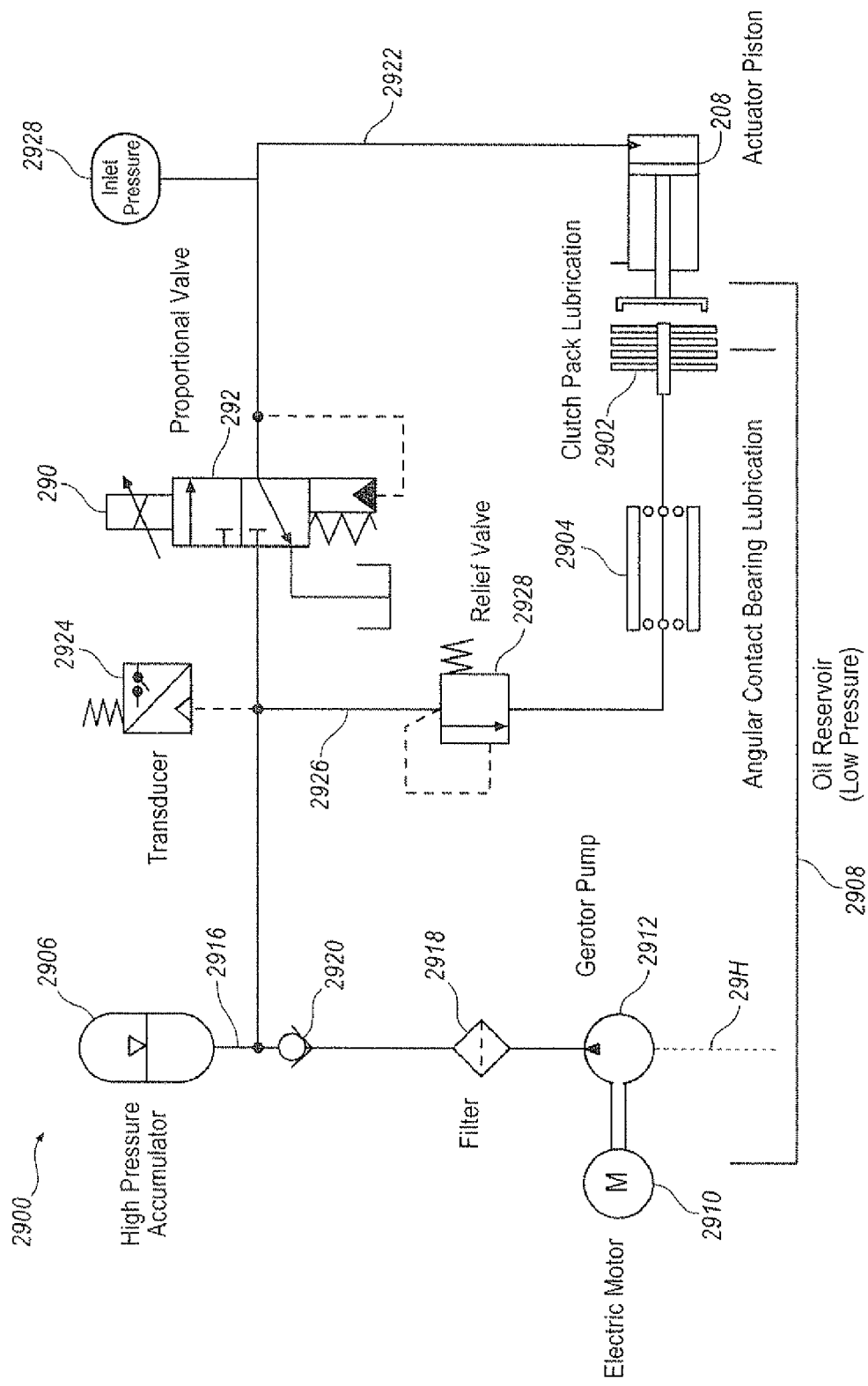
FIG. 29 is a simplified portion of an exemplary hydraulic circuit for a clutch system for use with an aggressive clutch mechanism.

Another mechanism to improve the efficient use of hydraulic drive system 102 is the use of aggressive clutching. The mechanism is used primarily when clutch 208 is a progressive wet disk friction clutch such as is known. A simplified portion of an exemplary hydraulic circuit 2900 for a clutch system for use with an aggressive clutch mechanism is shown in FIG. 29. Circuit 2900 includes clutch 208, shown as an actuator piston. Associated with the actuator piston 208, however, is clutch pack lubrication 2902 and angular contact bearing lubrication 2904. Circuit 2900 includes a high pressure accumulator 2906 and a hydraulic fluid reservoir, called oil reservoir 2908. Hydraulic fluid flows from reservoir 2908 to high pressure accumulator by way of an electric motor 2910 rotating a gerotor pump 2912 from a low pressure side conduit 2914 to a high pressure side conduit 2916 through a filter 2918 and a one-way check valve 2920.

When clutch 208 is applied, solenoid 290 causes selective and controlled application of proportional clutch valve 292, receiving high pressure hydraulic fluid from accumulator 2906 by way of high pressure conduit 2916. The strength of the signal received by solenoid 290 controls the level of hydraulic force applied by valve 292 using the available fluid, thereby controlling the amount of force applied by clutch 208 as represented by the illustrative actuator piston in FIG. 29. Fluid flowing through proportional clutch valve 292 follows fluid conduit 2922 to clutch 208. Disposed within high pressure conduit 2916, however, between accumulator 2906 and proportional clutch valve 292 is a transducer 2924, providing an alternate pathway conduit 2926 within circuit 2900. Conduit 2926 is disposed between transducer 2924 and both angular contact bearing lubrication 2904 and clutch pack lubrication 2902. A relief valve 2928 is disposed within conduit 2926 downstream of transducer 2924, but upstream of the lubrication mechanisms 2902 and 2904. Finally, inlet pressure for the clutch can be measured using sensor 2928.

As illustrated in general terms in FIGS. 1 and 2, when a clutch 208 associated with vehicle drive-line 116 is used to interconnect intermediate shaft 202 to gearing set 210 and then to shaft 206 thereby to convert mechanical energy to hydraulic energy, there is a potential problem of parasitic drag. Thus, it is desirable to have hydraulic drive system 102 disengaged from the rest of vehicle drive system 110 until it is needed. Yet, when system 102 needs to engage, it is also desirable to have the clutch 208 apply as quickly as possible, so that the maximum amount of power may be turned into hydraulic energy, and also transparently to a vehicle 100 operator; that is, without causing undesirable torque spikes within drive-line 116.

Figure 30:
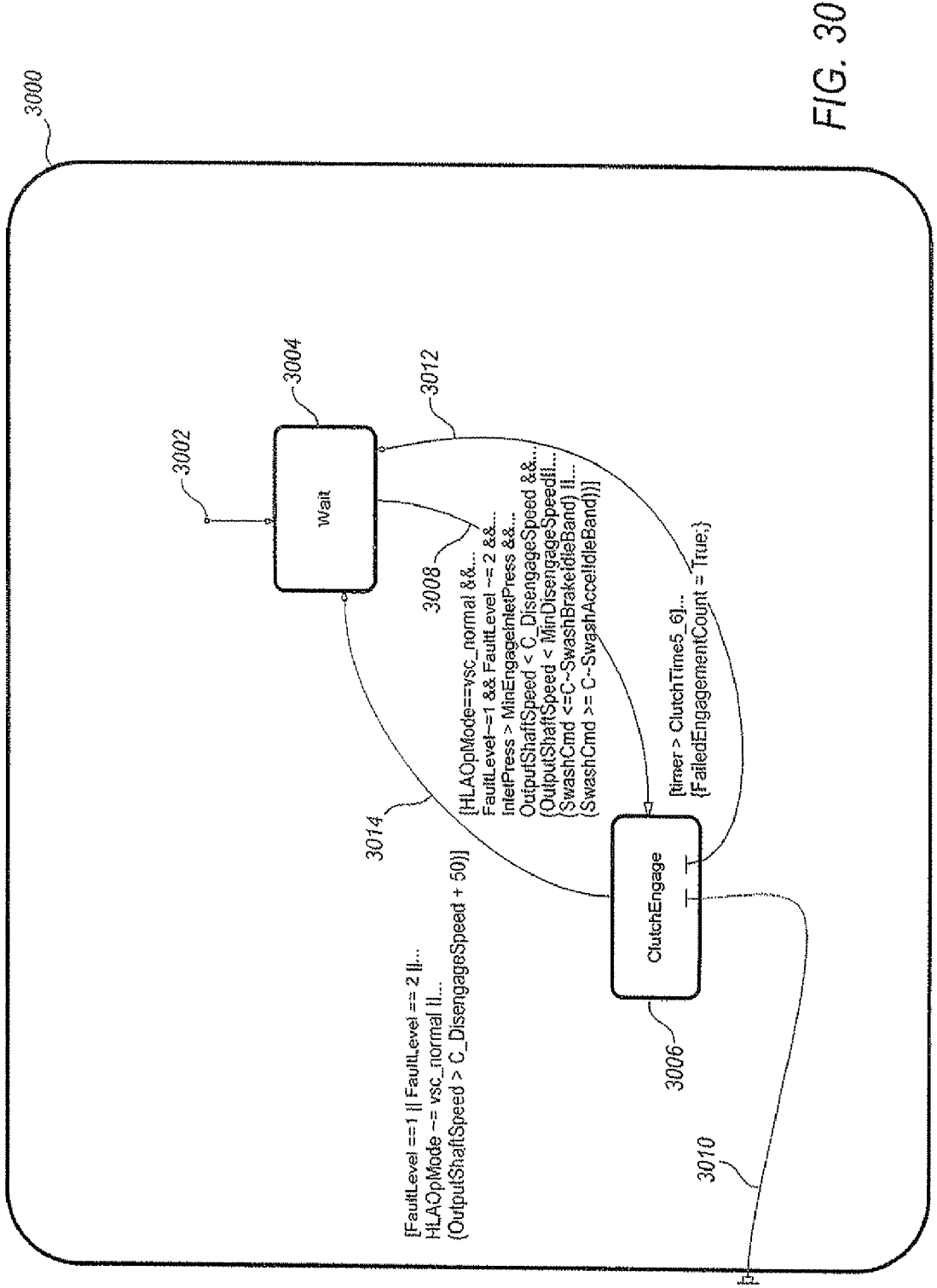
FIG. 30 is an exemplary flow of a subsystem to a hydraulic drive system illustrating the concept of aggressive clutching using the hydraulic circuit of FIG. 29.

A subsystem 3000 of hydraulic drive system 102 is illustrated in FIG. 30. The subsystem 3000 is entered at entry point 3002 when drive system 102 is disposed between a motoring mode and a pumping mode. Two operational realms are shown, operational realm 3004, entitled Wait, and operational realm 3006, entitled ClutchEngage. Wait operational realm 3004 is discussed further below with respect to FIG. 31, while ClutchEngage operational realm 3006 is discussed below with respect to FIGS. 32 through 35.

Control leaves Wait operational realm 3004 to go to ClutchEngage operational realm 3006 by way of flow-line 3008 when five exemplary conditions are all met. In some systems more or fewer conditions may be required. First, the variable HLAOpMode must be set to a flag vsc_normal indicating that the hydraulic drive system is operating normally and may be permitted to move between a pumping mode and a motoring mode. Second, there must be no faults that keep the system from operating correctly. For example, flow-line 3008 is traversed when FaultLevel is not equal to "1" and not equal to "2". As noted in Table 3, above, one type of fault may be a hardware fault, while another type of fault may be related to logic. Third, the inlet pressure associated with clutch 208 as measured by sensor 2928 must be greater than a minimum threshold MinEngageInletPress, which is a constant. The value of the constant will vary from system to system, but should be generally adequate to permit full application of clutch 208 to permit either a charge operation or a discharge operation. The fourth condition that needs to be met is that the speed of rotation of the shafts OutputShaftSpeed associated with drive-line 116, including intermediate shaft 202, and as provided by the CAN associated with vehicle 100 (See Table 3), is less than a constant C_DisengageSpeed, which is maximum disengagement speed. Finally, the fifth condition that also must be met along with conditions one through four actually must include at least only one of the following three conditions: (i) the variable TransShaftSpeed must be less than a constant MinDisengageSpeed; (ii) the variable SwashCmd must be less than or equal to the constant C_SwashBrakeIdle- Band or (iii) the variable SwashCmd must be greater than or equal to the constant C_SwashAccelIdleBand. The variable SwashCmd is discussed in Table 3 and with respect to FIG. 5. The constants C_SwashBrakeIdleBand and C_SwashAccelIdleBand are discussed in more detail with respect to the conditions of Flow-Line 908. Regarding the constant MinDisengageSpeed, it is used to disengage clutch 208 if pump-motor 130 has been rotating at a pump speed greater than the value of the constant for too long while being held at zero displacement (in neutral), which is a harmful condition for pump-motor 130. If such a condition takes place, FaultLevel is set to a value of "1", which is a condition to go from Engaged state 1100 to a disengaged state.

Once control has passed from operational realm 3004 to operational realm 3006, there are three ways to leave operational realm 3006. First, if the clutch 208 correctly engages, then sub-system 3000 is exited by way of flow-line 3010. Alternatively, if a time for clutch engagement is greater than variable ClutchTime5_6 discussed in more detail below, including with respect to FIG. 35, then, as shown by flow-line 3012, the flag FailedEngagementCount (Table 4) is set to "TRUE," and control returns back to operational realm 3004. Finally, control also passes from ClutchEngage operational realm 3006 to Wait operational realm 3004 if one of the following conditions are satisfied. First, a fault is detected as shown by FaultLevel being equal to either "1" or "2" in the illustrated flow-line 3014. Second, the variable HLAOpMode is not equal to the flag for normal operation vsc_normal. Finally, the third possible condition for flow-line 3014 is that the output shaft speed for drive-line system 110 is greater than the constant C_DisengageSpeed plus a predetermined offset, which is illustrated in this example as fifty (50) RPM.

Figure 31:
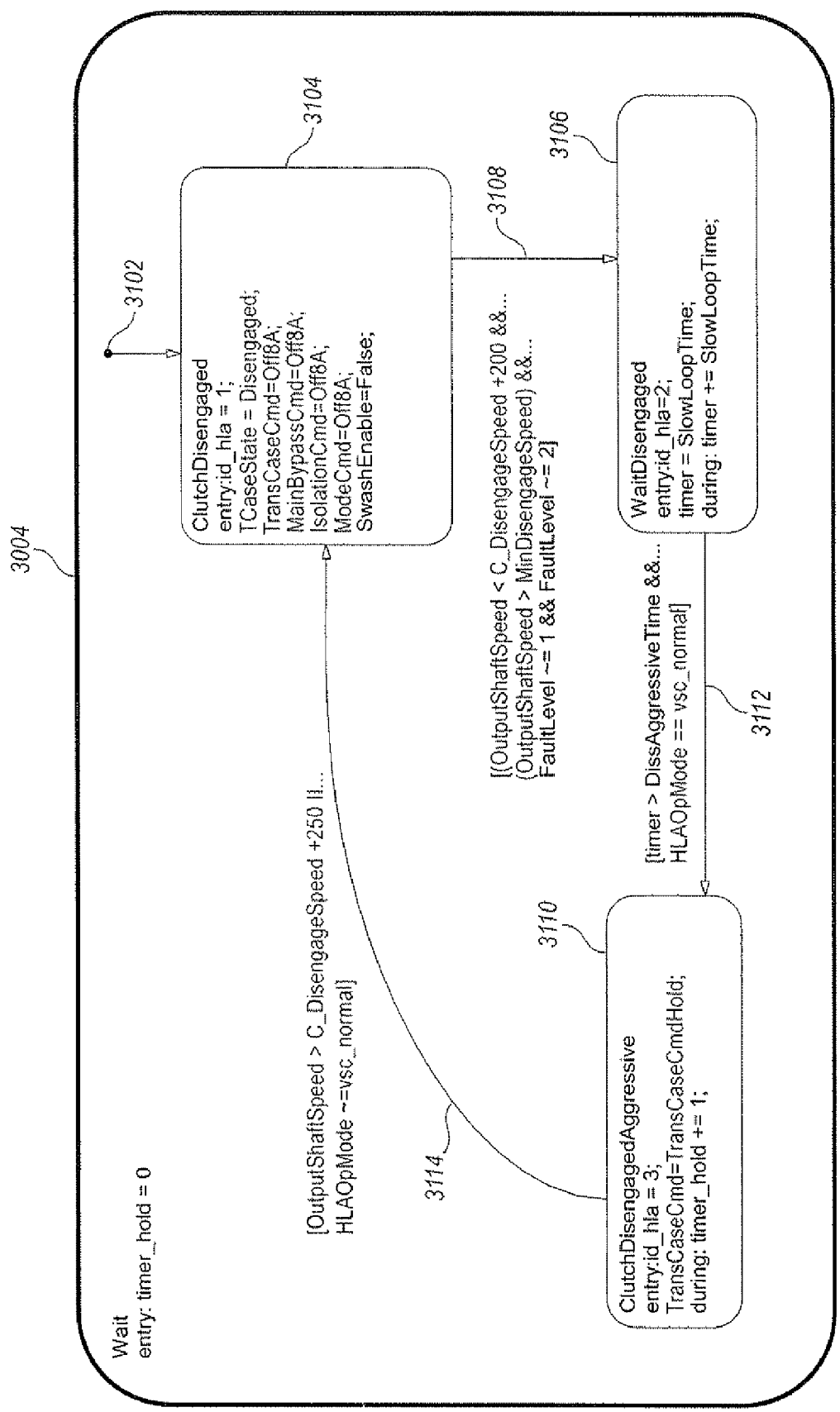
FIG. 31 is an exploded view of a portion of the flow of FIG. 30 and relates to waiting.

The Wait operational realm 3002 is illustrated in greater detail in FIG. 31. Basically, within operational realm 3002, if certain conditions are met, a command is applied to the clutch 208 in the form of a current so that the clutch is almost ready to apply, i.e., is very close to a threshold to apply. Because a very little bit more current is required to apply the clutch, meaning the clutch may be engaged very quickly. Whether the current is applied is highly dependent on the speed of the shafts of drive-line system 110, including intermediate shaft 202.

Operational realm 3002 is entered by way of entry point 3102, where control passes to state 3104, entitled ClutchDisengaged. A command by way of TransCaseCmd has been sent to solenoid 290 to make sure that clutch 208 is disengaged. The signal MainBypassCmd to bypass valve 246, the signal IsolationCmd to isolation valve 242, and the signal ModeCmd to mode valve 232 have all been set to condition "OFF," with the consequences for each of the valves as discussed, for example, in Table 4. Finally, the flag associated with variable SwashEnable has been set to "FALSE," as discussed with respect to Table 4.

Control passes from state 3104 to state 3106, entitled WaitDisengaged, by way of flow-line 3108, when the conditions associated with the flow-line 3108 are met. These conditions are that, first, output shaft speed OutputShaftSpeed must be less than the constant C_DisengageSpeed plus an offset, which is illustrated as 200 RPM. Second, the output shaft speed must be greater than the constant MinDisengageSpeed. Third, there cannot be a system fault FaultLevel.

When in state 3106, a timer is started. The purpose of starting this timer is to make sure that all the conditions necessary for the clutch 208 to engage are maintained. Control passes to state 3110, entitled ClutchDisengagedAggressive, by way of flow-line 3112, when the time associated with the timer of state 3106 is greater than a value set as DissAggressiveTime and the operational mode of hydraulic drive system HLAOpMode is normal.

In state 3110 a flag is set with respect to the variable TransCaseCmd to send a signal to clutch 208 by way of solenoid 290 to clutch valve 292 so that clutch 208 is just about ready to engage. In one illustration, TransCaseCmdHold=0.6 A. This current, called the "hold" current is low enough to prevent an engagement. When an engagement is commanded, and a higher current is applied, it takes less time to get to that current if the hold current is already flowing through the coil of solenoid 292. As is known, when current is applied to a solenoid, the solenoid's inductance causes the current to rise to the desired value after a certain delay proportional to the inductance and inversely proportional to the current.

Operational realm 3004 stays in state 3110 unless the conditions associated with flow-line 3008 or flow-line 3114 are met. The conditions associated with flow-line 3114 are (i) either the hydraulic drive system 102 no longer is operating normally; or (ii) the output shaft speed OutputShaftSpeed is greater than the constant C_DisengageSpeed plus an offset, illustrated as 250 RPM for the flow-line. If either condition is met, control returns back to state 3104, and the clutch is again disengaged along with the change of conditions of the other variables as discussed above. Operational realm 3004 moves between the states 3104, 3106 and 3110 until operational realm 3004 is exited as discussed above with respect to FIG. 30. Most likely, control will be within state 3110 when the exiting happens.

Figure 32:
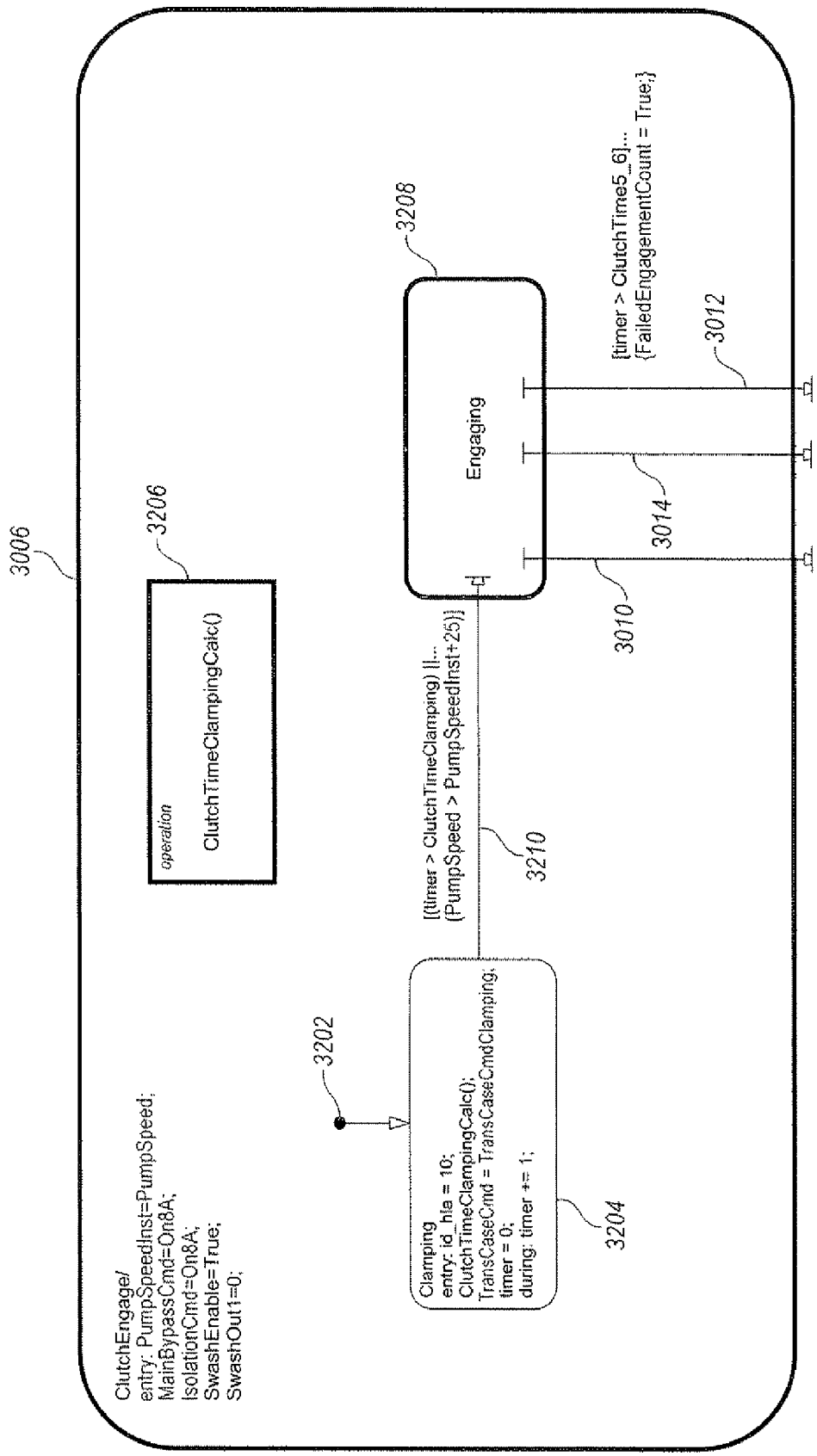
FIG. 32 is an exploded view of a portion of the flow of FIG. 30 and relates to clutch engaging.

ClutchEngage operational realm 3006 is illustrated in more detail in FIG. 32. When the realm is entered at entry point 3202 the variable PumpSpeedInst is set equal to the pump speed PumpSpeed of motor-pump 130. The bypass valve 246 is set to the condition MainBypassCmd "ON," the isolation valve 242 is set to the condition IsolationCmd "ON," and the flag associated with variable SwashEnable has been set to "TRUE," as discussed with respect to Table 4. Finally, the variable SwashOut1 has been set equal to "0." This command indicates that the swash-plate 216 is commanded to be in the neutral position. As noted elsewhere, however, if the precharge heuristic 600 is active, the precharge heuristic takes precedence over the SwashOut1 command.

As discussed in more detail, the signals sent to solenoid 290 of clutch valve 292 to engage clutch 208 will vary at different times. In essence, in the illustrated system 102, a current profile is created for each particular hardware arrangement to account for different types of conditions affecting clutch application. While high efficiency is desired, it is also important to control the application of clutch 208 so that a user of hydraulic drive system 102 is not subjected to undesirable impressions with respect to hydraulic drive system. Further, it is desirable to minimize undue wear to hydraulic clutch 208 through overly aggressive clutch application by way of hydraulic circuit 2900. The illustrated arrangement is merely exemplary and to give one approach to address the issue of finding a balance between short-term efficiencies as compared to long-term performance or perception. When a hydraulic clutch 208 is used, it is possible to apply engage the clutch at higher speeds (i.e., when a pumping mode is requested, vehicle 100 is moving at some velocity) while a simpler mechanical dog-type clutch can be engaged at a vehicle velocity of essentially zero. In the latter situation, when a vehicle operator is ready to request braking, clutch 208 has been engaged for some period of time prior to the request.

After entering ClutchEngage operational realm 3006 by way of entry point 3202, control moves to state 3204, entitled Clamping. The operation ClutchTimeClamping 3206 is performed, and the results from the operation 3206 are used to set the signal sent by the variable TransCaseCmd to control the variable application of clutch 208.

In general, a clamping current is a current higher than what is needed to engage the clutch 208. It is applied for a short period of time (ClutchTimeClamping) at the beginning of the engagement sequence to "jump start" the engagement. After the clamping discussed below takes place subsystem 3000 reverts to a smaller current and the profile described in engaging state 3208 is implemented.

Figure 33:
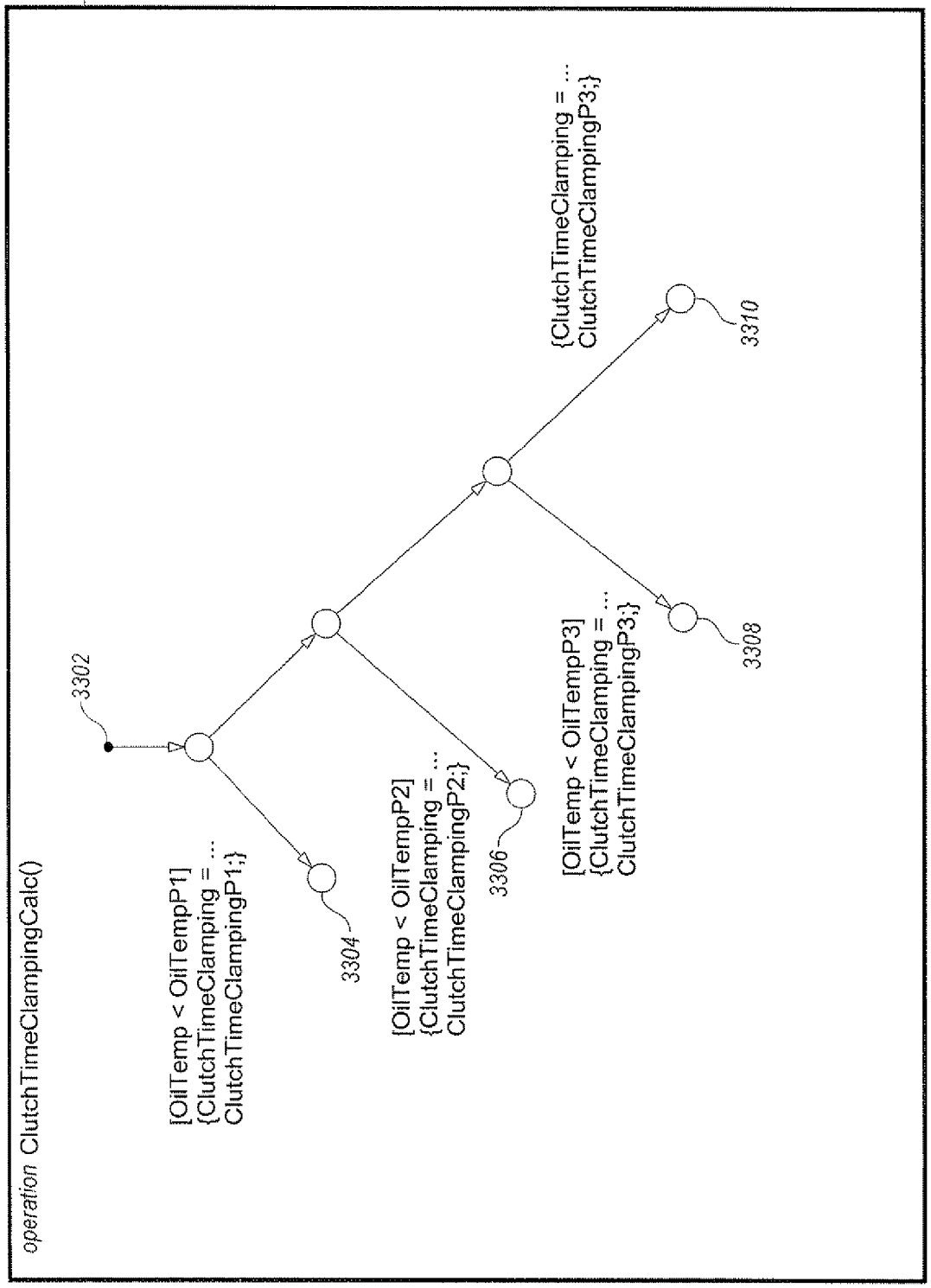
FIG. 33 is an exemplary flow of an operation entitled ClutchTimeClampingCalc associated with FIG. 32.

Operation ClutchTimeClampingCalc 3206 is illustrated in more detail in FIG. 33. The operation 3206 is entered by way of entry point 3302 and is exited by way of points 3304, 3306, 3308 or 3310 once the conditions associated with the indicated exit point 3304, 3306, 3308 or 3310 are met. In general, the time for clutch clamping varies as operation of the temperature of the hydraulic fluid measured by temperature sensor 288 in low pressure reservoir 134. Merely by way of illustration, a first clutching time ClutchTimeClamping1 is set if the oil temperature OilTemp associated with sensor 288 is less than a first predetermined oil temperature OilTemp1. Otherwise, if the oil temperature is less than a second predetermined oil temperature OilTemp2, then the variable ClutchTimeClamping is set to a second predetermined value of ClutchTimeClamping2. Finally, and merely as an example if the oil temperature is less than a third oil temperature, then the variable ClutchTimeClamping is set to a third value. Fewer or additional acceptable conditions representing the relationship between oil temperature and time can be set. However, if none of the conditions are met, then a default clamping time is set, which is shown in Figure O as being equal to the predetermined value ClutchTimeClampingP3.

In general, for hydraulic drive system 102 it has been determined that it should take less time to clamp clutch 208 as temperature increases. Advantageously, therefore, it is possible to reduce overall engagement time to promote efficiency of hydraulic drive system 102. As merely one example, the variables have been set where each increase in the clutch clamping time variable results in a reduction of time of one count, where one count represents 5 msec. The temperature is based on observable thresholds that are associated with the hardware, operational and environmental conditions, but the variable associated with OilTemp goes up as temperature increases. More specifically, in one illustration the variables have been set as follows:

OilTempP1=32° C.
OilTempP2=48° C.
OilTempP3=60° C.
ClutchTimeClampingP1=13 counts, each count is 5 msec→13*5=65 msec.
ClutchTimeClampingP2=12 counts, each count is 5 msec→12*5=60 msec.
ClutchTimeClampingP3=11 counts, each count is 5 msec→11*5=55 msec.

Once the clutch command TransCaseCmd has been sent in state 3204, a timer is then set. As shown by flow-line 3210, control passes from state 3204 to state 3208, entitled Engaging, when the time associated with the timer of state 3204 is greater than time entitled ClutchTimeClamping, set by operation ClutchTimeClampingCalc 3206, or the speed PumpSpeed of motor-pump 130 is greater than the variable previously set as PumpSpeedInst plus an offset, shown as 25 RPM in the present illustration. The offset indicates that the pump shaft 206 is starting to rotate.

Figure 34:
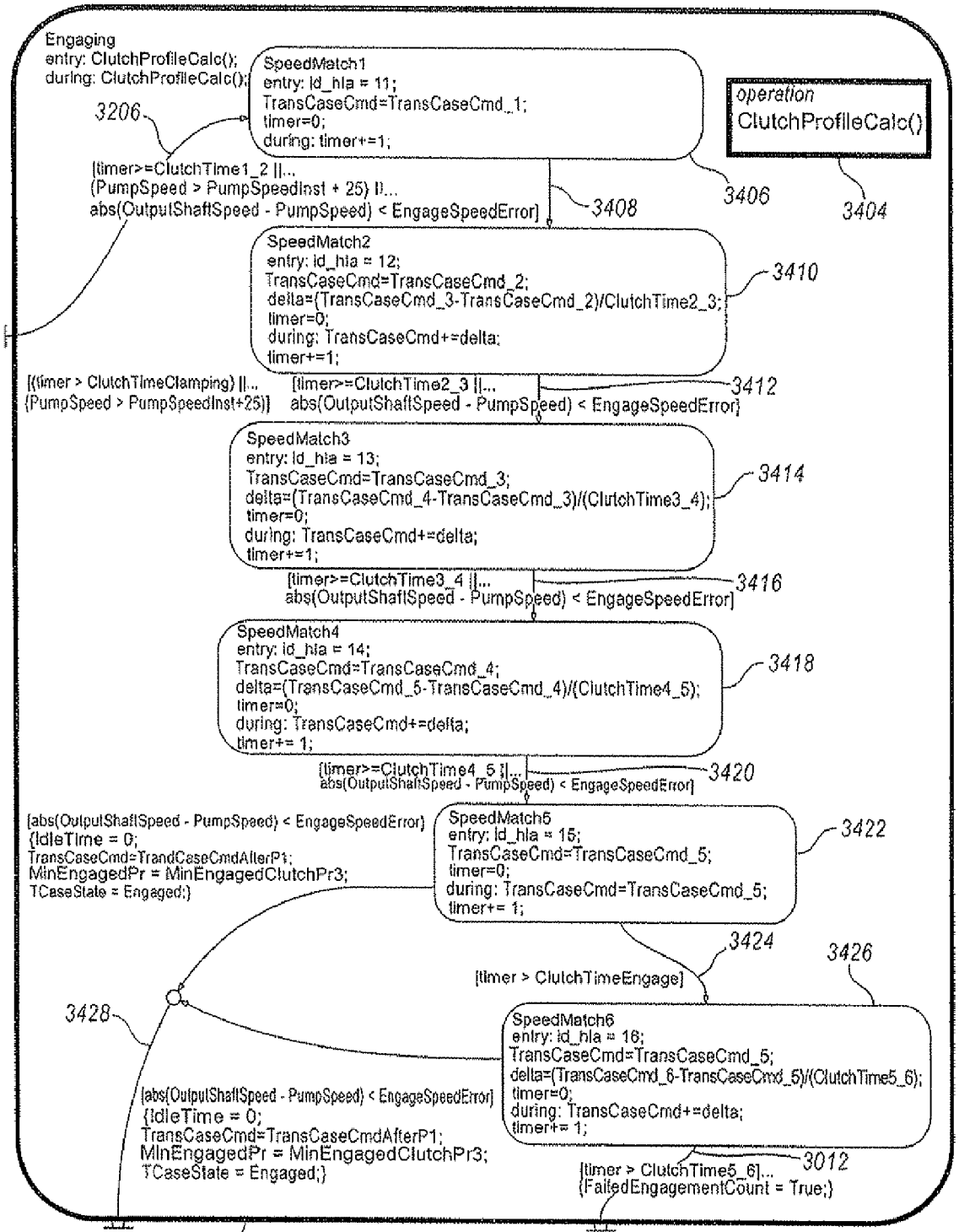
FIG. 34 is an exploded view of a portion of the flow of FIG. 32.
Figure 35:
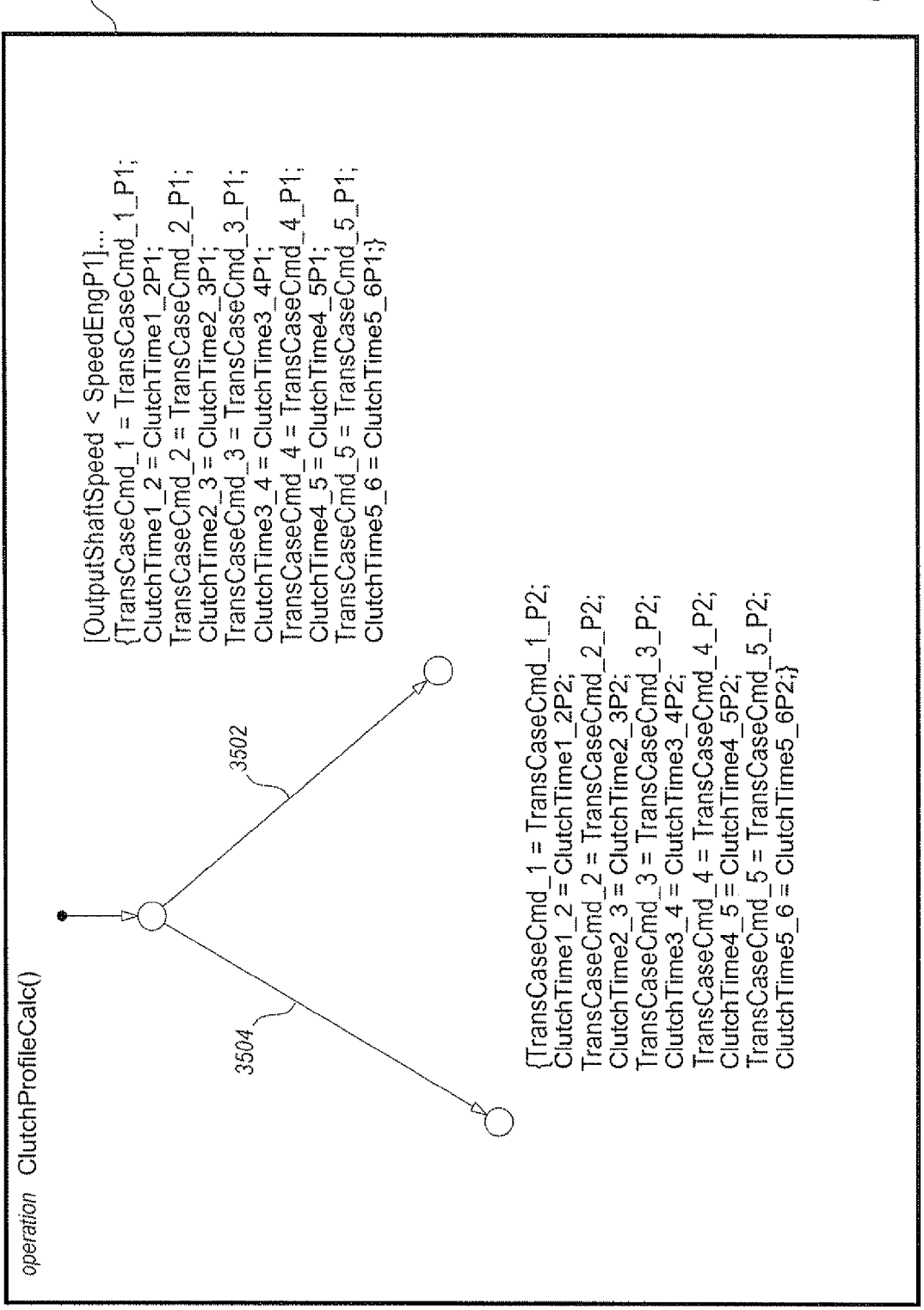
FIG. 35 is an exemplary flow of an operation entitled ClutchProfileCalc associated with FIG. 34.

Engaging state 3208 is discussed in more detail with respect to FIG. 34 and FIG. 35. However, operational realm 3006 is shown exiting from state 3208 by way of lines 3010, 3012, or 3014 as discussed with respect to FIG. 30 above.

Engaging state 3208 is entered by way of flow-line 3210 in FIG. 34. Within engaging state 3208 the operation ClutchProfileCalc 3404 is performed. As illustrated in FIG. 35, if the output shaft speed OutputShaftSpeed is less than the constant SpeedEngP1 as shown by flow-line 3502, then various clutch command signals and corresponding clutch times are set to an indicated value. In one illustrated approach, SpeedEngP1 is equal to 750 RPM. Otherwise, different values are set as shown by flow line 3504. In one embodiment, the same parameters are used irrespective of the speed of the engine. However, in other embodiments there may be a difference since it is anticipated that at lower engine speeds it will take less force to engage.

In general the variables are set using a torque sensor and by analyzing feedback to determine how smooth the engagement of clutch 208 is while minimizing time. Thus an appropriate balance is reached between efficiency and perceived performance. More specifically, in one example the variables have been set as follows:

```
If TransShaftSpeed < 750 rpm Then
  TransCaseCmd_1_P1 = 0.73A (Amps);
  TransCaseCmd_2_P1 = 0.74A;
  TransCaseCmd_3_P1 = 0.75A;
  TransCaseCmd_4_P1 = 0.76A;
  TransCaseCmd_5_P1 = 0.77A;
  ClutchTime1_2P1 = 30 counts, each is 5 msec->30*5 = 150 msec
  ClutchTime2_3P1 = 20 counts, each is 5 msec->20*5 = 100 msec
  ClutchTime3_4P1 = 20 counts, each is 5 msec->20*5 = 100 msec
  ClutchTime4_5P1 = 10 counts, each is 5 msec->10*5 = 50 msec
Else
  TransCaseCmd_1_P2 = 0.73A;
  TransCaseCmd_2_P2 = 0.74A;
  TransCaseCmd_3_P2 = 0.75A;
  TransCaseCmd_4_P2 = 0.76A;
  TransCaseCmd_5_P2 = 0.77A;
  ClutchTime1_2P2 = 30 counts, each is 5 msec->30*5 = 150 msec
  ClutchTime2_3P2 = 20 counts, each is 5 msec->20*5 = 100 msec
  ClutchTime3_4P2 = 20 counts, each is 5 msec->20*5 = 100 msec
  ClutchTime4_5P2 = 10 counts, each is 5 msec->10*5 = 50 msec
```

Once the desired values in current for clutch engagement command signals and clutch engagement times in seconds have been determined using the operation ClutchProfileCalc, state 3208 generally applies different currents to solenoid 290 for different periods of time until fill engagement of clutch 208 takes place.

More generally, the currents correspond to a signal. As illustrated in more detail in the paragraphs as follows a plurality of signals is applied for a plurality of preset times until clutch 208 engages.

Box 3406 is entitled SpeedMatch1. The clutch command TransCaseCmd is set to the variable TransCaseCmd_1 from the operation ClutchProfileCalc and a timer is started. TransCaseCmd_1 may be considered a first engaging signal. As shown by flow-line 3408, if one of three conditions is met, then control passes to box 3410. The first condition is that the time associated with the timer is greater than the variable ClutchTime1_2 set by the operation. The ClutchTime1_2 may be considered a first preset time. The second possible condition is that the pump speed is greater than the variable PumpSpeedInst plus an offset, shown as 25 RPM in the example. The third possible condition is that the absolute value of output shaft speed minus the speed of pump-motor 130 is less than a predetermined engaged speed error, entitled EngageSpeedError. For convenience, this third condition is referred to as the speed error condition.

The variable EngageSpeedError is the difference between the two sides of the clutch 208, namely the speeds of intermediate shaft 202 and pump-motor shaft 206. In one example, if the difference is less than a predetermined level (e.g., 50 RPM), then it is considered that the two sides of the clutch 208 are engaged. Thus, some slippage of the clutch is permitted, but the amount of slippage is controlled.

In box 3410, entitled SpeedMatch2, the clutch command signal is set to TransCaseCmd_2, which may be considered a second engaging signal. A variable delta is set equal to the difference between TransCaseCmd_3-TransCaseCmd_2 divided by the value ClutchTime2_3, which may be considered a second preset time, all determined within operation 3404. A timer is set to run while the clutch command signal is set to the variable delta. In effect, using the variable delta, the current is increased from an initial value TransCaseCmd_2 to a current value TransCaseCmd_3 over the duration given by ClutchTime2_3. Of course, in some systems it may be desirable for the current to stay the same or to possibly reduce the current. Nevertheless, since the goal is to engage clutch 208, increasing current over time has been found to be advantageous in promoting efficiency. The same is true for boxes 3414, 3418, and 3426. Control will move to box 3414 by way of flow-line 3412 if the timer is greater than or equal to the variable set by operation 3404 of ClutchTime2_3, or if the speed error condition is met, which means that clutch engagement is complete. In box 3414, entitled SpeedMatch3, the clutch command signal is set to TransCaseCmd_3. The variable delta is set to the difference between TransCaseCmd_4 and TransCaseCmd_3 divided by the time ClutchTime3_4. A timer is set to run while the clutch command signal is set to the variable delta. Control will move to box 3418 by way of flow-line 3416 if the timer is greater or equal to the time ClutchTime3_4 or if the speed error condition is met, which means that clutch engagement is complete.

In box 3418, entitled SpeedMatch4, the clutch command signal is set to TransCaseCmd_4. The variable delta is set to the difference between TransCaseCmd_5, and TransCaseCmd_4 divided by the time ClutchTime4_5, A timer is set to run while the clutch command signal is set to the variable delta. Control will move to box 3422 by way of flow-line 3420 if the timer is greater or equal to the time ClutchTime4_5 or if the speed error condition is met, which indicates that the clutch engagement is complete.

In box 3422, entitled SpeedMatch5, the clutch command signal is set to the variable TransCaseCmd_5. A timer is set and the same value is of the clutch command signal is maintained while the timer runs. There are two possible flow-lines from SpeedMatch5 box 3422. A first flow-line P-24 is followed if the timer is greater than the value set for the clutch time to engage ClutchTimeEngage. If the condition is satisfied then in box 3426, entitled SpeedMatch6, a final attempt to engage the clutch 208 is attempted. The clutch command signal TransCaseCmd is set equal to the value associated with TransCaseCmd_5. The variable delta is set equal to the difference between TransCaseCmd_6 and TransCaseCmd_5 divided by the clutch time value of ClutchTime5_6. A timer is set to run while the clutch command signal is set to the variable delta. If the condition discussed with respect to flow-line 3012 is met, then engaging state 3208 is exited as shown by the flow-Line 3012.

Thus, if the hydraulic drive system 102 is in any of the SpeedMatch states (1 through 6) and the speed condition error is satisfied or set to "TRUE," then the clutch 208 is engaged and there is no need to wait for the various additional times. Thus, engaging state 3208 will run very quickly until engagement is complete.

Unless engaging state 3208 is exited by way of line 3012, once the clutch 208 is engaged using one of boxes 3406, 3410, 3414, 3418, 3422 or 3426, control leaves state 3208 using flow-line 3428. Once the conditions associated with one of the boxes is met, the control falls through later numbered boxes to exit flow-line 3428.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A hydraulic drive system comprising:
   a high pressure storage device;
   a low pressure storage device;
   a pump-motor operating at a range of pump-motor speeds for converting between hydraulic energy and mechanical energy, said pump-motor disposed between said high pressure storage device and said low pressure storage device;
   a selectively rotating shaft associated with mechanical energy; and
   a variable clutch for selectively transferring mechanical energy between said selectively rotating shaft and said pump-motor, said clutch including a proportional valve, wherein a clamping signal controls a clamping force to said clutch, said clutch entering an engaging state once a time for clamping said clutch elapses or a change in pump-motor speed exceeds a predetermined offset, said clamping signal is stronger than an engaging signal applied while said clutch is in said engaging state.

2. A hydraulic drive system as recited in claim 1, wherein a plurality of engaging signals are applied for a plurality of preset times until said clutch is engaged, a first signal being applied for a first preset time and a second signal being selectively applied for a second preset time, the strength of said engaging signals varying according to a predetermined profile.

3. A hydraulic drive system as recited in claim 2, further comprising:
a speed sensor measuring a rotational speed of said selectively rotating shaft;
a pump-motor speed sensor measuring a pump-motor speed;
said clutch being engaged when an absolute value of the difference between said rotation speed and said pump-motor speed is less than an error value.

4. A hydraulic drive system as recited in claim 2, wherein at least a subset of said preset times is selectively reduced for at least one of said applied signals subsequent to said first signal.

5. A hydraulic drive system as recited in claim 2, wherein a subsequent one of each of said signals has a different strength than a previous one of said signals.

6. A hydraulic drive system as recited in claim 5, wherein said different strength is an increasing strength.

7. A hydraulic drive system as recited in claim 5, wherein said signals are currents.

8. A hydraulic drive system as recited in claim 5, further comprising:
a speed sensor measuring a rotation speed of said selectively rotating shaft;
a first set of applied currents and a first set of applied times and a second set of applied currents and a second set of preset times;
said first set of applied signals and said first set of preset times being selected if said rotation speed is below a threshold level and said second set of applied signals and said second set of preset times being selected if said rotation speed is above said threshold level;
and wherein a strength of said signals for each of said preset times for said first set is different than a strength of said signals for each of said preset times for said second set.

9. A hydraulic drive system as recited in claim 2, wherein a final preset time is less than said first preset time.

10. A hydraulic drive system as recited in claim 1, wherein a holding signal is applied to said clutch prior to said clamping signal, said holding signal being weaker than said clamping signal.

11. A hydraulic drive system as recited in claim 10, wherein at least one engaging signal is applied to said clutch after said clamping signal, said clamping signal being stronger than said at least one engaging signal and said one engaging signal being stronger than said holding signal.

12. A hydraulic drive system as recited in claim 1, further comprising a temperature sensor for measuring a temperature of a hydraulic fluid within said system, wherein said time for clamping said clutch being reduced as said temperature increases.

13. A hydraulic drive system as recited in claim 12, wherein said temperature sensor is provided within said low pressure storage device.

14. A variable clutch assembly for selectively transferring mechanical energy between a selectively rotating shaft and a pump-motor that selectively generates hydraulic energy comprising:
a clutch selectively clamping and engaging between two selectively rotating components;
a proportional valve selectively receiving a signal, the level of said signal affecting a force of application to said clutching mechanism;
a first input corresponding to a measured first speed of a first selectively rotating component;
a second input corresponding to a measured second speed of a second selectively rotating component;
a third input corresponding to a measured temperature associated with said assembly;
a plurality of engaging signals being selectively applied to said proportional valve for a plurality of preset times, a first engaging signal being applied for a first preset time and a second engaging signal being applied for a second preset time, a strength of said signal selectively varying with each subsequent preset time;
said clutch being engaged when an absolute value of the difference between said first input and said second input determined subsequent to an application of each of said engaging signals is less than an error value.

15. A variable clutch assembly as recited in claim 14, further comprising a timing for applying a clamping signal prior to said engaging signals, said timing being reduced as said measured temperature increases.

16. A variable clutch assembly as recited in claim 14, further comprising the applying of a clamping signal prior to said engaging signals, a strength of said clamping signal being greater than a first engaging signal.

17. A variable clutch assembly as recited in claim 14, further comprising a holding signal, the holding signal being applied prior to said clamping signal and being weaker than said clamping signal.

18. A method for engaging a clutch comprising the steps of:
applying a clamping signal to said clutch for a predetermined period of time;
stopping said applying of said clamping signal if a change in rotational speed associated with said applying of said clamping signal exceeds a predetermined offset;
engaging said clutch using a plurality of engaging signals over a plurality of preset times, sending a first engaging signal for a first preset time and selectively sending a second engaging signal for a second preset time; and
making a strength of said first engaging signal less than a strength of said clamping signal.

19. The method as recited in claim 18, further comprising the step of varying the strength of subsequent engaging signals as compared to previous engaging signals.

20. The method as recited in claim 18, further comprising the step of applying a holding signal prior to said clamping signal, a strength of said holding signal being less than a strength of said clamping signal.

21. The method as recited in claim 18, further comprising the step of measuring a temperature for said clutch, said predetermined time reducing with increasing levels of said temperature.

* * * * *